(12) United States Patent
Kim et al.

(10) Patent No.: US 12,155,599 B2
(45) Date of Patent: Nov. 26, 2024

(54) METHOD FOR TRANSMITTING/RECEIVING DOWNLINK CONTROL INFORMATION IN WIRELESS COMMUNICATION SYSTEM AND DEVICE THEREFOR

(71) Applicant: LG ELECTRONICS INC., Seoul (KR)

(72) Inventors: Hyungtae Kim, Seoul (KR); Inkwon Seo, Seoul (KR); Jiwon Kang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 270 days.

(21) Appl. No.: 17/753,040

(22) PCT Filed: Aug. 18, 2020

(86) PCT No.: PCT/KR2020/010995
§ 371 (c)(1),
(2) Date: Feb. 16, 2022

(87) PCT Pub. No.: WO2021/034086
PCT Pub. Date: Feb. 25, 2021

(65) Prior Publication Data
US 2022/0294578 A1    Sep. 15, 2022

Related U.S. Application Data

(60) Provisional application No. 62/910,453, filed on Oct. 3, 2019, provisional application No. 62/898,566, filed (Continued)

(30) Foreign Application Priority Data

Aug. 16, 2019 (KR) .................. 10-2019-0100651
Sep. 10, 2019 (KR) .................. 10-2019-0112478

(51) Int. Cl.
*H04L 5/00* (2006.01)
(52) U.S. Cl.
CPC ............ *H04L 5/005* (2013.01); *H04L 5/0035* (2013.01)
(58) Field of Classification Search
None
See application file for complete search history.

(56) References Cited

U.S. PATENT DOCUMENTS 8,867,519 B2    10/2014  Kim et al.
11,569,951 B2*   1/2023  Yi ........................... H04L 5/001
(Continued)

FOREIGN PATENT DOCUMENTS

KR    10-2014-0098100    8/2014
WO       2017192014     11/2017

OTHER PUBLICATIONS

PCT International Application No. PCT/KR2020/010995, International Search Report dated Nov. 27, 2020, 7 pages.

*Primary Examiner* — Phirin Sam
(74) *Attorney, Agent, or Firm* — LEE, HONG, DEGERMAN, KANG & WAIMEY

(57) ABSTRACT

A method of transmitting and receiving downlink control information (DCI) in a wireless communication system and a device therefor are disclosed. Specifically, a method of receiving downlink control information (DCI) by a user equipment (UE) in a wireless communication system, the method comprises receiving configuration information related to a search space; determining PDCCH candidates to be monitored within a plurality of search spaces, wherein the plurality of search spaces are configured for a plurality of control resource sets (CORESETs) based on the configuration information, and each search space includes one or more physical downlink control channel (PDCCH) candi-
(Continued)

dates; monitoring the PDCCH candidates to be monitored; and receiving the DCI based on the monitoring.

15 Claims, 12 Drawing Sheets

Related U.S. Application Data on Sep. 11, 2019, provisional application No. 62/890,560, filed on Aug. 22, 2019.

(56) References Cited

U.S. PATENT DOCUMENTS

| | | | |
|---|---|---|---|
| 2011/0110316 A1 | 5/2011 | Chen et al. | |
| 2012/0282936 A1 | 11/2012 | Gao et al. | |
| 2018/0242318 A1* | 8/2018 | Christensson | H04W 72/52 |
| 2019/0253308 A1* | 8/2019 | Huang | H04L 43/0823 |
| 2020/0336973 A1* | 10/2020 | Niu | H04W 72/23 |
| 2020/0404693 A1* | 12/2020 | Zhou | H04W 72/23 |
| 2021/0022122 A1* | 1/2021 | Khoshnevisan | H04W 72/23 |
| 2021/0099983 A1* | 4/2021 | Khoshnevisan | H04L 27/2676 |
| 2021/0307031 A1* | 9/2021 | Chen | H04W 72/0453 |
| 2022/0104185 A1* | 3/2022 | Moon | H04L 5/0053 |
| 2022/0159579 A1* | 5/2022 | Cirik | H04W 52/242 |
| 2022/0167279 A1* | 5/2022 | Zhou | H04W 52/242 |
| 2022/0167375 A1* | 5/2022 | Papasakellariou | H04W 72/23 |
| 2022/0417772 A1* | 12/2022 | Xia | H04W 24/04 |

\* cited by examiner

[FIG. 1]
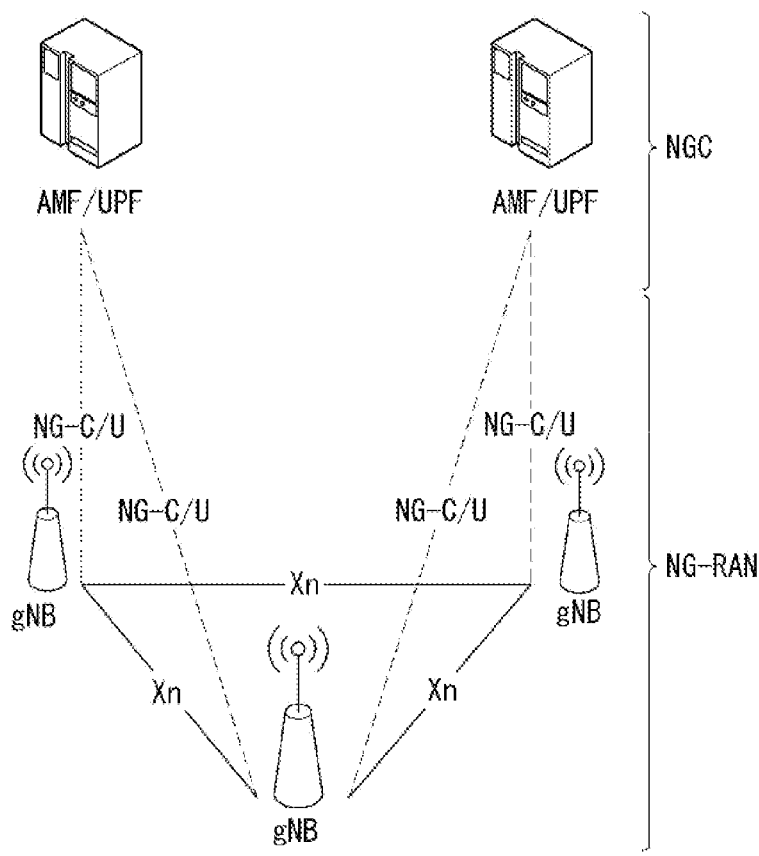
[FIG. 2]
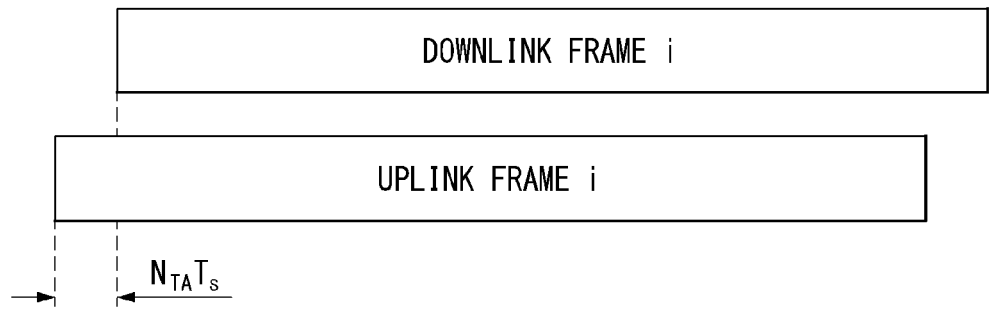

[FIG. 3]
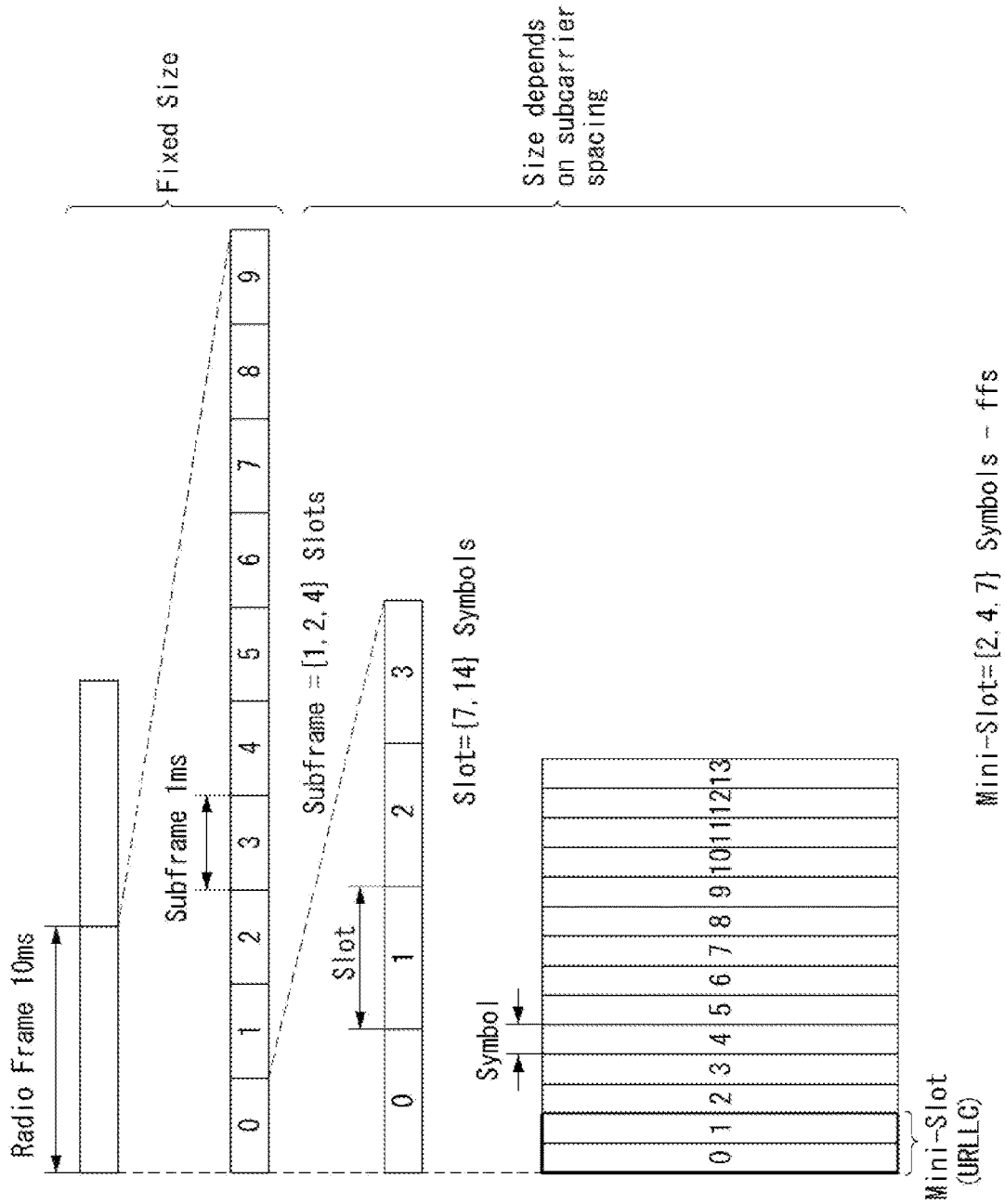

[FIG. 4]
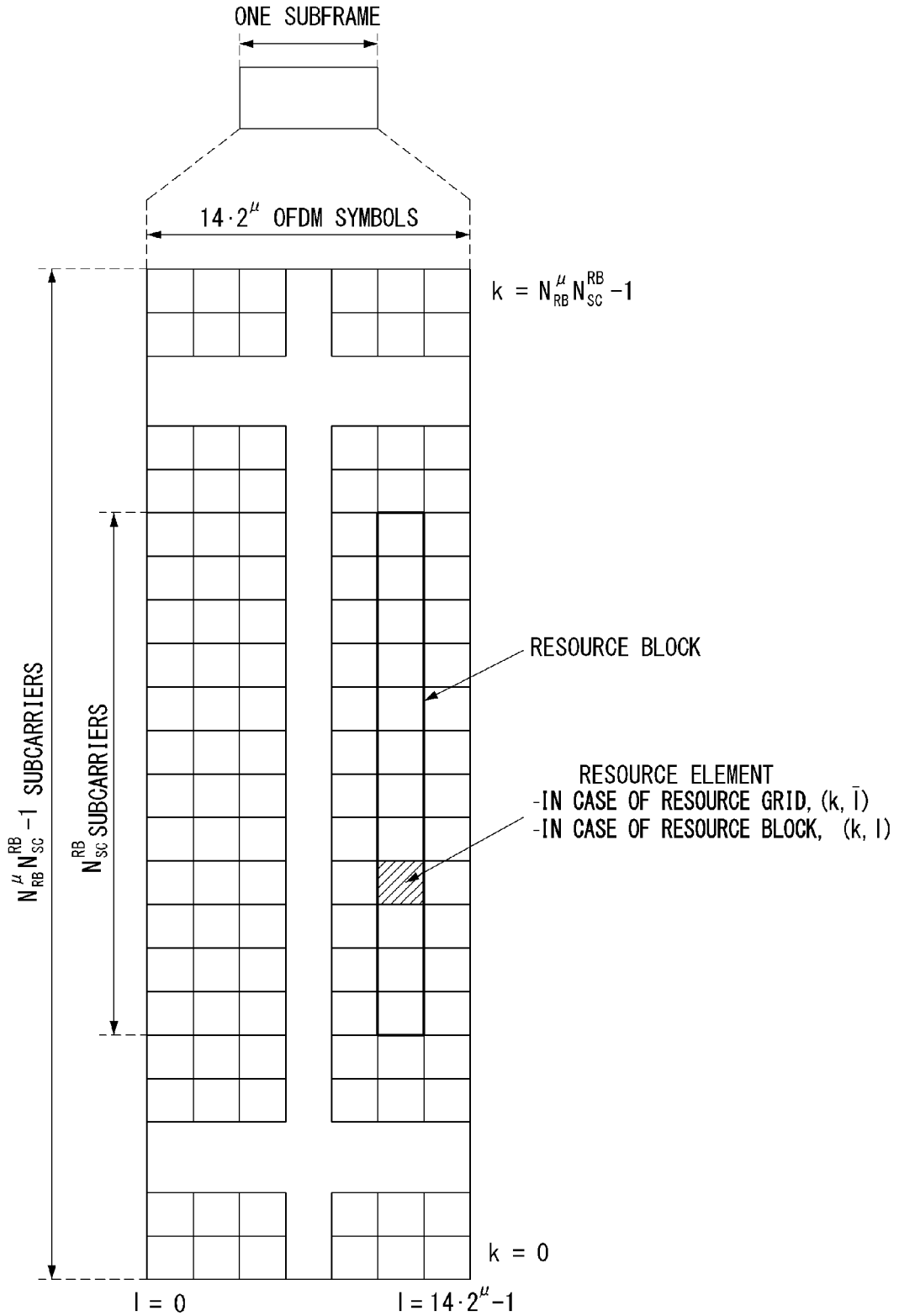

[FIG. 5]
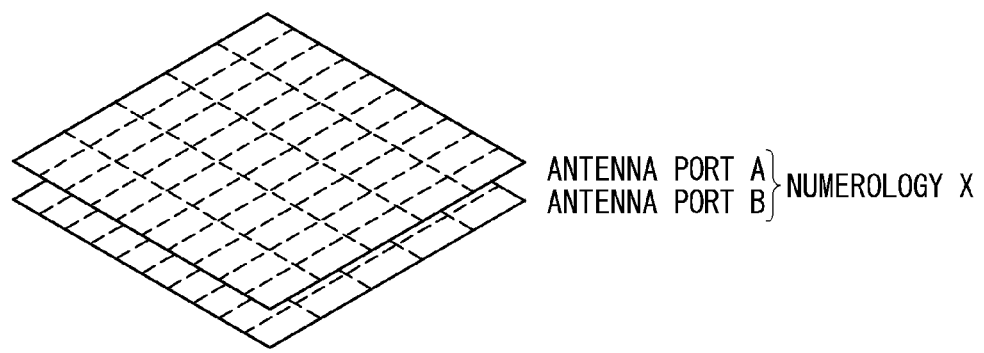
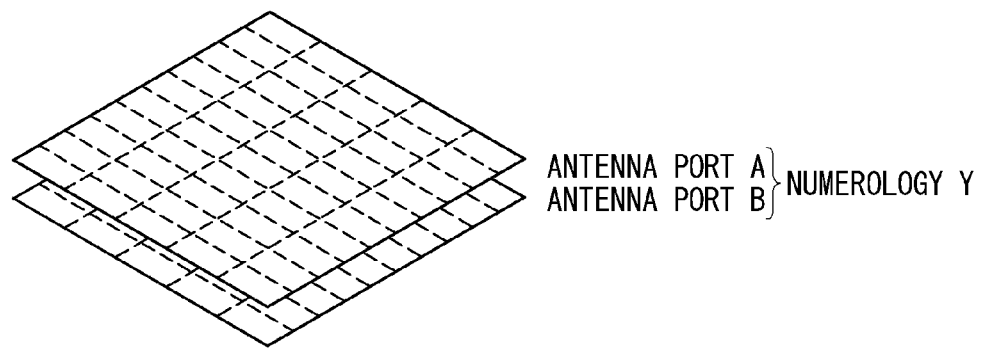

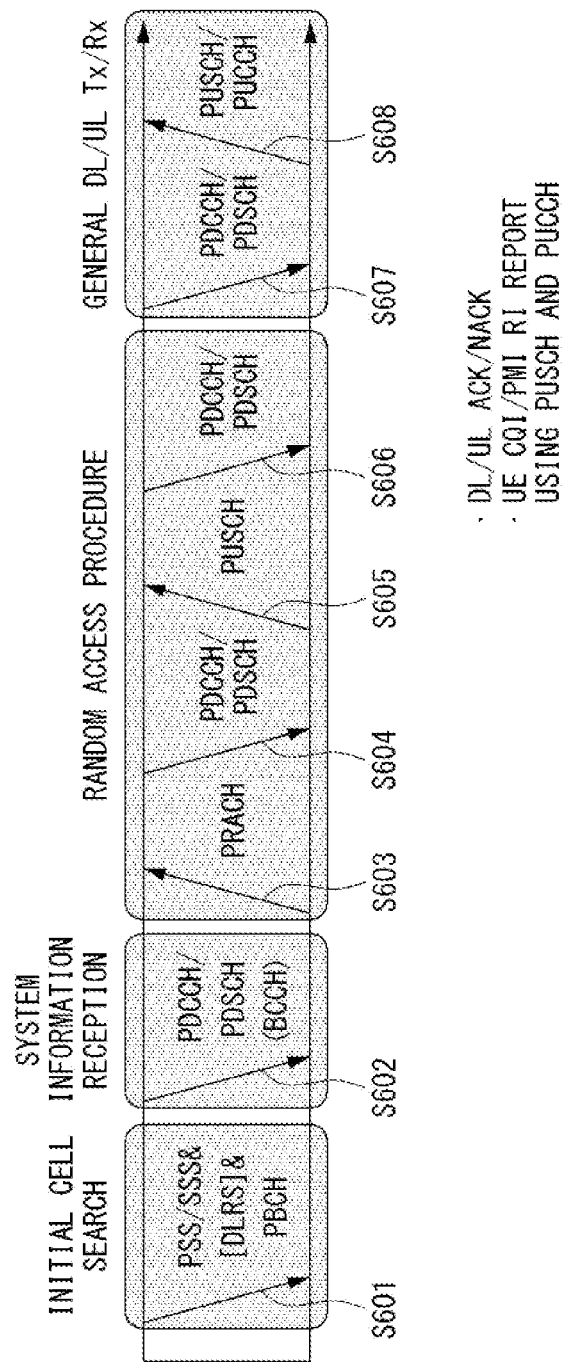
[FIG. 6]

[FIG. 7]
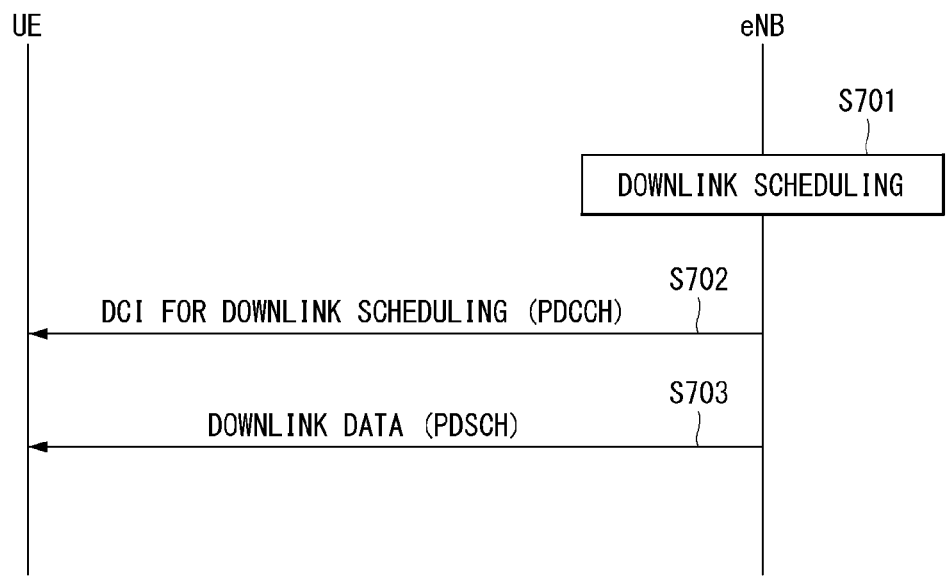
[FIG. 8]
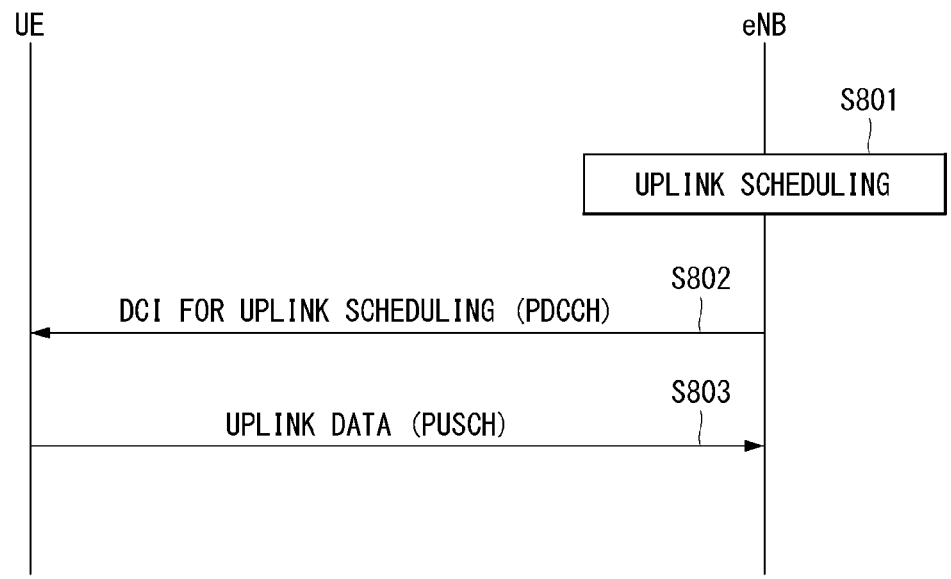

[FIG. 9]
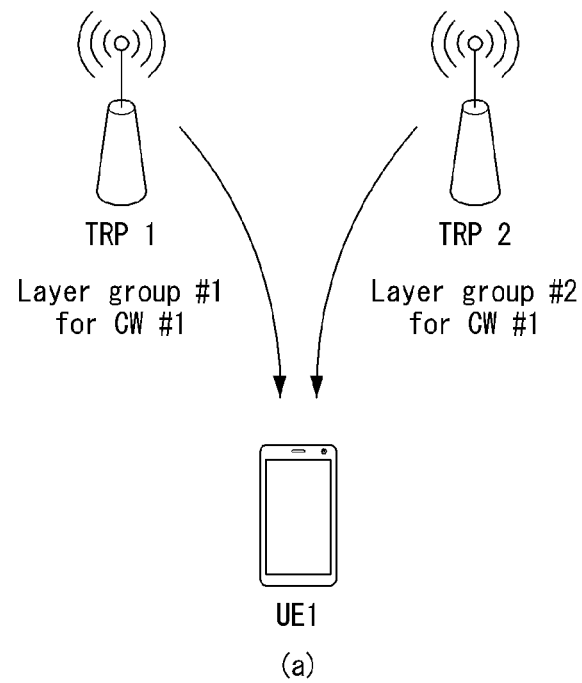
(a)
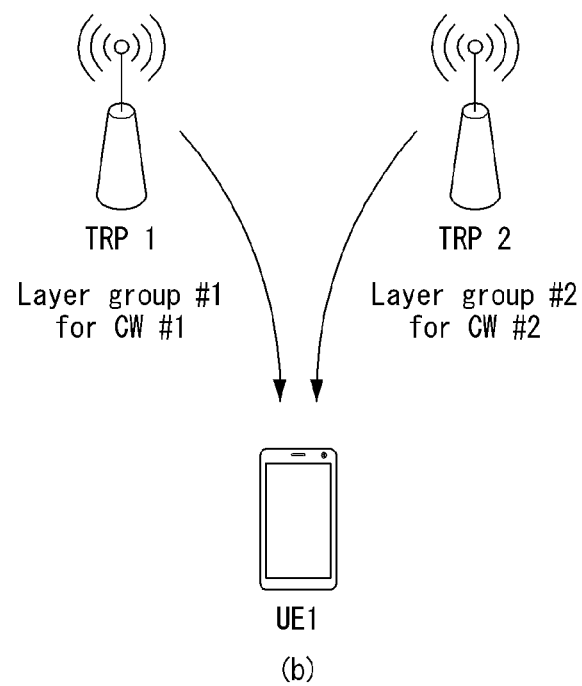
(b)

[FIG. 10]
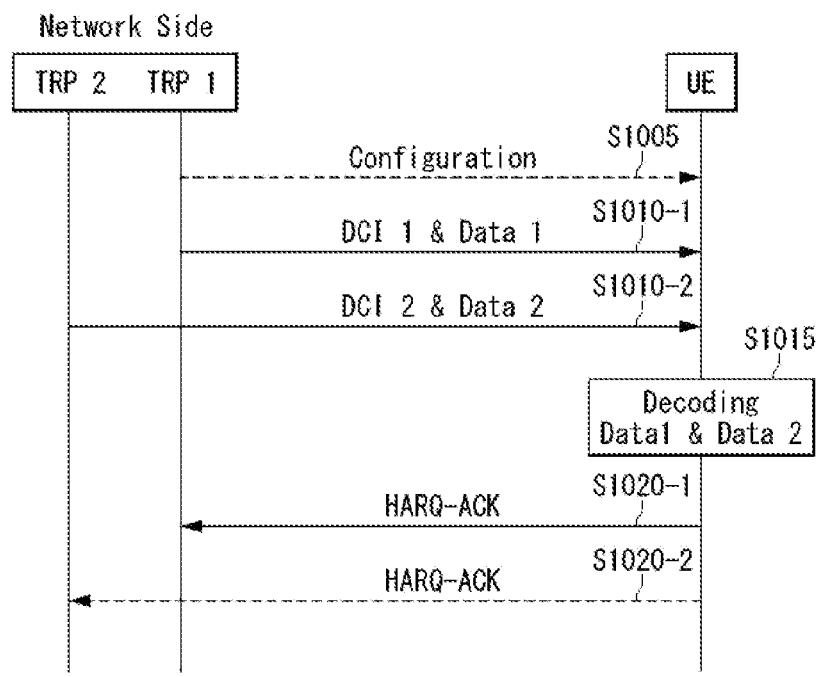

[FIG. 11]
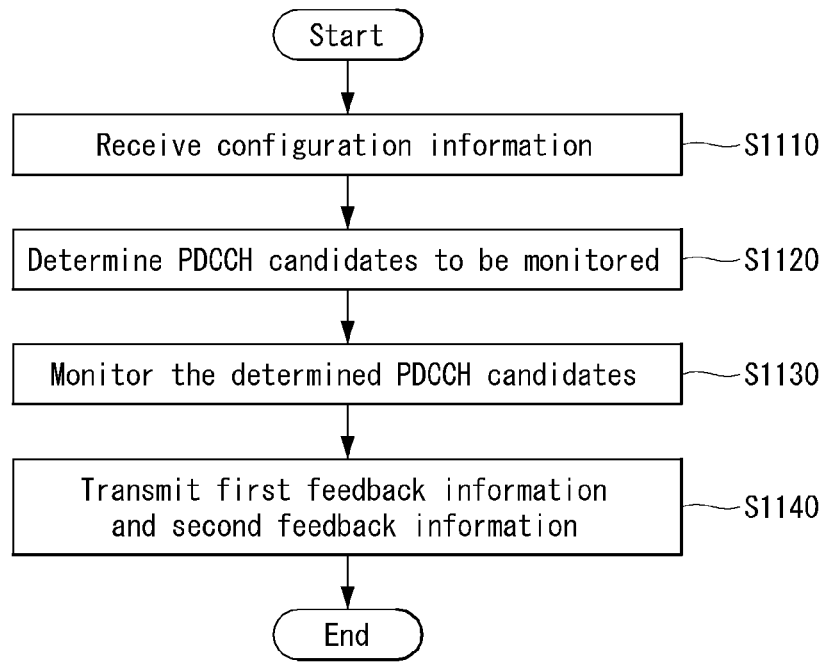
[FIG. 12]
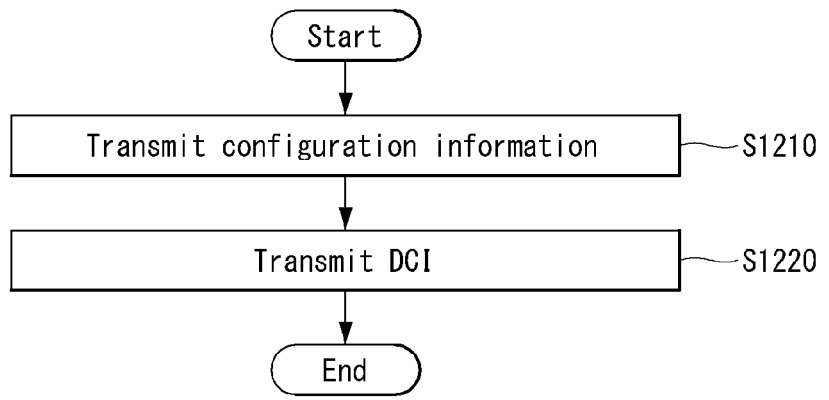

[FIG. 13]
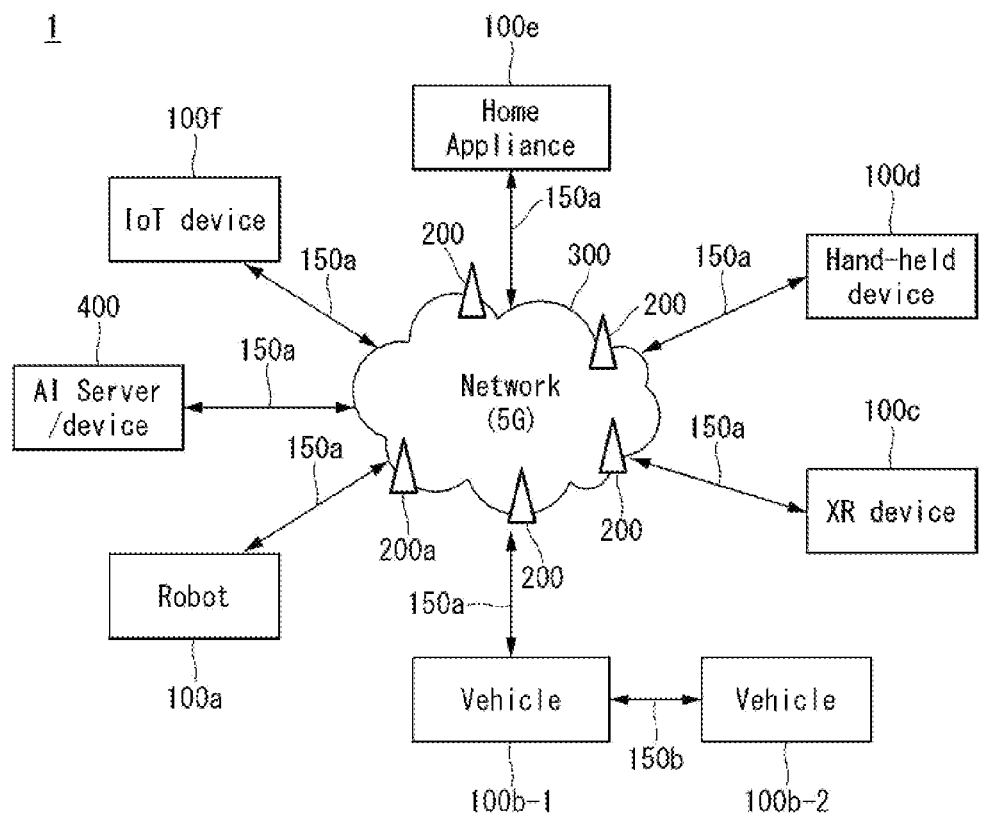

[FIG. 14]
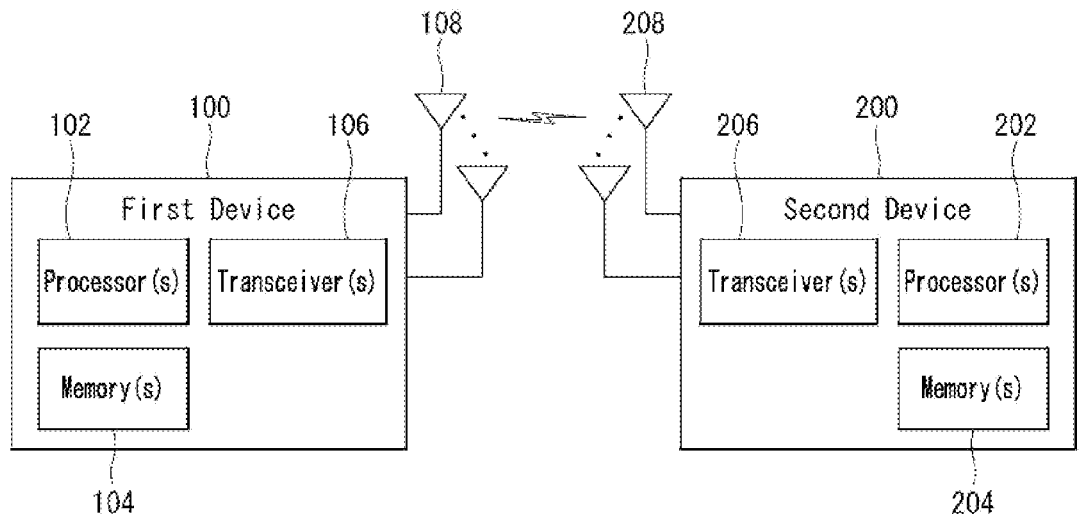
[FIG. 15]
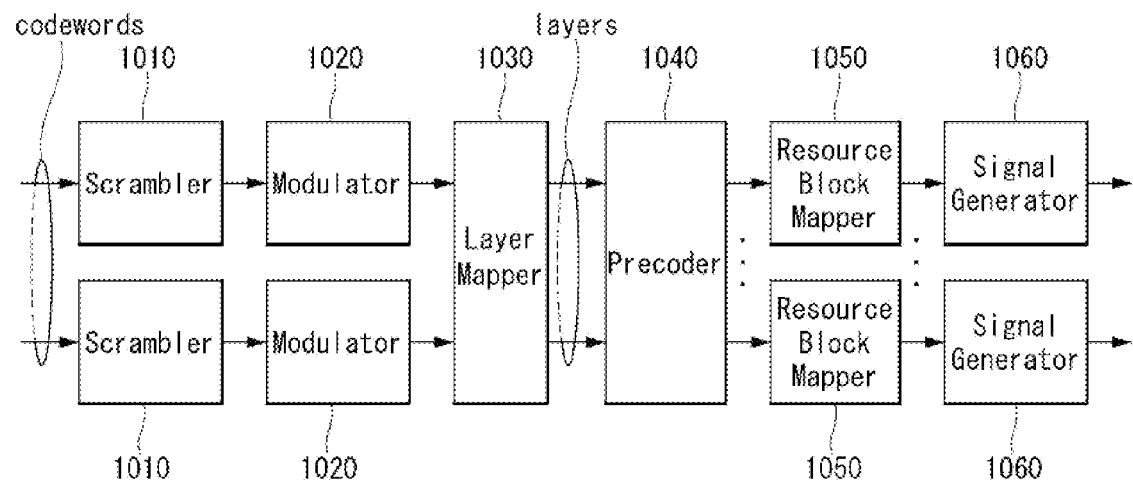

[FIG. 16]
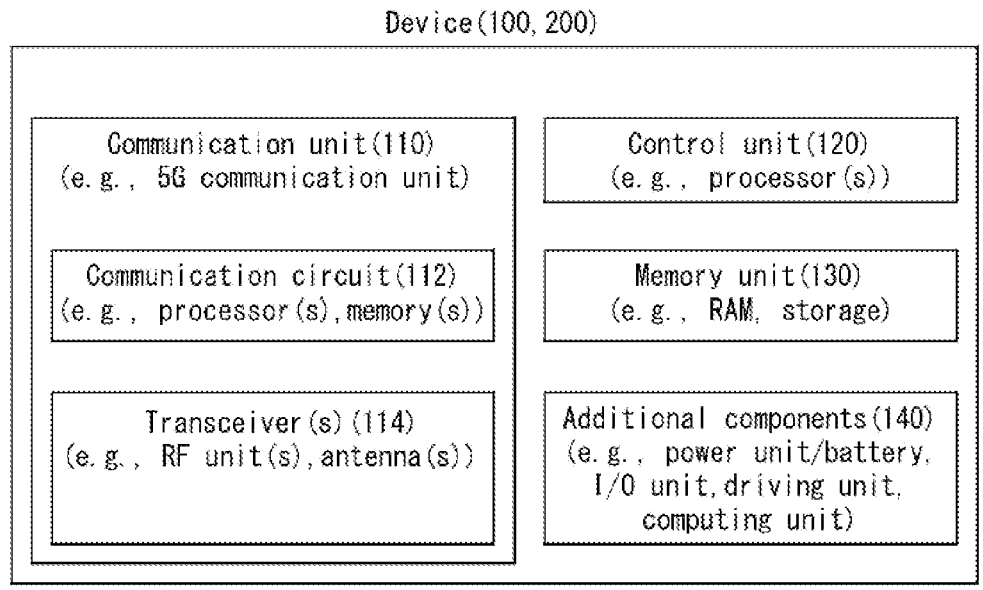
[FIG. 17]
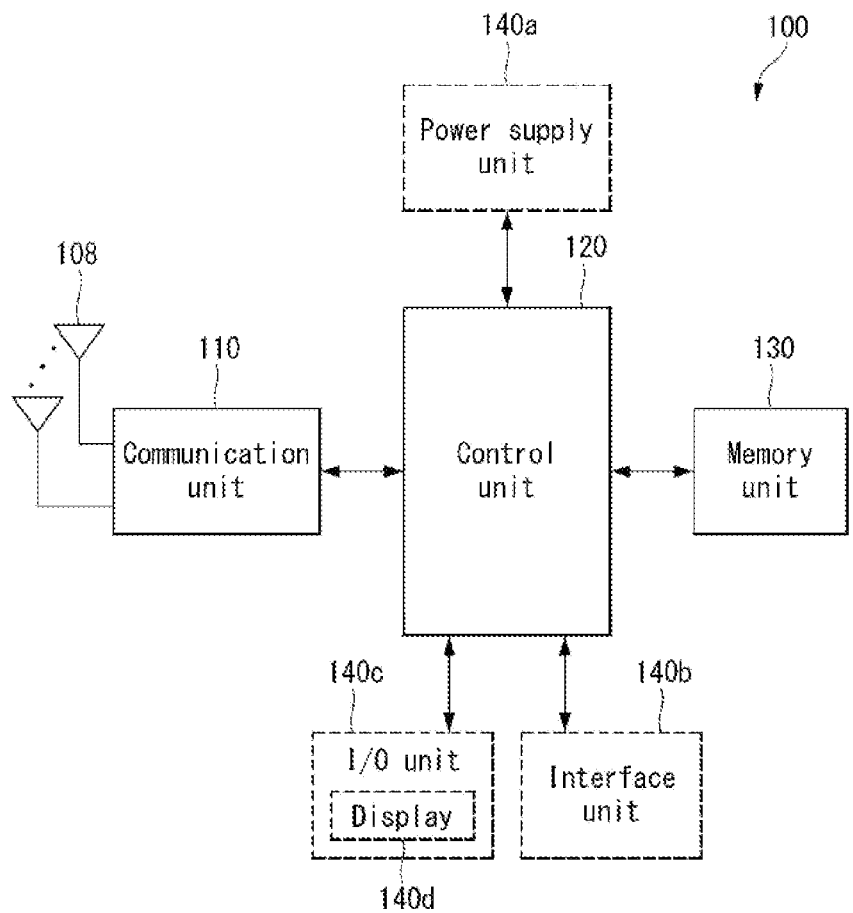

METHOD FOR TRANSMITTING/RECEIVING DOWNLINK CONTROL INFORMATION IN WIRELESS COMMUNICATION SYSTEM AND DEVICE THEREFOR

CROSS-REFERENCE TO RELATED APPLICATIONS

This application is the National Stage filing under 35 U.S.C. 371 of International Application No. PCT/KR2020/010995, filed on Aug. 18, 2020, which claims the benefit of earlier filing date and right of priority to Korean Patent Application Nos. 10-2019-0100651 filed on Aug. 16, 2019, and 10-2019-0112478 filed on Sep. 10, 2019, and also claims the benefit of U.S. Provisional Application Nos. 62/890,560 filed on Aug. 22, 2019, 62/898,566 filed on Sep. 11, 2019, and 62/910,453 filed on Oct. 3, 2019, the contents of all of which are hereby incorporated by reference herein in their entirety.

TECHNICAL FIELD

The present disclosure relates to a wireless communication system and, more particularly, to a method of transmitting/receiving downlink control information based on multiple Transmission Reception Points (TRPs) and a device supporting the same.

BACKGROUND ART

Mobile communication systems have been developed to provide a voice service while ensuring the activity of a user. However, in the mobile communication system, not only a voice, but also a data service is extended. At present, there is a shortage of resources due to an explosive increase in traffic, and users demand a higher speed service. As a result, a more advanced mobile communication system is required.

Requirements for a next-generation mobile communication system should be able to support the acceptance of explosive data traffic, a dramatic increase in the per-user data rate, the acceptance of a significant increase in the number of connected devices, very low end-to-end latency, and high-energy efficiency. To this end, various technologies are researched, which include dual connectivity, massive multiple input multiple output (MIMO), in-band full duplex, non-orthogonal multiple access (NOMA), super wideband support, device networking, and the like.

DISCLOSURE

Technical Problem

The present disclosure proposes a method of transmitting and receiving downlink control information by a UE supported by multiple Transmission Reception Points (TRPs) in a wireless communication system.

Specifically, the present disclosure proposes a method of determining PDCCH candidates for blind decoding/monitoring by taking into consideration a situation in which multiple TRPs transmit DCI separately.

Furthermore, the present disclosure proposes a method of determining order in which PDCCH candidates are mapped based on the PDCCH candidates being determined.

Furthermore, the present disclosure proposes a method of configuring a limit value (for example, the maximum number of CCEs or the maximum number of PDCCH candidates) defined by a UE to determine PDCCH candidates by taking into consideration multiple TRPs.

Technical objects to be achieved by the present disclosure are not limited to the aforementioned technical objects, and other technical objects not described above may be evidently understood by a person having ordinary skill in the art to which the present disclosure pertains from the following description.

Technical Solution

A method of receiving downlink control information (DCI) by a UE in a wireless communication system based on one embodiment of the present disclosure may comprise receiving configuration information related to a search space; determining PDCCH candidates to be monitored within a plurality of search spaces, wherein the plurality of search spaces are configured for a plurality of control resource sets (CORESETs) based on the configuration information, and each search space includes one or more physical downlink control channel (PDCCH) candidates; monitoring the PDCCH candidates to be monitored; and receiving the DCI based on the monitoring, wherein a first limit and a second limit related to the number of the PDCCH candidates to be monitored are predefined, the first limit is a value configured for a serving cell, the second limit is a value configured for a CORESET group related to a CORESET in which each space is configured, and the number of PDCCH candidates to be monitored is smaller than or equal to the first limit and the second limit.

Also, in the method based on one embodiment of the present disclosure, the plurality of search spaces may include UE-specific search spaces (USSs) and common search spaces (CSSs), and PDCCH candidates included in the CSSs may be determined as the PDCCH candidates to be monitored regardless of the first limit and the second limit.

Also, in the method based on one embodiment of the present disclosure, the USSs may be determined sequentially as the PDCCH candidates to be monitored in ascending order of index within a range that a cumulative number of PDCCH candidates included in each USS from the USS with the lowest index does not exceed the first limit and the second limit.

Also, in the method based on one embodiment of the present disclosure, the determining PDCCH candidates to be monitored within the plurality of search spaces may include selecting first search spaces based on the second limit among the plurality of search spaces; and determining the PDCCH candidates to be monitored based on the first limit among the first search spaces.

Also, in the method based on one embodiment of the present disclosure, the second limit may be determined as the smaller of a value predefined as the second limit and {the first limit/(the number of CORESET groups related to the plurality of CORESETs)}.

Also, in the method based on one embodiment of the present disclosure, the first limit may be determined based on the value of the second limit.

Also, in the method based on one embodiment of the present disclosure, the first limit may be determined as a value of the second limit multiplied by a specific value, the method further including transmitting capability information including the specific value.

Also, in the method based on one embodiment of the present disclosure, the first limit and the second limit may be i) the maximum number of the PDCCH candidates to be monitored or ii) the maximum number of control channel elements (CCEs).

Also, in the method based on one embodiment of the present disclosure, the plurality of search spaces may include search spaces configured for a CORESET related to a first CORESET group and search spaces configured for a CORESET related to a second CORESET group, and based on the fact that the index of the first CORESET group is lower than that of the second CORESET group, the search spaces configured for the CORESET related to the first CORESET group may be determined first sequentially as the PDCCH candidates to be monitored within a range not exceeding the first limit and the second limit.

Also, in the method based on one embodiment of the present disclosure, the determining PDCCH candidates to be monitored within a plurality of search spaces may include arranging the USSs in ascending order of index of the USSs, wherein USS_i represents the i-th USS, and index i is a positive integer including 0; comparing a first value, which is a sum of the number of PDCCH candidates of USSs related to the index from 0 to i and the number of PDCCH candidates of the CSSs, with the first limit; comparing a second value, which is a sum of the number of PDCCH candidates of USSs included in a CORESET group related to USS_i among USSs related to the index from 0 to i and the number of PDCCH candidates of the CSSs, with the second limit configured for the CORESET group related to USS_i; and determining the PDCCH candidates to be monitored within a range less than or equal to the first limit and the second limit.

Also, in the method based on one embodiment of the present disclosure, based on the first value being less than or equal to the first limit and the second value exceeding the second limit configured for the CORESET group related to USS_i, USSs with an index larger than or equal to i included in the CORESET group related to USS_i may not be monitored.

Also, in the method based on one embodiment of the present disclosure, the PDCCH candidates to be monitored may be determined based on USSs with an index larger than or equal to i included in CORESET groups other than the CORESET group related to USS_i.

Also, in the method based on one embodiment of the present disclosure, based on the first value exceeding the first limit, USSs with an index larger than or equal to i may not be monitored.

Also, in the method based on one embodiment of the present disclosure, based on the second value exceeding the second limit, USSs with an index larger than or equal to i may not be monitored.

A User Equipment (UE) receiving downlink control information (DCI) in a wireless communication system based on one embodiment of the present disclosure may comprise one or more transceivers; one or more processors; and one or more memories storing instructions for operations executed by the one or more processors and being connected to the one or more processors, wherein the operations comprise receiving configuration information related to a search space; determining PDCCH candidates to be monitored within a plurality of search spaces, wherein the plurality of search spaces are configured for a plurality of control resource sets (CORESETs) based on the configuration information, and each search space includes one or more physical downlink control channel (PDCCH) candidates; monitoring the PDCCH candidates to be monitored; and receiving the DCI based on the monitoring, wherein a first limit and a second limit related to the number of the PDCCH candidates to be monitored are predefined, the first limit is a value configured for a serving cell, the second limit is a value configured for a CORESET group related to a CORESET in which each space is configured, and the number of PDCCH candidates to be monitored is smaller than or equal to the first limit and the second limit.

In a device including at least one or more memories and one or more processors functionally connected to the one or more memories based on one embodiment of the present disclosure, the one or more processors may be configured to control the device to receive configuration information related to a search space; determine PDCCH candidates to be monitored within a plurality of search spaces, wherein the plurality of search spaces are configured for a plurality of control resource sets (CORESETs) based on the configuration information, and each search space includes one or more physical downlink control channel (PDCCH) candidates; monitor the PDCCH candidates to be monitored; and receive the DCI based on the monitoring, wherein a first limit and a second limit related to the number of the PDCCH candidates to be monitored are predefined, the first limit is a value configured for a serving cell, the second limit is a value configured for a CORESET group related to a CORESET in which each space is configured, and the number of PDCCH candidates to be monitored is smaller than or equal to the first limit and the second limit.

In one or more non-transitory computer-readable media storing one or more instructions based on one embodiment of the present disclosure, the one or more instructions executable by one or more processors may comprise instructions instructing a User Equipment (UE) to receive configuration information related to a search space; determine PDCCH candidates to be monitored within a plurality of search spaces, wherein the plurality of search spaces are configured for a plurality of control resource sets (CORESETs) based on the configuration information, and each search space includes one or more physical downlink control channel (PDCCH) candidates; monitor the PDCCH candidates to be monitored; and receive the DCI based on the monitoring, wherein a first limit and a second limit related to the number of the PDCCH candidates to be monitored are predefined, the first limit is a value configured for a serving cell, the second limit is a value configured for a CORESET group related to a CORESET in which each space is configured, and the number of PDCCH candidates to be monitored is smaller than or equal to the first limit and the second limit.

A method of transmitting downlink control information (DCI) by a Base Station (BS) in a wireless communication system based on one embodiment of the present disclosure may comprise transmitting, to a User Equipment (UE), configuration information related to a search space, wherein a plurality of search spaces are configured for a plurality of control resource sets (CORESETs) based on the configuration information; and transmitting, to the UE, the DCI based on the plurality of CORESETs, wherein the DCI is transmitted through physical downlink control channel (PDCCH) candidates, a first limit and a second limit related to the number of the PDCCH candidates to be monitored are predefined, the first limit is a value configured for a serving cell, the second limit is a value configured for a CORESET group related to a CORESET in which each space is configured, and the number of PDCCH candidates to be monitored is smaller than or equal to the first limit and the second limit.

In a Base Station (BS) transmitting downlink control information (DCI) in a wireless communication system based on one embodiment of the present disclosure, the BS may comprise one or more transceivers; one or more processors; and one or more memories storing instructions for operations executed by the one or more processors and being connected to the one or more processors, wherein the operations comprise transmitting, to a User Equipment (UE), configuration information related to a search space, wherein a plurality of search spaces are configured for a plurality of control resource sets (CORESETs) based on the configuration information; and transmitting, to the UE, the DCI based on the plurality of CORESETs, wherein the DCI is transmitted through physical downlink control channel (PDCCH) candidates, a first limit and a second limit related to the number of the PDCCH candidates to be monitored are predefined, the first limit is a value configured for a serving cell, the second limit is a value configured for a CORESET group related to a CORESET in which each space is configured, and the number of PDCCH candidates to be monitored is smaller than or equal to the first limit and the second limit.

Advantageous Effects

Based on the embodiment of the present disclosure, downlink control information may be received from a plurality of TRPs.

Also, based on the embodiment of the present disclosure, PDCCH candidates for blind decoding/monitoring may be determined by taking into consideration a situation in which multiple TRPs transmit DCI separately.

Also, based on the embodiment of the present disclosure, the order of mapping PDCCH candidates based on the PDCCH candidates being determined may be determined unambiguously.

Also, based on the embodiment of the present disclosure, a limit value (for example, the maximum number of CCEs or the maximum number of PDCCH candidates) defined by a UE to determine PDCCH candidates may be configured by taking into consideration multiple TRPs.

Effects which may be obtained from the disclosure are not limited by the above effects, and other effects that have not been mentioned may be clearly understood from the following description by those skilled in the art to which the disclosure pertains.

DESCRIPTION OF DRAWINGS

The accompany drawings, which are included to provide a further understanding of the present disclosure and are incorporated on and constitute a part of this specification illustrate embodiments of the present disclosure and together with the description serve to explain the principles of the present disclosure.

FIG. 1 is a diagram illustrating an example of an overall system structure of NR to which a method proposed in the disclosure may be applied.

FIG. 2 illustrates a relationship between an uplink frame and a downlink frame in a wireless communication system to which a method proposed in the disclosure may be applied.

FIG. 3 illustrates an example of a frame structure in an NR system.

FIG. 4 illustrates an example of a resource grid supported by a wireless communication system to which a method proposed in the disclosure may be applied.

FIG. 5 illustrates examples of a resource grid for each antenna port and numerology to which a method proposed in the disclosure may be applied.

FIG. 6 illustrates physical channels and general signal transmission.

FIG. 7 illustrates an example of a downlink transmission/reception operation.

FIG. 8 illustrates an example of an uplink transmission/reception operation.

FIG. 9 illustrates an example of a transmission/reception method for improving reliability using transmission in multiple TRPs.

FIG. 10 shows an example of a signaling procedure in which data transmission and reception are performed between a network side and a UE when there are multiple TRPs to which methods and/or embodiments proposed in the present disclosure are applicable.

FIG. 11 illustrates one example of an operation flow diagram of a UE performing data transmission/reception applicable to a method and/or an embodiment based on the present disclosure.

FIG. 12 illustrates one example of an operation flow diagram of a BS performing data transmission/reception applicable to a method and/or an embodiment based on the present disclosure.

FIG. 13 illustrates a communication system applied to the disclosure.

FIG. 14 illustrates a wireless device which may be applied to the disclosure.

FIG. 15 illustrates a signal processing circuit for a transmit signal.

FIG. 16 illustrates another example of a wireless device applied to the disclosure.

FIG. 17 illustrates a portable device applied to the disclosure.

MODE FOR DISCLOSURE

Reference will now be made in detail to embodiments of the disclosure, examples of which are illustrated in the accompanying drawings. A detailed description to be disclosed below together with the accompanying drawing is to describe exemplary embodiments of the disclosure and not to describe a unique embodiment for carrying out the disclosure. The detailed description below includes details to provide a complete understanding of the disclosure. However, those skilled in the art know that the disclosure may be carried out without the details.

In some cases, in order to prevent a concept of the disclosure from being ambiguous, known structures and devices may be omitted or illustrated in a block diagram format based on core functions of each structure and device.

Hereinafter, downlink (DL) means communication from the base station to the terminal and uplink (UL) means communication from the terminal to the base station. In downlink, a transmitter may be part of the base station, and a receiver may be part of the terminal. In uplink, the transmitter may be part of the terminal and the receiver may be part of the base station. The base station may be expressed as a first communication device and the terminal may be expressed as a second communication device. A base station (BS) may be replaced with terms including a fixed station, a Node B, an evolved-NodeB (eNB), a Next Generation NodeB (gNB), a base transceiver system (BTS), an access point (AP), a network (5G network), an AI system, a road side unit (RSU), a vehicle, a robot, an Unmanned Aerial Vehicle (UAV), an Augmented Reality (AR) device, a Virtual Reality (VR) device, and the like. Further, the terminal may be fixed or mobile and may be replaced with terms including a User Equipment (UE), a Mobile Station (MS), a user terminal (UT), a Mobile Subscriber Station (MSS), a Subscriber Station (SS), an Advanced Mobile Station (AMS), a Wireless Terminal (VVT), a Machine-Type Communication (MTC) device, a Machine-to-Machine (M2M) device, and a Device-to-Device (D2D) device, the vehicle, the robot, an AI module, the Unmanned Aerial Vehicle (UAV), the Augmented Reality (AR) device, the Virtual Reality (VR) device, and the like.

The following technology may be used in various radio access system including CDMA, FDMA, TDMA, OFDMA, SC-FDMA, and the like. The CDMA may be implemented as radio technology such as Universal Terrestrial Radio Access (UTRA) or CDMA2000. The TDMA may be implemented as radio technology such as a global system for mobile communications (GSM)/general packet radio service (GPRS)/enhanced data rates for GSM evolution (EDGE). The OFDMA may be implemented as radio technology such as Institute of Electrical and Electronics Engineers (IEEE) 802.11 (Wi-Fi), IEEE 802.16 (WiMAX), IEEE 802.20, Evolved UTRA (E-UTRA), or the like. The UTRA is a part of Universal Mobile Telecommunications System (UMTS). 3rd Generation Partnership Project (3GPP) Long Term Evolution (LTE) is a part of Evolved UMTS (E-UMTS) using the E-UTRA and LTE-Advanced (A)/LTE-A pro is an evolved version of the 3GPP LTE. 3GPP NR (New Radio or New Radio Access Technology) is an evolved version of the 3GPP LTE/LTE-A/LTE-A pro.

For clarity of description, the technical spirit of the disclosure is described based on the 3GPP communication system (e.g., LTE-A or NR), but the technical spirit of the disclosure are not limited thereto. LTE means technology after 3GPP TS 36.xxx Release 8. In detail, LTE technology after 3GPP TS 36.xxx Release 10 is referred to as the LTE-A and LTE technology after 3GPP TS 36.xxx Release 13 is referred to as the LTE-A pro. The 3GPP NR means technology after TS 38.xxx Release 15. The LTE/NR may be referred to as a 3GPP system. "xxx" means a detailed standard document number. The LTE/NR may be collectively referred to as the 3GPP system. Matters disclosed in a standard document opened before the disclosure may be referred to for a background art, terms, omissions, etc., used for describing the disclosure. For example, the following documents may be referred to.

3GPP LTE
  36.211: Physical channels and modulation
  36.212: Multiplexing and channel coding
  36.213: Physical layer procedures
  36.300: Overall description
  36.331: Radio Resource Control (RRC)
3GPP NR
  38.211: Physical channels and modulation
  38.212: Multiplexing and channel coding
  38.213: Physical layer procedures for control
  38.214: Physical layer procedures for data
  38.300: NR and NG-RAN Overall Description
  36.331: Radio Resource Control (RRC) protocol specification As more and more communication devices require larger communication capacity, there is a need for improved mobile broadband communication compared to the existing radio access technology (RAT). Further, massive machine type communications (MTCs), which provide various services anytime and anywhere by connecting many devices and objects, are one of the major issues to be considered in the next generation communication. In addition, a communication system design considering a service/UE sensitive to reliability and latency is being discussed. The introduction of next generation radio access technology considering enhanced mobile broadband communication (eMBB), massive MTC (mMTC), ultra-reliable and low latency communication (URLLC) is discussed, and in the disclosure, the technology is called new RAT for convenience. The NR is an expression representing an example of 5G radio access technology (RAT).

Three major requirement areas of 5G include (1) an enhanced mobile broadband (eMBB) area, (2) a massive machine type communication (mMTC) area and (3) an ultra-reliable and low latency communications (URLLC) area.

Some use cases may require multiple areas for optimization, and other use case may be focused on only one key performance indicator (KPI). 5G support such various use cases in a flexible and reliable manner.

eMBB is far above basic mobile Internet access and covers media and entertainment applications in abundant bidirectional tasks, cloud or augmented reality. Data is one of key motive powers of 5G, and dedicated voice services may not be first seen in the 5G era. In 5G, it is expected that voice will be processed as an application program using a data connection simply provided by a communication system. Major causes for an increased traffic volume include an increase in the content size and an increase in the number of applications that require a high data transfer rate. Streaming service (audio and video), dialogue type video and mobile Internet connections will be used more widely as more devices are connected to the Internet. Such many application programs require connectivity always turned on in order to push real-time information and notification to a user. A cloud storage and application suddenly increases in the mobile communication platform, and this may be applied to both business and entertainment. Furthermore, cloud storage is a special use case that tows the growth of an uplink data transfer rate. 5G is also used for remote business of cloud. When a tactile interface is used, further lower end-to-end latency is required to maintain excellent user experiences. Entertainment, for example, cloud game and video streaming are other key elements which increase a need for the mobile broadband ability. Entertainment is essential in the smartphone and tablet anywhere including high mobility environments, such as a train, a vehicle and an airplane. Another use case is augmented reality and information search for entertainment. In this case, augmented reality requires very low latency and an instant amount of data.

Furthermore, one of the most expected 5G use case relates to a function capable of smoothly connecting embedded sensors in all fields, that is, mMTC. Until 2020, it is expected that potential IoT devices will reach 20.4 billions. The industry IoT is one of areas in which 5G performs major roles enabling smart city, asset tracking, smart utility, agriculture and security infra.

URLLC includes a new service which will change the industry through remote control of major infra and a link having ultra-reliability/low available latency, such as a self-driving vehicle. A level of reliability and latency is essential for smart grid control, industry automation, robot engineering, drone control and adjustment.

Multiple use cases are described more specifically.

5G may supplement fiber-to-the-home (FTTH) and cable-based broadband (or DOCSIS) as means for providing a stream evaluated from gigabits per second to several hundreds of mega bits per second. Such fast speed is necessary to deliver TV with resolution of 4K or more (6K, 8K or more) in addition to virtual reality and augmented reality. Virtual reality (VR) and augmented reality (AR) applications include immersive sports games. A specific application program may require a special network configuration. For example, in the case of VR game, in order for game companies to minimize latency, a core server may need to be integrated with the edge network server of a network operator.

An automotive is expected to be an important and new motive power in 5G, along with many use cases for the mobile communication of an automotive. For example, entertainment for a passenger requires a high capacity and a high mobility mobile broadband at the same time. The reason for this is that future users continue to expect a high-quality connection regardless of their location and speed. Another use example of the automotive field is an augmented reality dashboard. The augmented reality dashboard overlaps and displays information, identifying an object in the dark and notifying a driver of the distance and movement of the object, over a thing seen by the driver through a front window. In the future, a wireless module enables communication between automotives, information exchange between an automotive and a supported infrastructure, and information exchange between an automotive and other connected devices (e.g., devices accompanied by a pedestrian). A safety system guides alternative courses of a behavior so that a driver may drive more safely, thereby reducing a danger of an accident. A next step will be a remotely controlled or self-driven vehicle. This requires very reliable, very fast communication between different self-driven vehicles and between an automotive and infra. In the future, a self-driven vehicle may perform all driving activities, and a driver will be focused on things other than traffic, which cannot be identified by an automotive itself. Technical requirements of a self-driven vehicle require ultra-low latency and ultra-high speed reliability so that traffic safety is increased up to a level which cannot be achieved by a person.

A smart city and smart home mentioned as a smart society will be embedded as a high-density radio sensor network. The distributed network of intelligent sensors will identify the cost of a city or home and a condition for energy-efficient maintenance. A similar configuration may be performed for each home. All of a temperature sensor, a window and heating controller, a burglar alarm and home appliances are wirelessly connected. Many of such sensors are typically a low data transfer rate, low energy and a low cost. However, for example, real-time HD video may be required for a specific type of device for surveillance.

The consumption and distribution of energy including heat or gas are highly distributed and thus require automated control of a distributed sensor network. A smart grid collects information, and interconnects such sensors using digital information and a communication technology so that the sensors operate based on the information. The information may include the behaviors of a supplier and consumer, and thus the smart grid may improve the distribution of fuel, such as electricity, in an efficient, reliable, economical, production-sustainable and automated manner. The smart grid may be considered to be another sensor network having small latency.

A health part owns many application programs which reap the benefits of mobile communication. A communication system may support remote treatment providing clinical treatment at a distant place. This helps to reduce a barrier for the distance and may improve access to medical services which are not continuously used at remote farming areas. Furthermore, this is used to save life in important treatment and an emergency condition. A radio sensor network based on mobile communication may provide remote monitoring and sensors for parameters, such as the heart rate and blood pressure.

Radio and mobile communication becomes increasingly important in the industry application field. Wiring requires a high installation and maintenance cost. Accordingly, the possibility that a cable will be replaced with reconfigurable radio links is an attractive opportunity in many industrial fields. However, to achieve the possibility requires that a radio connection operates with latency, reliability and capacity similar to those of the cable and that management is simplified. Low latency and a low error probability is a new requirement for a connection to 5G.

Logistics and freight tracking is an important use case for mobile communication, which enables the tracking inventory and packages anywhere using a location-based information system. The logistics and freight tracking use case typically requires a low data speed, but a wide area and reliable location information.

In a new RAT system including NR uses an OFDM transmission scheme or a similar transmission scheme thereto. The new RAT system may follow OFDM parameters different from OFDM parameters of LTE. Alternatively, the new RAT system may follow numerology of conventional LTE/LTE-A as it is or have a larger system bandwidth (e.g., 100 MHz). Alternatively, one cell may support a plurality of numerologies. In other words, UEs that operate with different numerologies may coexist in one cell.

The numerology corresponds to one subcarrier spacing in a frequency domain. Different numerologies may be defined by scaling reference subcarrier spacing to an integer N.

Definition of Terms eLTE eNB: The eLTE eNB is the evolution of eNB that supports connectivity to EPC and NGC.

gNB: A node which supports the NR as well as connectivity to NGC.

New RAN: A radio access network which supports either NR or E-UTRA or interfaces with the NGC.

Network slice: A network slice is a network created by the operator customized to provide an optimized solution for a specific market scenario which demands specific requirements with end-to-end scope.

Network function: A network function is a logical node within a network infrastructure that has well-defined external interfaces and well-defined functional behavior.

NG-C: A control plane interface used on NG2 reference points between new RAN and NGC.

NG-U: A user plane interface used on NG3 references points between new RAN and NGC.

Non-standalone NR: A deployment configuration where the gNB requires an LTE eNB as an anchor for control plane connectivity to EPC, or requires an eLTE eNB as an anchor for control plane connectivity to NGC.

Non-standalone E-UTRA: A deployment configuration where the eLTE eNB requires a gNB as an anchor for control plane connectivity to NGC.

User plane gateway: A termination point of NG-U interface.

Overview of System

FIG. 1 illustrates an example of an overall structure of a NR system to which a method proposed in the disclosure is applicable.

Referring to FIG. 1, an NG-RAN consists of gNBs that provide an NG-RA user plane (new AS sublayer/PDCP/RLC/MAC/PHY) and control plane (RRC) protocol terminations for a user equipment (UE).

The gNBs are interconnected with each other by means of an Xn interface.

The gNBs are also connected to an NGC by means of an NG interface.

More specifically, the gNBs are connected to an access and mobility management function (AMF) by means of an N2 interface and to a user plane function (UPF) by means of an N3 interface.

NR(New Rat) Numerology and Frame Structure

In the NR system, multiple numerologies may be supported. The numerologies may be defined by subcarrier spacing and a CP (Cyclic Prefix) overhead. Spacing between the plurality of subcarriers may be derived by scaling basic subcarrier spacing into an integer N (or µ). In addition, although a very low subcarrier spacing is assumed not to be used at a very high subcarrier frequency, a numerology to be used may be selected independent of a frequency band.

In addition, in the NR system, a variety of frame structures according to the multiple numerologies may be supported.

Hereinafter, an orthogonal frequency division multiplexing (OFDM) numerology and a frame structure, which may be considered in the NR system, will be described.

A plurality of OFDM numerologies supported in the NR system may be defined as in Table 1.

TABLE 1

| µ | $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

The NR supports multiple numerologies (or subcarrier spacing (SCS)) for supporting various 5G services. For example, when the SCS is 15 kHz, a wide area in traditional cellular bands is supported and when the SCS is 30 kHz/60 kHz, dense-urban, lower latency, and wider carrier bandwidth are supported, and when the SCS is more than 60 kHz, a bandwidth larger than 24.25 GHz is supported in order to overcome phase noise.

An NR frequency band is defined as frequency ranges of two types (FR1 and FR2). FR1 and FR2 may be configured as shown in Table 2 below. Further, FR2 may mean a millimeter wave (mmW).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Regarding a frame structure in the NR system, a size of various fields in the time domain is expressed as a multiple of a time unit of $T_s=1/(\Delta f_{max} \cdot N_f)$. In this case, $\Delta f_{max}=480 \cdot 10^3$, and $N_f=4096$. DL and UL transmission is configured as a radio frame having a section of $T_f=(\Delta f_{max} N_f/100) \cdot T_s=10$ ms. The radio frame is composed of ten subframes each having a section of $T_{sf}=(\Delta f_{max} N_f/1000) \cdot T_s=1$ ms. In this case, there may be a set of UL frames and a set of DL frames.

FIG. 2 illustrates a relation between an uplink frame and a downlink frame in a wireless communication system to which a method proposed in the disclosure is applicable.

As illustrated in FIG. 2, uplink frame number i for transmission from a user equipment (UE) shall start $T_{TA}=N_{TA}T_s$ before the start of a corresponding downlink frame at the corresponding UE.

Regarding the numerology µ, slots are numbered in increasing order of $n_s^\mu \in \{0, \ldots, N_{subframe}^{slots,\mu}-1\}$ within a subframe and are numbered in increasing order of $n_{s,f}^\mu \in \{0, \ldots, N_{frame}^{slots,\mu}-1\}$ within a radio frame. One slot consists of consecutive OFDM symbols of $N_{symb}^\mu$, and $N_{symb}^\mu$ is determined depending on a numerology used and slot configuration. The start of slots $n_s^\mu$ in a subframe is aligned in time with the start of OFDM symbols $n_s^\mu N_{symb}^\mu$ in the same subframe.

Not all UEs are able to transmit and receive at the same time, and this means that not all OFDM symbols in a downlink slot or an uplink slot are available to be used.

Table 3 represents the number $N_{symb}^{slot}$ of OFDM symbols per slot, the number $N_{slot}^{frame,\mu}$ of slots per radio frame, and the number $N_{slot}^{subframe,\mu}$ of slots per subframe in a normal CP. Table 4 represents the number of OFDM symbols per slot, the number of slots per radio frame, and the number of slots per subframe in an extended CP.

TABLE 3

| µ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 4

| µ | $N_{symb}^{slot}$ | $N_{slot}^{frame,\mu}$ | $N_{slot}^{subframe,\mu}$ |
|---|---|---|---|
| 2 | 12 | 40 | 4 |

FIG. 3 illustrates an example of a frame structure in a NR system. FIG. 3 is merely for convenience of explanation and does not limit the scope of the disclosure.

In Table 4, in case of µ=2, i.e., as an example in which a subcarrier spacing (SCS) is 60 kHz, one subframe (or frame) may include four slots with reference to Table 3, and one subframe={1, 2, 4} slots shown in FIG. 3, for example, the number of slot(s) that may be included in one subframe may be defined as in Table 3.

Further, a mini-slot may consist of 2, 4, or 7 symbols, or may consist of more symbols or less symbols.

In regard to physical resources in the NR system, an antenna port, a resource grid, a resource element, a resource block, a carrier part, etc. May be considered.

Hereinafter, the above physical resources that may be considered in the NR system are described in more detail.

First, in regard to an antenna port, the antenna port is defined so that a channel over which a symbol on an antenna port is conveyed may be inferred from a channel over which another symbol on the same antenna port is conveyed. When large-scale properties of a channel over which a symbol on one antenna port is conveyed may be inferred from a channel over which a symbol on another antenna port is conveyed, the two antenna ports may be regarded as being in a quasi co-located or quasi co-location (QC/QCL) relation. Here, the large-scale properties may include at least one of delay spread, Doppler spread, frequency shift, average received power, and received timing.

FIG. 4 illustrates an example of a resource grid supported in a wireless communication system to which a method proposed in the disclosure is applicable.

Referring to FIG. 4, a resource grid consists of $N_{RB}^{\mu} N_{sc}^{RB}$ subcarriers on a frequency domain, each subframe consisting of $14 \cdot 2\mu$ OFDM symbols, but the disclosure is not limited thereto.

In the NR system, a transmitted signal is described by one or more resource grids, consisting of $N_{RB}^{\mu} N_{sc}^{RB}$ subcarriers, and $2^{\mu} N_{symb}^{(\mu)}$ OFDM symbols, where $N_{RB}^{\mu} \leq N_{RB}^{max,\mu}$. $N_{RB}^{max,\mu}$ denotes a maximum transmission bandwidth and may change not only between numerologies but also between uplink and downlink.

In this case, as illustrated in FIG. 5, one resource grid may be configured per numerology μ and antenna port p.

FIG. 5 illustrates examples of a resource grid per antenna port and numerology to which a method proposed in the disclosure is applicable.

Each element of the resource grid for the numerology μ and the antenna port p is called a resource element and is uniquely identified by an index pair (k,l̄), where k=0, ..., $N_{RB}^{\mu} N_{sc}^{RB}-1$ is an index on a frequency domain, and l̄=0, ..., $2^{\mu} N_{symb}^{(\mu)}-1$ refers to a location of a symbol in a subframe. The index pair (k,l) is used to refer to a resource element in a slot, where l=0, ..., $N_{symb}^{\mu}-1$.

The resource element (k,l̄) for the numerology μ and the antenna port p corresponds to a complex value $a_{k,\bar{l}}^{(p,\mu)}$. When there is no risk for confusion or when a specific antenna port or numerology is not specified, the indices p and μ may be dropped, and as a result, the complex value may be $a_{k,\bar{l}}^{(p)}$ or $a_{k,\bar{l}}$.

Further, a physical resource block is defined as $N_{sc}^{RB}=12$ consecutive subcarriers in the frequency domain.

Point A serves as a common reference point of a resource block grid and may be obtained as follows.

offsetToPointA for PCell downlink represents a frequency offset between the point A and a lowest subcarrier of a lowest resource block that overlaps a SS/PBCH block used by the UE for initial cell selection, and is expressed in units of resource blocks assuming 15 kHz subcarrier spacing for FR1 and 60 kHz subcarrier spacing for FR2;

absoluteFrequencyPointA represents frequency-location of the point A expressed as in absolute radio-frequency channel number (ARFCN);

The common resource blocks are numbered from 0 and upwards in the frequency domain for subcarrier spacing configuration μ.

The center of subcarrier 0 of common resource block 0 for the subcarrier spacing configuration μ coincides with "point A". A common resource block number $n_{CRB}^{\mu}$ in the frequency domain and resource elements (k, l) for the subcarrier spacing configuration μ may be given by the following Equation 1.

$$n_{CRB}^{\mu} = \left\lfloor \frac{k}{N_{sc}^{RB}} \right\rfloor \quad \text{[Equation 1]}$$

Here, k may be defined relative to the point A so that k=0 corresponds to a subcarrier centered around the point A. Physical resource blocks are defined within a bandwidth part (BWP) and are numbered from 0 to $N_{BWP,i}^{size}-1$, where i is No. Of the BWP. A relation between the physical resource block $n_{PRB}$ in BWP i and the common resource block $n_{CRB}$ may be given by the following Equation 2.

$$n_{CRB} = n_{PRB} + N_{BWP,i}^{start} \quad \text{[Equation 2]}$$

Here, $N_{BWP,i}^{start}$ may be the common resource block where the BWP starts relative to the common resource block 0.

Bandwidth Part (BWP)

The NR system may support up to 400 MHz per component carrier (CC). If a UE which operates in wideband CC operates while continuously turning on RF for all CCs, UE battery consumption may increase. Alternatively, when several use cases (e.g., eMBB, URLLC, mMTC, V2X, etc.) which operate in one wideband CC are considered, different numerologies (e.g., sub-carrier spacing) may be supported for each frequency band in the corresponding CC. Alternatively, a capability for the maximum bandwidth may vary for each UE. By considering this, the BS may instruct the UE to operate only in a partial bandwidth rather than the entire bandwidth of the wideband CC and intends to define the corresponding partial bandwidth as the bandwidth part (BWP) for convenience. The BWP may consist of consecutive resource blocks (RBs) on the frequency axis and may correspond to one numerology (e.g., sub-carrier spacing, CP length, slot/mini-slot duration).

A base station may configure multiple BWPs even within one CC configured to the UE. As one example, a BWP occupying a relatively small frequency domain may be configured in a PDCCH monitoring slot, and a PDSCH indicated in PDCCH may be scheduled onto a BWP larger than this. Alternatively, when UEs are concentrated on a specific BWP, some UEs may be configured with other BWPs for load balancing. Alternatively, considering frequency domain inter-cell interference cancellation between neighboring cells, a partial spectrum of the entire bandwidth may be excluded and both BWPs may be configured even in the same slot. That is, the base station may configure at least one DL/UL BWP to the UE associated with the wideband CC and may activate at least one DL/UL BWP (by L1 signaling or MAC CE or RRC signaling) among configured DL/UL BWP(s) at a specific time, and switching may be indicated to another configured DL/UL BWP (by L1 signaling or MAC CE or RRC signaling) or a timer value may be switched to the fixed DL/UL BWP when a timer value is expired based on a timer. In this case, the activated DL/UL BWP is defined as an active DL/UL BWP. However, in a situation in which the UE is in an initial access process or before RRC connection is set up, the UE may not receive a configuration for the DL/UL BWP and in such a situation, the DL/UL BWP assumed by the UE is defined as an initial active DL/UL BWP.

Physical Channel and General Signal Transmission

FIG. 6 illustrates physical channels and general signal transmission. In a wireless communication system, the UE receives information from the eNB through Downlink (DL) and the UE transmits information from the eNB through Uplink (UL). The information which the eNB and the UE transmit and receive includes data and various control information and there are various physical channels according to a type/use of the information which the eNB and the UE transmit and receive.

When the UE is powered on or newly enters a cell, the UE performs an initial cell search operation such as synchronizing with the eNB (S601). To this end, the UE may receive a Primary Synchronization Signal (PSS) and a (Secondary Synchronization Signal (SSS) from the eNB and synchronize with the eNB and acquire information such as a cell ID or the like. Thereafter, the UE may receive a Physical Broadcast Channel (PBCH) from the eNB and acquire in-cell broadcast information. Meanwhile, the UE receives a Downlink Reference Signal (DL RS) in an initial cell search step to check a downlink channel status.

A UE that completes the initial cell search receives a Physical Downlink Control Channel (PDCCH) and a Physical Downlink Control Channel (PDSCH) according to information loaded on the PDCCH to acquire more specific system information (S602).

Meanwhile, when there is no radio resource first accessing the eNB or for signal transmission, the UE may perform a Random Access Procedure (RACH) to the eNB (S603 to S606). To this end, the UE may transmit a specific sequence to a preamble through a Physical Random Access Channel (PRACH) (S603 and S605) and receive a response message (Random Access Response (RAR) message) for the preamble through the PDCCH and a corresponding PDSCH. In the case of a contention based RACH, a Contention Resolution Procedure may be additionally performed (S606).

The UE that performs the above procedure may then perform PDCCH/PDSCH reception (S607) and Physical Uplink Shared Channel (PUSCH)/Physical Uplink Control Channel (PUCCH) transmission (S608) as a general uplink/downlink signal transmission procedure. In particular, the UE may receive Downlink Control Information (DCI) through the PDCCH. Here, the DCI may include control information such as resource allocation information for the UE and formats may be differently applied according to a use purpose.

For example, in an NR system, DCI format 0_0 and DCI format 0_1 are used for scheduling of PUSCH in one cell, and DCI format 1_0 and DCI format 1_1 are used for scheduling PDSCH in one cell. Information included in DCI format 0_0 is CRC scrambled by C-RNTI or CS-RNTI or MCS-C-RNTI and transmitted. And, DCI format 0_1 is used for reserving PUSCH in one cell. Information included in DCI format 0_1 may be CRC scrambled by C-RNTI or CS-RNTI or SP-CSI-RNTI or MCS-C-RNTI and transmitted. DCI format 1_0 is used for scheduling PDSCH in one DL cell. Information included in DCI format 1_0 is CRC scrambled by C-RNTI or CS-RNTI or MCS-C-RNTI and transmitted. DCI format 1_1 is used for scheduling PDSCH in one cell. Information included in DCI format 1_1 is CRC scrambled by C-RNTI or CS-RNTI or MCS-C-RNTI and transmitted. DCI format 2_1 is used to inform PRB(s) and OFDM symbol(s) that the UE may assume that transmission is not intended. The following information included in DCI format 2_1 such as preemption indication 1, preemption indication 2, . . . , preemption indication N is CRC scrambled by INT-RNTI and transmitted.

Meanwhile, the control information which the UE transmits to the eNB through the uplink or the UE receives from the eNB may include a downlink/uplink ACK/NACK signal, a Channel Quality Indicator (CQI), a Precoding Matrix Index (PMI), a Rank Indicator (RI), and the like. The UE may transmit the control information such as the CQI/PMI/RI, etc., through the PUSCH and/or PUCCH.

DL and UL Transmission/Reception Operation

DL Transmission/Reception Operation

FIG. 7 illustrates an example of a downlink transmission and reception operation.

Referring to FIG. 7, the eNB may schedule downlink transmission such as the frequency/time resource, the transport layer, an downlink precoder, the MCS, etc., (S701). Specifically, the eNB may determine a beam for PDSCH transmission to the UE. In addition, the UE may receive Downlink Control Information (DCI) for downlink scheduling (i.e., including scheduling information of the PDSCH) on the PDCCH (S702). DCI format 1_0 or DCI format 1_1 may be used for the downlink scheduling and specifically, DCI format 1_1 may include information such as the following examples: Identifier for DCI formats, Bandwidth part indicator, Frequency domain resource assignment, Time domain resource assignment, PRB bundling size indicator, Rate matching indicator, ZP CSI-RS trigger, Antenna port(s), Transmission configuration indication (TCI), SRS request, and Demodulation Reference Signal (DMRS) sequence initialization.

In particular, according to each state indicated in an antenna port(s) field, the number of DMRS ports may be scheduled, and single-user (SU)/Multi-user (MU) transmission scheduling is also available. In addition, the TCI field consists of 3 bits, and the QCL for the DMRS may be dynamically indicated by indicating a maximum of 8 TCI states according to the TCI field value. The UE may receive downlink data from the base station on the PDSCH (S703). When the UE detects a PDCCH including DCI format 1_0 or 1_1, the UE may decode the PDSCH according to an indication by the corresponding DCI.

Here, when the UE receives a PDSCH scheduled by DCI format 1_1, a DMRS configuration type may be configured by higher layer parameter "dmrs-Type" in the UE and the DMRS type is used for receiving the PDSCH. Further, in the UE, the maximum number of front-loaded DMRS symbols for the PDSCH may be configured by higher layer parameter "maxLength."

In the case of DMRS configuration type 1, when a single codeword is scheduled and an antenna port mapped to an index of {2, 9, 10, 11, or 30} is designated in the UE or when two codewords are scheduled in the UE, the UE assumes that all remaining orthogonal antenna ports are not associated with PDSCH transmission to another UE. Alternatively, in the case of DMRS configuration type 2, when a single codeword is scheduled and an antenna port mapped to an index of {2, 10, or 23} is designated in the UE or when two codewords are scheduled in the UE, the UE assumes that all remaining orthogonal antenna ports are not related to PDSCH transmission to another UE.

When the UE receives the PDSCH, a precoding granularity P' may be assumed as a consecutive resource block in the frequency domain. Here, P' may correspond to one value of {2, 4, and wideband}. When P' is determined as wideband, the UE does not predict that the PDSCH is scheduled to non-contiguous PRBs and the UE may assume that the same precoding is applied to the allocated resource. On the contrary, when P' is determined as any one of {2 and 4}, a Precoding Resource Block (PRG) is split into P' consecutive PRBs. The number of actually consecutive PRBs in each PRG may be one or more. The UE may assume that the same precoding is applied to consecutive downlink PRBs in the PRG.

In order to determine a modulation order in the PDSCH, a target code rate, and a transport block size, the UE may first read a 5-bit MCD field in the DCI and determine the modulation order and the target code rate. In addition, the UE may read a redundancy version field in the DCI and determine a redundancy version. In addition, the UE may determine the transport block size by using the number of layers before rate matching and the total number of allocated PRBs.

A transport block may be made up of one or more code block groups (CBG), and one CBG may be made up of one or more code blocks (CB). Also, in an NR system, data transmission and reception may be performed for each CB/CBG as well as for each transport block. Accordingly, ACK/NACK transmission and retransmission per CB/CBG also may be possible. The UE may receive information on CB/CBG from the base station through a DCI (e.g., DCI format 0_1 and DCI format 1_1). Also, the UE may receive information on a data transmission unit (e.g., TB/CB/CBG) from the base station.

UL Transmission/Reception Operation

FIG. 8 illustrates an example of an uplink transmission and reception operation.

Referring to the FIG. 8, the eNB may schedule uplink transmission such as the frequency/time resource, the transport layer, an uplink precoder, the MCS, etc., (S801). In particular, the eNB may determine a beam for PUSCH transmission of the UE through the beam management operations described above. And, the UE may receive, from the eNB, DCI for uplink scheduling (i.e., including scheduling information of the PUSCH) on the PDCCH (S802). DCI format 0_0 or 0_1 may be used for the uplink scheduling and in particular, DCI format 0_1 may include information such as the following examples: Identifier for DCI formats, UL/Supplementary uplink (SUL) indicator, Bandwidth part indicator, Frequency domain resource assignment, Time domain resource assignment, Frequency hopping flag, Modulation and coding scheme (MCS), SRS resource indicator (SRI), Precoding information and number of layers, Antenna port(s), SRS request, DMRS sequence initialization, and Uplink Shared Channel (UL-SCH) indicator.

In particular, configured SRS resources in an SRS resource set associated with higher layer parameter "usage" may be indicated by an SRS resource indicator field. Further, "spatialRelationInfo" may be configured for each SRS resource and a value of "spatialRelationInfo" may be one of {CRI, SSB, and SRI}.

In addition, the UE may transmit the uplink data to the eNB on the PUSCH (S803). When the UE detects a PDCCH including DCI format 0_0 or 0_1, the UE may transmit the corresponding PUSCH according to the indication by the corresponding DCI. two schemes (Codebook based transmission scheme and non-codebook based transmission scheme) are supported for PUSCH transmission.

In the case of the codebook based transmission, when higher layer parameter txConfig" is set to "codebook", the UE is configured to the codebook based transmission. On the contrary, when higher layer parameter txConfig" is set to "nonCodebook", the UE is configured to the non-codebook based transmission. When higher layer parameter "txConfig" is not configured, the UE does not predict that the PUSCH is scheduled by DCI format 0_1. When the PUSCH is scheduled by DCI format 0_0, the PUSCH transmission is based on a single antenna port. In the case of the codebook based transmission, the PUSCH may be scheduled by DCI format 0_0, DCI format 0_1, or semi-statically. When the PUSCH is scheduled by DCI format 0_1, the UE determines a PUSCH transmission precoder based on the SRI, the Transmit Precoding Matrix Indicator (TPMI), and the transmission rank from the DCI as given by the SRS resource indicator and the Precoding information and number of layers field. The TPMI is used for indicating a precoder to be applied over the antenna port and when multiple SRS resources are configured, the TPMI corresponds to the SRS resource selected by the SRI. Alternatively, when the single SRS resource is configured, the TPMI is used for indicating the precoder to be applied over the antenna port and corresponds to the corresponding single SRS resource. A transmission precoder is selected from an uplink codebook having the same antenna port number as higher layer parameter "nrofSRS-Ports". When the UE is set to higher layer parameter "txConfig" set to "codebook", at least one SRS resource is configured in the UE. An SRI indicated in slot n is associated with most recent transmission of the SRS resource identified by the SRI and here, the SRS resource precedes PDCCH (i.e., slot n) carrying the SRI.

In the case of the non-codebook based transmission, the PUSCH may be scheduled by DCI format 0_0, DCI format 0_1, or semi-statically. When multiple SRS resources are configured, the UE may determine the PUSCH precoder and the transmission rank based on a wideband SRI and here, the SRI is given by the SRS resource indicator in the DCI or given by higher layer parameter "srs-ResourceIndicator". The UE may use one or multiple SRS resources for SRS transmission and here, the number of SRS resources may be configured for simultaneous transmission in the same RB based on the UE capability. Only one SRS port is configured for each SRS resource. Only one SRS resource may be configured to higher layer parameter "usage" set to "non-Codebook". The maximum number of SRS resources which may be configured for non-codebook based uplink transmission is 4. The SRI indicated in slot n is associated with most recent transmission of the SRS resource identified by the SRI and here, the SRS transmission precedes PDCCH (i.e., slot n) carrying the SRI.

Quasi-Co Location (QCL)

The antenna port is defined so that a channel over which a symbol on an antenna port is conveyed may be inferred from a channel over which another symbol on the same antenna port is conveyed. When properties of a channel over which a symbol on one antenna port is conveyed may be inferred from a channel over which a symbol on another antenna port is conveyed, the two antenna ports may be considered as being in a quasi co-located or quasi co-location (QC/QCL) relationship.

The channel properties include one or more of delay spread, Doppler spread, frequency/Doppler shift, average received power, received timing/average delay, and spatial RX parameter. The spatial Rx parameter means a spatial (reception) channel property parameter such as an angle of arrival.

The UE may be configured with a list of up to M TCI-State configurations within the higher layer parameter PDSCH-Config to decode PDSCH according to a detected PDCCH with DCI intended for the corresponding UE and a given serving cell, where M depends on UE capability.

Each TCI-State contains parameters for configuring a quasi co-location relationship between one or two DL reference signals and the DM-RS ports of the PDSCH.

The quasi co-location relationship is configured by the higher layer parameter qcl-Type1 for the first DL RS and qcl-Type2 for the second DL RS (if configured). For the case of two DL RSs, the QCL types are not be the same, regardless of whether the references are to the same DL RS or different DL RSs.

The quasi co-location types corresponding to each DL RS are given by the higher layer parameter qcl-Type of QCL-Info and may take one of the following values:

'QCL-TypeA': {Doppler shift, Doppler spread, average delay, delay spread}
'QCL-TypeB': {Doppler shift, Doppler spread}
'QCL-TypeC': {Doppler shift, average delay}
'QCL-TypeD': {Spatial Rx parameter}

For example, if a target antenna port is a specific NZP CSI-RS, the corresponding NZP CSI-RS antenna ports may be indicated/configured to be QCLed with a specific TRS in terms of QCL-TypeA and with a specific SSB in terms of QCL-TypeD. The UE receiving the indication/configuration may receive the corresponding NZP CSI-RS using the Doppler or delay value measured in the QCL-TypeA TRS and apply the Rx beam used for QCL-TypeD SSB reception to the reception of the corresponding NZP CSI-RS reception.

The UE may receive an activation command by MAC CE signaling used to map up to eight TCI states to the codepoint of the DCI field 'Transmission Configuration Indication'.

In relation to the beam indication, the UE may be RRC-configured with a list for up to M candidate Transmission Configuration Indication (TCI) states for the purpose of at least Quasi Co-location (QCL) indication, where M may be 64.

Each TCI state may be configured in one RS set. IDs of each DL RS for the purpose of spatial QCL (QCL Type D) at least in the RS set may refer to one of DL RS types such as SSB, P-CSI RS, SP-CSI RS, and A-CSI RS.

Initialization/update for the ID of DL RS(s) in the RS set that are used at least for the purpose of spatial QCL may be performed at least by explicit signaling.

The TCI-State IE associates one or two DL reference signals (RS) with a corresponding quasi co-location (QCL) type. The TCI-State IE may include parameters such as bwp-Id/reference signal/QCL type.

A bwp-Id parameter indicates DL BWP where RS is positioned, a cell parameter indicates a carrier where RS is positioned, a reference signal parameter indicates a reference antenna port(s) that is a source of quasi co-location for a corresponding target antenna port(s), or a reference signal including it. The target antenna port(s) may be CSI-RS, PDCCH DMRS, or PDSCH DMRS. For example, a corresponding TCI state ID may be indicated to NZP CSI-RS resource configuration information to indicate QCL reference RS information for NZP CSI-RS. As another example, a TCI state ID may be indicated in each CORESET configuration to indicate QCL reference information for the PDCCH DMRS antenna port(s). As another example, a TCI state ID may be indicated through DCI to indicate QCL reference information for the PDSCH DMRS antenna port(s).

The descriptions (e.g., 3GPP system, frame structure, DL and UL transmission and reception, etc.) given above may be applied/used in combination with methods and/or embodiments proposed in the present disclosure or may be supplemented to clarify technical features of the methods proposed in the present disclosure. In the present disclosure, the presence of a slash "/" may indicate that all or only some of words or phrases separated by/are included.

Multiple Transmission and Reception Point (TRP)-Related Operation

The coordinated multi point (CoMP) technique is a scheme in a plurality of base stations exchange (e.g., use X2 interface) or utilize channel information (e.g., RI/CQI/PMI/LI, etc.) fed back from the user equipment (UE) to perform cooperative transmission with the UE, thereby effectively controlling interference. According to the scheme used, the cooperative transmission may be divided into joint transmission (JT), coordinated scheduling (CS), coordinated beamforming (CB), dynamic point selection (DPS), dynamic point blacking (DPB), and the like.

Non-coherent joint transmission (NCJT) may refer to cooperative transmission that does not consider interference (that is, with no interference). For example, the NCJT may be a scheme in which a base station(s) transmits data to one UE through multiple TRPs by using the same time resource and frequency resource. In this scheme, the multiple TRPs of the base station(s) may be configured to transmit data to UE through different layers by using different demodulation reference signal (DMRS) ports. In other words, the NCJT may correspond to a transmission scheme in which transmission of a MIMO layer(s) from two or more TRPs is performed without adaptive precoding between the TRPs.

The NCJT is divided into fully overlapped NCJT in which time-frequency resources transmitted by each TRP fully overlap with each other and partially overlapped NCJT in which only a portion of time-frequency resources overlap with each other. In other words, in the case of the partially overlapped NCJT, transmission data of TRP1 and TRP2 are all transmitted on a portion of time-frequency resources, but only one of the TRP1 or the TRP2 is allowed to transmit data on the remaining time-frequency resources.

TRP transmits data scheduling information to an NCJT receiving UE as DCI (Downlink Control Information). From the perspective of downlink control information (DCI) transmission, M-TRP (multiple TRP) transmission may be divided into i) M-DCI (multiple DCI) based M-TRP transmission in which each TRP transmits a different DCI and ii) S-DCI (single DCI) based M-TRP transmission in which one TRP transmits DCI.

Firstly, the single DCI based MTRP scheme will be described. In the single DCI based MTRP scheme in which a representative TRP transmits scheduling information for data transmitted by itself and data transmitted by another TRP through one DCI, MTRPs cooperatively transmit one common PDSCH and each TRP participating in the cooperative transmission spatially divides the corresponding PDSCH into different layers (i.e., different DMRS ports). In other words, MTRPs transmit one PDSCH but each TRP transmits only some of multiple layers of the PDSCH. For example, when 4-layer data is transmitted, TRP 1 transmits 2 layers, and TRP 2 transmits the remaining 2 layers to the UE.

In this case, scheduling information for the PDSCH is indicated to the UE through one DCI, and the corresponding DCI indicates which DMRS port uses information of which QCL RS and QCL type (which is different from conventionally indicating the QCL RS and TYPE that are commonly applied to all DMRS ports indicated by the DCI). That is, M TCI states (M=2 for 2 TRP cooperative transmission) are indicated through the TCI field in the DCI, and the QCL RS and type are identified by using M TCI states which are different for M DMRS port groups. Also, DMRS port information may be indicated by using a new DMRS table.

As an example, in the case of the S-DCI, since all scheduling information for data transmitted by M TRPs should be delivered through one DCI, the S-DCI may be used in an ideal backhaul (BH) environment in which two TRPs may be dynamically coordinated with each other.

Secondly, the multiple DCI based MTRP method will be described. MTRPs transmit different DCIs and PDSCHs, respectively (the UE receives N DCIs and N PDSCHs from N TRPs), and the corresponding PDSCHs are transmitted by (partially or wholly) overlapping on different time resources. The corresponding PDSCHs are transmitted through different scrambling IDs, and the corresponding DCIs may be transmitted through Coresets belonging to different Coreset groups (A coreset group may be identified as an index defined in the coreset configuration of each Coreset. For example, if Coresets 1 and 2 are set to index=0 and Coresets 3 and 4 are set to index=1, Coresets 1 and 2 belong to Coreset group 0 and Coresets 3 and 4 belong to Coreset group 1. If no index is defined for a coreset, this may be interpreted as index=0). If multiple scrambling IDs are set in one serving cell or two or more coreset groups are set, the UE may know that data is received by multiple DCI-based MTRP operation.

For example, the single DCI based MTRP scheme or the multiple DCI based MTRP scheme may be indicated to the UE via separate signaling. As an example, when a plurality of CRS patterns are indicated to the UE for MTRP operation for one serving cell, PDSCH rate matching for CRS may be different depending on this MTRP operation is a single DCI based MTRP operation or a multiple DCI based MTRP operation.

The base station described in this disclosure may be a generic term for an object that transmits/receives data to and from UE. For example, the base station described herein may be a concept including one or more transmission points (TPs), one or more transmission and reception points (TRPs), and the like. For example, multiple TPs and/or multiple TRPs described herein may be included in one base station or included in multiple base stations. In addition, the TP and/or TRP may include a panel of a base station, a transmission and reception unit, and the like.

In addition, the TRP described in this disclosure means an antenna array having one or more antenna elements available in a network located at a specific geographical location in a specific area. Although this disclosure is described with respect to "TRP" for convenience of explanation, the TRP may be replaced with a base station, a transmission point (TP), a cell (e.g., a macro cell/small cell/pico cell, etc.), an antenna array, or a panel and understood and applied as such.

In addition, the CORESET group ID described in this disclosure may refer to an index/identification information (e.g., ID)/indicator, etc. for distinguishing a CORESET configured for/associated with each TRP/panel (or for each TRP/panel). In addition, the CORESET group may be a group/union of CORESETs which is distinguished by the index/identification information (e.g., ID) for distinguishing the CORESET and the CORESET group ID. For example, the CORESET group ID may be specific index information defined in the CORESET configuration. For example, the CORESET group may be configured/indicated/defined by an index defined in the CORESET configuration for each CORESET. The CORESET group ID may be configured/indicated via higher layer signaling (e.g., RRC signaling)/L2 signaling (e.g., MAC-CE)/L1 signaling (e.g., DCI).

For example, ControlResourceSet information element (IE) that is a higher layer parameter is used to configure a time/frequency control resource set (CORESET). For example, the control resource set may be related to detection and reception of downlink control information. Examples of the ControlResourceSet IE may include CORESET related ID (e.g., controlResourceSetID), an index of a CORESET pool for CORESET (e.g., CORESETPoolIndex), time/frequency resource configuration of CORESET, and TCI information related to CORESET. For example, the index of the CORESET pool (e.g., CORESETPoolIndex) may be set to 0 or 1.

For example, it may be indicated/configured so that PDCCH detection for each TRP/panel is performed on a per CORESET group basis. And/or, it may be indicated/configured so that uplink control information (e.g. CSI, HARQ-A/N, SR) and/or uplink physical channel resources (e.g. PUCCH/PRACH/SRS resources) for each TRP/panel are divided on a per CORESET group basis and managed/controlled. And/or, HARQ A/N (process/retransmission) for PDSCH/PUSCH, etc. scheduled for each TRP/panel may be managed on a per CORESET group basis.

M-TRP Transmission Scheme

M-TRP transmission by which multiple (e.g., M) TRPs transmit data to one user equipment (UE) may be divided into two main types of transmission: eMBB M-TRP transmission (or M-TRP eMMB) which is a scheme for increasing a transmission rate and URLLC M-TRP transmission (or M-TRP URLLC) which is a scheme for increasing a reception success rate and reducing latency.

URLLC M-TRP may mean that M-TRPs transmit the same TB (Transport Block) using different resources (e.g., layers/time resources/frequency resources, etc.). A number of TCI state(s) may be indicated by DCI to a UE configured with the URLLC M-TRP transmission scheme, and data received using the QCL reference signal (RS) of each TCI state may be assumed to be the same TB. On the other hand, eMBB M-TRP may mean that M-TRPs transmit different TBs using different resources (e.g., layers/time resources/frequency resources, etc.). A number of TCI state(s) may be indicated by DCI to a UE configured with the eMBB M-TRP transmission scheme, and data received using the QCL RS of each TCI state may be assumed to be different TBs. In relation to at least eMBB M-TRP, each TCI code point within DCI may correspond to 1 or 2 TCI states. If 2 TCI states are activated within one TCI code point, each TCI state for at least DMRS type 1 may correspond to one CDM group.

For example, the UE may decide/determine whether the corresponding M-TRP transmission is URLLC transmission or eMBB transmission since it uses the RNTI configured for MTRP-URLLC and the RNTI configured for MTRP-eMBB, separately. That is, if the CRC masking of the DCI received by the UE is performed using the RNTI configured for the MTRP-URLLC purpose, this may correspond to URLLC transmission, and if the CRC masking of the DCI is performed using the RNTI configured for the MTRP-eMBB purpose, this may correspond to eMBB transmission.

Table 5 shows various schemes that can be considered for URLLC M-TRP transmission. Referring to Table 5, there exist various schemes such as SDM/FDM/TDM.

TABLE 5

To facilitate further down-selection for one or more schemes in RAN1#96bis, schemes for multi-TRP based URLLC, scheduled by single DCI at least, are clarified as following:
Scheme 1 (SDM): n (n <= $N_s$) TCI states within the single slot with overlapped time and frequency resource allocation
Scheme 1a:
Each transmission occasion is a layer or a set of layers of the same TB, with each layer or layer set is associated with one TCI and one set of DMRS port(s).
Single codeword with one RV is used across all spatial layers or layer sets. From the UE perspective, different coded bits are mapped to different layers or layer sets with the same mapping rule as in Rel-15.

TABLE 5-continued

Scheme 1b:
Each transmission occasion is a layer or a set of layers of the
same TB, with each layer or layer set is associated with one TCI
and one set of DMRS port(s).
Single codeword with one RC is used for each spatial layer or
layer set. The RVs corresponding to each spatial layer or layer
set can be the same or different.
Scheme 1c:
One transmission occasion is one layer of the same TN with one
DMRS port associated with multiple TCI state indices, or one layer
of the same TB with multiple DMRS ports associated with multiple
TCI state indices one by one.
For Scheme 1a and 1e, the same MCS is applied for all layers and
layers sets.
For scheme 1b, same or different MCS/modulation orders for
different layers or layer sets can be discussed.
Scheme 2 (FDM): n (n <= $N_f$) TCI states within
the single slot, with non-overlapped frequency resource allocation
Each non-overlapped frequency resource allocation is associated
with one TCI state.
Same single/multiple DMRS port(s) are associated with all non-
overlapped frequency resource allocations.
Scheme 2a:
Single codeword with one RV is used across full resource
allocation. From UE perspective, the common RB mapping (codeword
to layer mapping) is applied across full resource allocation.
Scheme 2b:
Single codeword with one RV is used for each non-overlapped
frequency resource allocation. The RVs corresponding to each
non-overlapped frequency resource allocation can be the
same or different.
For scheme 2a, same MCS is applied for all non-overlapped
frequency resource allocations
For scheme 2b, same or different MCS/modulation orders for
different non-overlapped frequency resource allocations
can be discussed.
Details of frequency resource allocation mechanism for
FDM 2a/2b with regarding to allocation granularity, time
domain allocation can be discussed.
Scheme 3 (TDM): n (n <= $N_{t1}$) TCI states within
the single Slot, with non-overlapped time resource allocation
Each transmission occasion of the TB has one TCI and one
RV with the time granularity of mini-slot.
All transmission occasion (s) within the slot use a common
MCS with same single or multiple.
DMRS port(s),
RV/TCI state can be same or different among transmission
occasions.
FFS channel estimation interpolation across mini-slots
with the same TCI index
Scheme 4 (TDM): n (n <= $N_{t2}$) TEI states
with K (n <= K) different slots,
Each transmission occasion of the TB has one TCI and one RV
All transmission occasion (s) across K slots use a common
MCS with same single or multiple DMRS port(s)
RV/TCI state can be same or different among transmission occasions.
FES channel estimation interpolation across slots with the same
TCI index Note that M-TRP/panel based URLLC schemes shall be compared in terms of improved reliability, efficiency, and specification impact
Note:
Support of number of layers per TRP may be discussed Method for Improving Reliability in Multi-TRPs FIG. 9 illustrates an example of a transmission/reception method for improving reliability supported by a plurality of TRPs, and the following two methods may be considered.

The example in (a) of FIG. 9 shows that a layer group transmitting the same codeword (CW)/transport block (TB) correspond to different TRPs. That is, the same CW may be transmitted through different layers/layer groups. In this case, a layer group may refer to some kind of layer set made up of one or more layers. As such, the amount of transmission resources increases as the number of layers increases, and this is advantageous in that robust channel coding with a low code rate can be used for TB. In addition, it is expected that the reliability of received signals may be improved based on diversity gain due to different channels from a plurality of TRPs.

Meanwhile, the example in (b) of FIG. 9 shows an example in which different CWs are transmitted through layer groups corresponding to different TRPs. That is, different CWs may be transmitted through different layers/layer groups. In this case, it may be assumed that TBs corresponding to the first CW (CW #1) and the second CW (CW #2) are the same. Therefore, this can be seen as an example of repeated transmission of the same TB. In the case of (b) of FIG. 9, the code rate corresponding to the TB may be higher than that of (a) of FIG. 9. Still, there is an advantage that a code rate can be adjusted by indicating different redundancy version (RV) values for encoding bits generated from the same TB according to a channel environment, or that a modulation order of each CW may be adjusted.

In (a) of FIG. 9 or (b) of FIG. 9, the same TB is repeatedly transmitted through different layer groups, and each layer group is transmitted by different TRPs/panels, thereby increasing the data reception probability, which may be called spatial division multiplexing (SDM)-based URLLC M-TRP transmission. A layer(s) belonging to different layer groups are transmitted through DMRS ports belonging to different DMRS CDM groups, respectively.

In addition, although the above description regarding multiple TRPs has been given with respect to a spatial division multiplexing (SDM) scheme using different layers, it also may be extensively applied to a frequency division multiplexing (FDM) scheme based on different frequency domain resources (e.g., RB/PRB (set)), and/or a time division multiplexing (TDM) scheme based on different time domain resources (e.g., slots, symbols, and sub-symbols).

Hereinafter, in the present disclosure, methods that can be proposed in consideration of cooperative transmission (e.g., NCJT) between multiple base stations (e.g., multiple TPs/ TRPs of one or more base stations) and UE will be described.

A control resource set (CORESET) may be configured to transmit and receive control information between a plurality of base stations (or a plurality of TRPs) and a UE, and a search space set (for example, CSS set or USS set) may be defined within the control resource set.

For example, for each DL BWP set to a UE within a serving cell, the UE may receive three or fewer CORESET configurations through higher layer signaling. For each CORESET, the UE may receive a configuration including a CORESET index, a CORESET Pool index (i.e., CORESET group ID), a DMRS scrambling sequence initialization value, precoder granularity for the number of REGs in the frequency domain, the number of consecutive symbols, a set of resource blocks, CCE-to-REG mapping parameters, and antenna port QCL through a higher layer parameter (e.g., ControlResourceSet).

Also, for each DL BWP set to the UE in the serving cell, the UE may receive ten or fewer search space sets through higher layer signaling. For each search space set, the UE may receive a configuration including a search space set index, association between the search space set and the CORESET, a PDCCH monitoring period/offset, the number of PDCCH candidates per CCE aggregation level, and the type of the search space set (i.e., USS or CSS) through a higher layer parameter (e.g., SearchSpace).

A set of PDCCH candidates to be monitored by the UE is defined as a PDCCH search space set. The search space set may be a CSS set or a USS set. The UE monitors PDCCH candidates within one or more search space sets. That is, PDCCH candidates may be mapped to each search space set.

Table 6 describes the PDCCH mapping rule of the NR Rel-15. The PDCCH mapping rule may be applied to a method of mapping PDCCH candidates to a search space set.

TABLE 6

PDCCH candidates are mapped to search space sets until either or both of the limits on the number of blind decodings (BDs) and the number of CCEs for channel estimation satisfy at least the following PDCCH mapping rule.
Order for each SS type: Mapped to CSS before USS. A UE expects that PDCCH monitoring is configured in the CSS(s) within the limit that the UE may monitor in terms of the number of BDs/CCEs.
Candidates of USS with a lower SS set ID are all mapped to the search space set before the candidates of USS with a higher ID
When it is impossible to map all of the candidates to an SS set, candidates within the SS set and subsequent SS sets are dropped (not mapped).

In Table 6, the limit of the number of blind decodings may mean the maximum number of monitored PDCCH candidates. In what follows, for the convenience of description, the present disclosure will express the limit of the number of BDs as BD limit. Also, the limit of CCEs may mean the maximum number of CCEs. In what follows, the present disclosure will express the maximum number of CCEs as CCE limit. In the present disclosure, BD/CCE limit may mean BD limit, or CCE limit, or BD limit and CCE limit.

Referring to Table 6, PDCCH candidates may be mapped to CSS within a range satisfying the BD/CCE limit, and the PDCCH candidates may be mapped sequentially to USS with a low index (ID) based on the IDs of USSs. Based on the BD/CCE limit being exceeded, the related USS and all the subsequent USSs may be dropped (i.e., PDCCH candidates may not be mapped). The mapping of PDCCH candidates to SS (i.e., CSS or USS) may mean that a UE may monitor the PDCCH candidates in the related SS. Accordingly, the UE may not monitor PDCCH candidates in the dropped SS (to which PDCCH candidates are not mapped).

In the multiple DCI-based MTRP scheme, a Search Space (SS) of TRP 1 and an SS of TRP 2 may be set within one slot. In this case, based on the PDCCH mapping rule of Table 6, SS of either of the TRPs (e.g., TRP 1 or TRP 2) may be dropped. Here, the SS's being dropped may mean that the UE is unable to perform PDCCH monitoring for the related SS. As a result, a scheduling opportunity of NCJT transmission may decrease, and the possibility of falling back to the existing operation in which only one TRP provides a data service may increase.

In what follows, the present disclosure proposes a method (i.e., PDCCH mapping rule) of mapping PDCCH candidates to an SS, which enables a UE to monitor all of the SSs of two TRPs set in one slot in the multiple DCI-based MTRP scheme. Specifically, Proposal 1 proposes a method of mapping PDCCH candidates by applying the BD/CCE limit set per serving cell and per slot to the M-TRP operation based on the PDCCH mapping rule of Table 6. Proposal 2 proposes a method of operating a TRP based on a considered-to-be cell (e.g., Scell or Pcell) based on considering each TRP to be one cell and applying the BD/CCE limit in the multiple DCI-based MTRP scheme. Proposal 3 proposes a method of configuring a BD/CCE limit and methods of mapping PDCCH candidates based on the configured BD/CCE limit by considering a situation in which the multiple DCI-based MTRP transmission scheme is set within one serving cell. It should be noted that the proposed methods of the present disclosure are distinguished from each other only for the convenience of description. Therefore, a portion of one proposal may be replaced with a portion of another proposal or may be applied in combination with each other.

As described above, each TRP may be distinguished based on the index of a CORESET pool (e.g., CORESET-PoolIndex) (or CORESET group ID) configured for a CORESET. The index of the CORESET pool may mean ID/index of the CORESET group described in the present disclosure. For example, a group of CORESETs related to different CORESET group IDs (e.g., CORESETPoolIndex) may be related to the respective TRPs and may be configured/instructed to perform PDCCH detection per TRP/panel for each CORESET group.

The methods based on the present disclosure are described based on one or more TP/TRPs of a base station(s); however, the related methods may also be applied to the transmission based on one or more panels of the base station(s) in the same way or in a similar way.

The BD/CCE limit configured for a specific TRP based on the present disclosure may be expressed in the same way as a BD/CCE limit configured for a specific CORESET group related to a specific TRP. Also, the maximum number of BDs/CCEs (i.e., BD/CCE limit) of each TRP based on the present disclosure may mean the maximum number of BDs/CCEs on which a UE may perform PDCCH monitoring in an SS for the related TRP.

<Proposal 1>

Proposal 1 of the present disclosure proposes a method of mapping PDCCH candidates by applying a BD/CCE limit set per serving cell and per slot to the M-TRP operation based on the PDCCH mapping rule of table 6 described above.

Method 1-1)

The UE may expect that a BS schedules Common Search Spaces (CSSs) not to exceed the BD/CCE limit (in the same way as in the PDCCH mapping rule of Table 6). In other words, the BS may set the number of BDs/CCEs for a CSS not to exceed the BD/CCE limit. For a USS, the BS may configure the maximum number of BDs/CCEs (e.g., X) available for one serving cell so that after excluding the BDs/CCEs used for CSSs (e.g., Y) from the maximum number of BDs/CCEs (e.g., X), TRP 1 and TRP 2 may divide and use Z (=X−Y) BDs/CCEs remained.

For example, suppose that Z (=X−Y) denotes the number of BDs/CCEs remaining after the number of BDs/CCEs (e.g., Y) used for a CSS is subtracted from the maximum number of BDs/CCEs (e.g., X) available for one serving cell. Then Z*R may be set as the number of BDs/CCEs to be used for an SS of TRP 1, and Z*(1−R) may be set as the number of BDs/CCEs to be used for an SS of TRP 2 (where R is greater than or equal to 0 and less than or equal to 1).

The R may be fixed to a specific value (e.g., 0.5) and may be predefined between the UE and the BS. Alternatively, the BS may transmit (inform) the information on the R value to the UE. The BS may set/indicate the number of BDs/CCEs for a USS per TRP.

Which TRP an SS is related to may be known through the index (i.e., CORESET group index) of a CORESET related to the SS. For example, based on the CORESET group index (for example, CORESETPoolIndex) related to the related SS being 0, the SS is related to TRP 1 while the SS is related to TRP 2 based on the CORESET group index being 1.

Based on the number of BDs/CCEs allocated for each TRP, USSs used in the related TRP may be mapped based on the PDCCH mapping rule of Table 6. In other words, among USSs used in the TRP, USSs with a low USS index are mapped first, and based on the number of BDs/CCEs of the related TRP being exceeded in USS i, all of USS i and USSs with an index larger than i may be dropped.

Method 1-2)

Extending and applying the method 1-1 related to USSs to CSSs may be considered. In other words, the maximum number of BDs/CCEs may be configured, and PDCCH candidates may be mapped by considering a situation in which a plurality of TRPs support CSSs and USSs.

A maximum number of BDs/CCEs is configured for each of TRP 1 and TRP 2 by dividing the maximum number (e.g., X) of BDs/CCEs available for one serving cell. The maximum number of BDs/CCEs for TRP 1 may be set based on X*R, and the maximum number of BDs/CCEs for TRP 2 may be set based on X*(1−R). For each TRP (based on the BD/CCE limit of the TRP), the PDCCH mapping rule of Table 6 may be applied to each CSS/USS.

The R may be fixed to a specific value (e.g., 0.5) and may be predefined between the UE and the BS. Alternatively, the BS may transmit (inform) the information on the R value to the UE.

Method 1-3)

The existing PDCCH mapping rule is employed for a CSS; for a USS, the maximum number of BDs/CCEs is configured by considering the index of a CORESET group (e.g., CORESETPoolIndex) related to a CORESET related to the USS, and thus PDCCH mapping may be performed.

The UE may expect that a BS schedules Common Search Spaces (CSSs) not to exceed the BD/CCE limit (in the same way as in the PDCCH mapping rule of Table 6). In other words, the BS may set the number of BDs/CCEs for a CSS not to exceed the BD/CCE limit.

The PDCCH mapping rule of Table 6 is applied for a USS. As an exception, consider a case in which the CORESET group index related to the CORESET of the USS is i. In this case, even if the number of BDs/CCEs of the related USS exceeds the number of remaining BDs/CCEs (a value obtained by subtracting the number of BDs/CCEs of already mapped SSs from the maximum number of BDs/CCEs (e.g., X) available for one serving cell), PDCCH mapping is still allowed for the number of remaining BDs/CCEs. At the same time, the remaining PDCCH candidates of the USS may be dropped.

In other words, mapping is performed from a USS with a low index. Based on the CORESET group index (e.g., CORESETPoolIndex) configured for a CORESET to which the USS that exceeds the BD/CCE limit corresponds having a specific value, all of the related USSs are not necessarily dropped; rather, PDCCH mapping is allowed for part of the USSs within the BD/CCE limit, and only those that exceed the BD/CCE limit may be dropped.

Here, the CORESET group index i may be fixed to a specific value (e.g., i=1), or the BS may transmit (inform) the information on i to the UE. For example, the i may be configured to have multiple values (e.g., i=0 or 1).

Based on the CORESET group index configured for the CORESET to which the USS that exceeds the BD/CCE limit corresponds not being the specific value, the related USS and all the subsequent USSs may be dropped as in the existing method.

Method 1-4)

The UE may expect that a BS schedules Common Search Spaces (CSSs) not to exceed the BD/CCE limit (in the same way as in the PDCCH mapping rule of Table 6). In other words, the BS may set the number of BDs/CCEs for a CSS not to exceed the BD/CCE limit.

The PDCCH mapping rule of Table 6 is applied for a USS. Based on dropping occurring in USS i, USS i, which is configured by the TRP of the USS i, and USSs of which the USS index is larger than or equal to i may be dropped. However, among the USSs configured by a different TRP rather than the TRP of the USS i, a USS of which the index is larger than or equal to i may perform PDCCH mapping based on the number of BDs/CCEs of the USS being less than or equal to the number of remaining BDs/CCEs; otherwise, the USS may be dropped.

In other words, based on dropping occurring in USS i, those USSs with an index larger than or equal to i among USSs within the CORESET configured with the same CORESET group ID (e.g., CORESETPoolIndex) set to the CORESET including USS i may be dropped. However, for those USSs within the CORESET configured with a different CORESET group ID, PDCCH mapping may still be performed based on comparison with the number of remaining BDs/CCEs.

In other words, USSs of a different TRP rather than the TRP of a USS in which USS dropping has initially occurred, to which PDCCH mapping has not been performed, may be given a chance (e.g., second chance) to map the PDCCH. Through the operation, whether the PDCCH may be mapped in the remaining BD/CCE may be examined/checked one by one, starting with a USS of a lower index among the USSs that have obtained the chance (e.g., second chance) within the remaining number of BDs/CCEs.

For example, suppose the BD limit is 44, and the UE is set with 1 CSS and 6 USSs (e.g., USS 0/USS 1/USS 2/USS 3/USS 4/USS 5) in one slot. Also, it is assumed that USS 0, USS 1, and USS 2 are set to TRP 1 (that is, the index set to the CORESET related (connected) to USS 0, USS 1 and USS 2 is 0); USS 3, USS 4, and USS 5 are set to TRP 2 (that is, the index set to the CORESET related (connected) to USS 3, USS 4, and USS 5 is 1). At this time, based on CSS, USS 0, USS 1, USS 2, USS 3, USS 4, and USS 5 requiring 10, 20, 20, 10, 10, 10, and 10 BDs (number of times) respectively, the UE may perform 14 remaining BDs in addition to the PDCCH mapping to CSS and USS 0. Since the number of BDs (20) of USS1 exceeds the number of remaining BDs (14), USS 1 is dropped, where, in this case, the remaining USSs of TRP 1 (namely, USS 1 and USS 2) are all dropped. However, since the number of BDs (1) of USS 3 of TRP 2 is less than or equal to the number of remaining BDs, PDCCH mapping is performed for USS 3, while USS 4 and USS 5 are dropped since USS 4 exceeds the number of remaining BDs.

Based on the methods of Proposal 1 (for example, method 1-1 to method 1-4), mapping of PDCCH candidates may be performed by applying the BD/CCE limit configured per cell and per slot to a plurality of MTRP operations.

<Proposal 2>

Meanwhile, based on the Rel-15 NR standard, a UE supporting carrier aggregation (CA) may determine BD/CCE limit for each cell through the following method (refer to TS 38.213).

The maximum number of PDCCH candidates to be monitored per slot and the maximum number of non-overlapping CCEs per slot may increase based on the number of configured DC cells and CA comprising a large number of DL cells or UE capability signaling for flexible PDCCH transmission in the case of DC.

For example, a UE may determine $N_{cells}^{cap}$ by UE capability signaling and CA or DC configuration; and compare the number of configured DL cells and $\Sigma_{\mu=0}^{3} N_{cells}^{DL,\mu}$ with $N_{cells}^{cap}$.

Based on that $\Sigma_{\mu=0}^{3} N_{cells}^{DL,\mu} \leq N_{cells}^{cap}$, a UE may not have to monitor PDCCH candidates more than $M_{PDCCH}^{total,slot,\mu} = M_{PDCCH}^{max,slot,\mu}$ per slot or non-overlapping CCEs more than $C_{PDCCH}^{total,slot,\mu} = C_{PDCCH}^{max,slot,\mu}$ for each scheduled cell in the activated DL BWP of a scheduling cell.

On the other hand, based on that $\Sigma_{\mu=0}^{3} N_{cells}^{DL,\mu} > N_{cells}^{cap}$, a UE may not have to monitor PDCCH candidates more than $M_{PUCCH}^{total,slot,\mu} = \lfloor N_{cells}^{cap} \cdot M_{PDCCH}^{max,slot,\mu} \cdot N_{cells}^{DL,\mu} / \Sigma_{j=0}^{3} N_{cells}^{DL,j} \rfloor$ per slot or non-overlapping CCEs more than $C_{PDDCH}^{total,slot,\mu} = \lfloor N_{cells}^{cap} \cdot C_{PDCCH}^{max,slot,\mu} \cdot N_{cells}^{DL,\mu} / \Sigma_{j=0}^{3} N_{cells}^{DL,j} \rfloor$ in the activated DL BWP of a scheduling cell from downlink cells.

Here, $M_{PDCCH}^{max,slot,\mu}$ and $C_{PDCCH}^{max,slot,\mu}$ are defined in Tables 7 and 8, respectively.

Table 7 shows the maximum number of PDCCH candidates (i.e., BD limit) monitored per slot for a DL BWP per SCS configuration μ for a single serving cell.

Table 7 shows the maximum number of non-overlapping CCEs (i.e., CCE

TABLE 7

| μ | $M_{PDCCH}^{max,\ slot,\ \mu}$ |
|---|---|
| 0 | 44 |
| 1 | 36 |
| 2 | 22 |
| 3 | 20 | limit) per slot for a DL BWP per SCS configuration μ for a single serving cell.

TABLE 8

| μ | $C_{PDCCH}^{max,\ slot,\ \mu}$ |
|---|---|
| 0 | 56 |
| 1 | 56 |
| 2 | 48 |
| 3 | 32 |

In the case of Scell, a BS may configure PDCCH candidates and search spaces (SS, CSS and/or USS) within the BD/CCE limit determined based on the manner above. In the case of Pcell, the BS may configure PDCCH candidates and SS (CSS and/or USS) in excess of the BD/CCE limit determined based on the manner above. In other words, PDCCH overbooking may occur in the Pcell. Based on the PDCCH overbooking occurring in the Pcell, the BS/UE may perform PDCCH mapping/monitoring so that a USS with a lower index has a higher priority as described in Table 6.

In the multiple DCI-based MTRP (or Multiple Panel) transmission scheme, since each of M TRPs operating in one cell transmits DCI, M pieces of DCI may be transmitted. Accordingly, a method of increasing the BD/CCE limit is being discussed. For example, based on applying the BD/CCE limit and determining PDCCH mapping/dropping, a method of applying the BD/CCE limit to the CA described above by considering each TRP participating in the MTRP transmission scheme to be one cell is being discussed. In the case of the method above, a method of determining the BD/CCE limit and a PDCCH mapping rule may be different depending on whether a Scell MTRP transmission scheme or a Pcell MTRP transmission scheme is used.

In what follows, in the multiple DCI-based MTRP transmission scheme, based on applying the BD/CCE limit in the CA situation by considering each TRP to be one cell, a method of operating a TRP based on the considered-to-be cell (e.g., Scell or Pcell).

Method 2-1)

Based on an MTRP transmission scheme being configured for a Scell, a BD/CCE limit may be determined by considering each TRP to be one Scell, a BS may configure PDCCH candidates and SS per TRP within the BD/CCE limit per TRP, and the BS/UE may perform PDCCH mapping/monitoring per TRP.

Method 2-2)

If the MTRP scheme is configured in the Pcell, each TRP may be considered to be one Pcell, and PDCCH overbooking and a PDCCH mapping rule may be allowed for each TRP. However, only one Pcell is configured for a UE based on the Rel-15. Since M Pcells are configured (assumed to be configured) based on the MTRP scheme being configured, the Rel-15 PDCCH mapping rule (e.g., Table 6) may be modified as follows. The BS/UE may perform PDCCH mapping/monitoring for each CORESET group by comparing the index of a USS (assigning a high priority to the USS with a low index) related to the CORESET(s) belonging to the CORESET group.

For example, a situation may be considered, in which cell 0 is configured for 2 DCI-based 2 TRP transmission; CORESET 0, CORESET 1, and CORESET 2 are configured; CORESET 0 and CORESET 1 are configured to belong to CORESET group 0; and CORESET 2 is configured to belong to CORESET group 1. At this time, CORESET 0 is related (connected) to one CSS; CORESET 1 is related (connected) to USS 0 and USS 2; and CORESET 2 is related (connected) to USS 1 and USS 3. Although PDCCH mapping is performed with priorities in order of USS0, 1, and 2 in the Pcell transmitted by an existing, single TRP, the MTRP transmission described above may perform the following operations.

For example, the BS/UE may calculate the BD/CCE limit of each TRP based on assuming TRP 1 and 2 to be Pcell 1 and 2, respectively. For example, the BD/CCE limit may be determined to be 44/56 for each TRP. For TRP 1, the BS/UE may perform PDCCH mapping/monitoring within a BD/CCE limit of 44/56 (available for TRP 1) with priorities in order of USS 0 and USS 2, which are USSs of CORESET 1 belonging to CORESET group 0 (related to TRP 1). For TRP 2, the BS/UE may perform PDCCH mapping/monitoring within a BD/CCE limit of 44/56 (available for TRP 2) with priorities in order of USS 1 and USS 3, which are USSs of CORESET 2 belonging to CORESET group 1 (related to TRP 2).

Method 2-3)

The BS may apply PDCCH overbooking and a PDCCH mapping rule by considering only one TRP among M TRPs configured for a Pcell to be a Pcell and perform scheduling by considering the remaining TRPs to be a Scell to avoid PDCCH overbooking.

For example, one TRP considered to be a Pcell may be a TRP related to a specific CORESET group index (e.g., CORESET group 0), and the PDCCH overbooking and PDCCH mapping rule may be applied only to the PDCCH candidates transmitted through the specific CORESET group (e.g., CORESET group 0).

As in the example of the method 2-2, a situation may be considered, in which cell 0 is configured for 2 DCI-based 2 TRP transmission; CORESET 0, CORESET 1, and CORESET 2 are configured; CORESET 0 and CORESET 1 are configured to belong to CORESET group 0; and CORESET 2 is configured to belong to CORESET group 1. At this time, CORESET 0 is related (connected) to one CSS, CORESET 1 is related (connected) to USS 0 and USS 2; and CORESET 2 is related (connected) to USS 1 and USS 3.

The PDCCH candidates are mapped/monitored within the BD/CCE limit with priorities in order of USS 0 and 2 for the USS 0 and 2 connected to the CORESET group 0 related to one TRP considered to be a Pcell. The BS may perform scheduling on the PDCCH candidates (e.g., USS 1 and USS 3) transmitted through the remaining CORESET groups (e.g., CORESET group 1) to avoid overbooking.

In other words, PDCCH mapping may be always performed to all of the PDCCH candidates transmitted through the remaining CORESET groups (e.g., CORESET groups other than the CORESET group 0 in the example above or a CORESET group configured with only USSs) and the PDCCH candidates of a CSS, and a test of whether overbooking occurs and PDCCH mapping/dropping may be performed by increasing the USS index only for the USSs configured in the CORESET of the CORESET group 0.

The Pcell operation in the methods of Proposal 2 (e.g., method 2-1/2-2/2-3) may also be applied in the same way to the SpCell (Pcell and/or PSCell) configured for dual connectivity.

Through the methods of Proposal 2 (e.g., method 2-1/2-2/2-3), in the multiple DCI-based MTRP transmission, based on considering each TRP to be one cell and applying the BD/CCE limit, the BD/CCE limit and the PDCCH mapping rule may be applied differently based on a considered-to-be cell by the TRP (e.g., Scell or Pcell).

<Proposal 3>

Proposal 3 of the present disclosure proposes a method of configuring a BD/CCE limit and methods of mapping PDCCH candidates based on the configured BD/CCE limit by considering a situation in which a multiple DCI-based MTRP transmission scheme is configured within one serving cell.

As described above, the multiple DCI-based MTRP transmission may be related to a case in which a UE is configured with a plurality of CORESET groups. In other words, the multiple DCI-based transmission may be related to a case in which CORESET group indices (e.g., CORESETPoolIndex) with different values are configured.

In the case of single TRP operation, a BD/CCE limit per serving cell and per slot has been configured. However, based on the M-DCI based MTRP transmission scheme being configured within one primary serving cell (Pcell) (i.e., based on a CORESET group being configured), a BD/CCE limit exists per TRP, and a BD/CCE limit may be configured separately for the related serving cell. In other words, a BD/CCE limit for a serving cell and a BD/CCE limit for a TRP may be configured separately.

The BD/CCE limit configured for a specific TRP based on the present disclosure may be expressed in the same way as a BD/CCE limit configured for a specific CORESET group related to a specific TRP. The number of BDs/CCEs may be counted (by increasing a USS index) for a search space of a CORESET belong to the specific CORESET group, and whether the BD/CCE limit configured for the CORESET group may be checked. Based on the USS exceeding the BD/CCE limit during the aforementioned process, it is defined that the BD/CCE limit of the TRP related to the CORESET group is exceeded.

For example, a BD/CCE limit for a serving cell may be configured based on the BD/CCE limit for a TRP. For example, the BD/CCE limit for a serving cell may be calculated by multiplying the BD/CCE limit for a TRP with a specific value (e.g., r). As a specific example, a BD limit may be configured to be 44 per TRP, and a BD limit may be configured to be 44*r for a related serving cell.

Also, a UE may report the information on the specific value (e.g., r) to a BS in the form of UE capability. For example, the specific value (e.g., r) may mean the number of TRPs/panels that a UE may support. Alternatively, the specific value (e.g., r) may be predefined. For example, the specific value (e.g., r) may be the same as the number of TRPs existing in one serving cell. For example, based on the assumption that a maximum of two TRPs perform cooperative transmission on one cell, the r value may be fixed to 2.

Although the example above has been described based on the BD limit, the same scheme for a BD limit may be applied for a CCE limit. For example, the CCE limit of a serving cell for which MTRP transmission is configured may increase by r' times the CCE limit for each TRP and may be configured with a value different from the r value for increasing the BD limit. For example, the UE may report, to the BS, the r' value related to the CCE limit separately from the r value for increasing the BD limit. Alternatively, the r' value may be predefined between the UE and the BS.

Based on the BD/CCE limit for a serving cell and the BD/CCE limit for a TRP being configured separately, PDCCH overbooking and a PDCCH mapping rule may be defined for each TRP (based on the BD/CCE limit defined for each TRP). In addition, whether a condition on the BD/CCE limit for a serving cell to which TRPs belong is satisfied has to be checked together.

For example, although PDCCH mapping is performed for a USS that satisfies both of the BD/CCE limit per TRP and the BD/CCE limit per cell, PDCCH mapping may not be performed for a USS that fails to satisfy either of the two BD/CCE limits (i.e., the USS may be dropped).

In what follows, a method of mapping PDCCHs by considering both of the BD/CCE limit for a serving cell and the BD/CCE limit for a TRP will be described.

To help understanding the proposed method of the present disclosure, descriptions are given based on the following embodiment. However, it should be noted that the following embodiment does not limit the technical scope of the present disclosure.

Embodiment 1) Two TRPs (e.g., TRP0, TRP1) operate within one cell. It is assumed that CORESET 0, CORESET 1, and CORESET 2 are configured for the cell; CORESET 0 and CORESET 1 are configured to belong to CORESET group 0; and CORESET 2 is configured to belong to CORESET group 1.

CORESET group 0={CORESET 0, CORESET 1}

CORESET group 1={CORESET 2}

CORESET 0={CSS 0}

CORESET 1={USS 0, USS 2}

CORESET 2={USS 1, USS 3}

Also, CORESET 0 is related (connected) to one CSS; CORESET 1 is related (connected) to USS 0 and USS 2; and CORESET 2 is related (connected) to USS 1 and USS 3. Since CORESET group 0 is configured with CORESETs (i.e., CORESET 0, 1) used by TRP 0, TRP 0 transmits DCI based on CSS0, USS 0, and USS 2; since CORESET group 1 is configured with CORESETs (i.e., CORESET 2) used by TRP 1, TRP 1 transmits DCI based on USS 1 and USS 3.

Also, it is assumed that the BD limit of each TRP is 44, r=1.5, namely, the BD limit of a cell is set to 66 (=44*r). It is assumed that CSS0, USS0, USS1, USS2, and USS3 requires 10, 20, 20, 20, and 20 times of BD, respectively and are all configured for one slot.

<Proposal 3-1>

It is necessary to determine which TRP is first to map an SS based on PDCCH mapping being performed by considering both the BD/CCE limit for a serving cell and the BD/CCE limit for a TRP.

In one method, a UE may perform PDCCH mapping from a CORESET group with a low CORESET group index (e.g., CORESETPoolIndex) and perform PDCCH mapping from a USS with a low USS index within the same CORESET group. In other words, based on the CORESET Pool index, PDCCH candidates may be mapped from SSs of a CORESET related to a low CORESETPoolIndex.

According to embodiment 1, PDCCH mapping is performed from CORESET group 0, and USS 0 may be mapped first within CORESET group 0. Specifically, for CSS0, USS0, and USS2 of CORESET group 0 related to TRP0, the UE may perform PDCCH mapping by increasing the SS index within a range not exceeding 44, the BD limit of TRP 0 and 66, the BD limit of a cell. Since a PDCCH is mapped preferentially to the CSS (e.g., 10 times of BD), 10 out of the TRP 0's BD limit 44 may be consumed, and 10 of the cell's BD limit 66 may be consumed. For USSs, mapping may be attempted in order of USS 0 (20 times of BD) and USS 2 (20 times of BD). PDCCH mapping may be performed on the USS 0, but since USS 2 exceeds the BD limit of a TRP, USS 2 is not mapped but dropped.

Next, for USS1 and USS3 of CORESET group 1 related to TRP1, the UE may perform PDCCH mapping by increasing the SS index within a range not exceeding 44, the BD limit of TRP 1, and 66, the BD limit of a cell. Since PDCCH mapping (30 times of BD, namely, 20 times based on 10 times for CSS and 20 times for USS 0) has already been completed for TRP 0, 30 out of 66 times, the BD limit that may be performed in a cell, has already been consumed. Therefore, PDCCH mapping may be performed by increasing the SS index within a range not exceeding the TRP 1's BD limit 44 and the cell's remaining times until the BD limit, 36(=66−30). PDCCH mapping is performed for USS 1 (20 times of BD) since USS 1 satisfies both of the BD limit for each TRP and the cell's remaining times until the BD limit; however, since USS 3 satisfies the TRP 1's BD limit but fails to satisfy the cell's remaining times until the BD limit, USS 3 is dropped.

In another method, PDCCH mapping may be perform first from a CORESET group to which a USS with the smallest index belongs, and PDCCH mapping may be performed from a USS with a lower USS index within the same CORESET group.

Based on embodiment 1, PDCCH mapping may be performed from CORESET group 0 to which USS 0 belongs, and USS 0 may be mapped first within CORESET group 0.

In yet another method, PDCCH mapping may be performed from a CORESET group to which the smallest CSS belong, and PDCCH mapping may be performed from the USS with the smallest USS index within the same CORESET group. Based on the CSS being defined for/related to both of two CORESET groups, mapping order may be determined based on i) the CORESET group index (e.g., method 6-1) or ii) the USS index (e.g., method 6-2).

In embodiment 1, although CSS (10 times of BD) has not been configured for CORESET group 1, the CSS may also be configured for CORESET group 1. In this case, PDCCH mapping may be performed by applying the method described above. For example, based on the CSS being configured for CORESET group 1, the CSS is mapped with the highest priority regardless of a CORESET group; therefore, CSS of TRP 0 and CSS of TRP 1 may be mapped with the highest priority. Through the operation above, 10 (i.e., BD of CSS configured for CORESET group 0) out of 44 times, the BD limit of TRP 0, may be consumed, 10 (i.e., BD of CSS configured for CORESET group 1) out of 44 times, the BD limit of TRP 1, may be consumed, and 20 times of BD for CSS may be consumed from the cell's BD limit, 66 times. Afterward, PDCCH mapping for a USS may apply the proposed method (e.g., PDCCH mapping starting from a CORESET group with a low CORESET group index or PDCCH mapping starting from a CORESET group to which a USS with a low USS index belongs).

Although embodiment 1 and related descriptions have been described based on the BD limit, PDCCH overbooking and the PDCCH mapping rule may also be applied to the CCE limit in the same manner as the BD limit. As described above, it should be noted that a CCE limit of a serving cell for which MTRP transmission is configured may be increased to r' times of the CCE limit for each TRP and may be configured with a value different from r value to increase the BD limit.

<Proposal 3-2>

Also, in the multiple DCI (M-DCI) based MTRP transmission scheme, PDCCH mapping may be performed first for the CSS similarly to the PDCCH mapping scheme of the Rel-15 (e.g., Table 6), and for USSs, PDCCH mapping may be performed starting from a USS with a low USS index (regardless of a CORESET group). In the Rel-15, based on the BD/CCE limit of a serving cell being exceeded (e.g., condition 1), a related USS and USSs with an index larger than that of the related USS are dropped; however, in the M-DCI based MTRP transmission scheme, USSs needs to be dropped not only for the case in which the serving cell's BD/CCE limit is exceeded (e.g., condition 1) but also for the case in which the BD/CCE limit is exceeded for each TRP (e.g., condition 2). In this case, four cases may occur as described below.

Case 1. A case in which a serving cell's BD/CCE limit is not exceeded, but the BD/CCE limit of one TRP is exceeded while the BD/CCE limit of the other TRP is not exceeded.

Case 2. A case in which a serving cell's BD/CCE limit is not exceeded, but both the BD/CCE limits of two TRPs are exceeded.

Case 3. A case in which a serving cell's BD/CCE limit is exceeded, and none of the BD/CCE limit of a TRP is exceeded.

Case 4. A case in which a serving cell's BD/CCE limit is exceeded, and the BD/CCE limit of a TRP is exceeded.

Since Case 3 and Case 4 have already exceeded a serving cell's BD/CCE limit, it may be desirable to drop a related USS and USSs with an index larger than that of the related USS. Also, since Case 2 exceeds both the BD/CCE limits of the two TRPs, it may be desirable to drop USSs with an index larger than that of the related USS.

Case 1 describes a situation in which the BD/CCE limit of a specific TRP is exceeded, but the BD/CCE limit is not exceeded for the other TRP and serving cell. In this case, to reduce the implementation complexity of UEs, the UE may perform the following operation.

The UE may drop the USS that has exceeded the BD/CCE limit of a specific TRP and USSs with an index larger than that of the related USS. As a result, monitoring is no longer performed for the USS exceeding the BD/CCE limit and for all USSs with an index larger than that of the related USS. However, this operation may cause a problem of unnecessarily dropping USSs of the other TRP even though the BD/CCE limits of the other TRP and the serving cell are not exceeded.

Or, to solve the problem above, the UE may drop the USS that exceeds the BD/CCE limit of a specific TRP and the USSs (among USSs used by the related TRP, namely, USSs connected to/configured for a CORESET group corresponding to the related TRP) with an index larger than that of the related USS; and attempt PDCCH mapping for those USSs for which PDCCH mapping has not been applied yet among USSs used by the other TRP (and/or configured for the other TRP). In this case, too, PDCCH mapping may be attempted in the increasing order of the USS index, and based on the related TRP's BD/CCE limit being exceeded or the serving cell's BD/CCE limit being exceeded, the related USS and USSs with an index larger than that of the related USS (among USSs used by the related TRP) may be dropped.

<Proposal 3-3>

Since the BD/CCE limit per serving cell or TRP means the maximum number of BDs/CCEs that may be performed by a UE or for which a UE may perform channel estimation in the same single slot, a PDCCH mapping rule may be applied for a search space (SS) configured for the same slot. For the convenience of description, the present disclosure assumes that all the SSs are configured for the same slot; however, it may be common that only a portion of the configured SSs is configured for the same slot in an actual environment. It should be clearly understood that the proposed methods of the present disclosure may still be utilized only for a portion of SSs configured for the same slot.

In what follows, a method of mapping PDCCH candidates for a USS/CSS will be proposed specifically based on a serving cell's BD/CCE limit and the BD/CCE limit per TRP being configured separately.

N USSs (e.g., $USS\_0$, $USS\_1$, ..., $USS\_2$, $USS\_N-1$) may be configured for a PCell in one specific slot, and the USSs may be arranged in the ascending order starting from a USS with a low USS index (among N USSs, $USS\_0$ has the smallest USS index). Based on the CSS existing in the same slot, the CSS is free from overbooking, and thus, PDCCH may be mapped unconditionally.

The UE verifies the conditions described below for $USS\_i$ to determine whether to monitor or drop PDCCH candidates of $USS\_i$, and based on the verification result, one of the operations (e.g., operations 0 to 10) proposed in the present disclosure may be performed. However, at the time of initial verification of the following conditions, the UE may assume that no PDCCH candidate has been dropped for $USS\_0$, $USS\_1$, $USS\_2$, ..., $USS\_N-1$, assume that i=0, and perform verification on the following conditions. In the operations proposed below (e.g., operations 0 to 10), based on a PDCCH being mapped, the UE performs blind decoding (BD)/monitoring on the related PDCCH; otherwise, BD/monitoring is not performed.

<PDCCH Mapping Verification Condition for $USS\_i$>

Condition 1:

(The sum of the numbers of BDs/CCEs for PDCCH candidates of USSs for which the PDCCH candidates are not dropped among a total of i+1 USSs ranging from USS 0 to $USS\_i$+the sum of the numbers of BDs/CCEs for PDCCH candidates of CSS)≤(BD/CCE limit of a serving cell)

Condition 2:

(The sum of the numbers of BDs/CCEs for PDCCH candidates of USSs (i.e., USSs configured through a CORESET belonging to a CORESET group) defined in the CORESET group (i.e., the CORESET group of a CORESET defined in $USS\_i$) in which $USS\_i$ is defined among a total of i+1 USSs ranging from $USS\_0$ to $USS\_i$+the sum of the numbers of BDs/CCEs for PDCCH candidates of CSS defined in the CORESET group)≤(BD/CCE limit of the CORESET group in which $USS\_i$ is defined (i.e., BD/CCE limit of a TRP related to the CORESET group).

The condition 1 may mean a condition for determining whether the BD/CCE limit of a serving cell is exceeded. If a value obtained by adding (the sum of the numbers of BDs/CCEs for PDCCH candidates of a USS for which PDCCH candidates have not been dropped among a total of i+1 USSs ranging from $USS\_0$ to $USS\_i$) and (the sum of the number of BDs/CCEs for PDCCH candidates of CSS) is less than or equal to (BD/CCE limit of the serving cell), condition 1 is satisfied.

The condition 2 may mean a condition for determining whether the BD/CCE limit of a specific TRP (i.e., a CORESET group in which a specific CORESET group index is configured) is exceeded. If a value obtained by adding (the sum of the numbers of BDs/CCEs for PDCCH candidates of USSs (i.e., USSs configured through a CORESET belonging to a CORESET group) defined in the CORESET group (i.e., the CORESET group of a CORESET defined in $USS\_i$) in which $USS\_i$ is defined among a total of i+1 USSs ranging from $USS\_0$ to $USS\_i$) and (the sum of the numbers of BDs/CCEs for PDCCH candidates of CSS defined in the CORESET group) is less than or equal to (BD/CCE limit of the CORESET group in which $USS\_i$ is defined (i.e., BD/CCE limit of a TRP related to the CORESET group), condition 2 is satisfied.

For example, the case in which condition 1 is satisfied but condition 2 is not satisfied may be related to a case in which i) the BD/CCE limit of a serving cell is not exceeded, but ii) the BD/CCE limit is exceeded for at least one of a plurality of TRPs. Alternatively, the case in which none of condition 1 and condition 2 is satisfied may be related to a case in which i) the BD/CCE limit of a serving cell is exceeded, and ii) the BD/CCE limit is exceeded for at least one of a plurality of TRPs. Alternatively, the case in which both of condition 1 and condition 2 are satisfied may be related to a case in which i) the BD/CCE limit of a serving cell is not exceeded, and ii) the BD/CCE limit is exceeded for none of a plurality of TRPs.

<Proposed UE Operation>

Operation 0) Based on both of the condition 1 and the condition 2 being satisfied for $USS\_i$, the UE may monitor PDCCH candidates of $USS\_i$. Also, the UE may perform verification of the condition 1 and the condition 2 by increasing i by 1 (i.e., i=i+1) on the remaining USSs among $USS\_i+1$, $USS\_i+2$, ..., $USS\_N-1$ for which PDCCH candidates have not been dropped.

When the condition 1 and the condition 2 are not satisfied for $USS\_i$, the UE may operate according to one of the following operations 1 to 7.

Operation 1)

Based on the condition 1 and the condition 2 being not satisfied for $USS\_i$, the UE may drop PDCCH candidates from $USS\_i$ to $USS\_N-1$ (i.e., $USS\_i$, $USS\_i+1$, ..., $USS\_N-1$) and may not monitor the related PDCCH candidate.

The operation 1 drops all of the PDCCH candidates for $USS\_i$ and all of the subsequent USSs (i.e., USSs from $USS\_i+1$ to $USS\_N-1$) based on either of the condition 1 and the condition 2 being not satisfied. As a result, the operation 1 provides an advantage that UE implementation may be simplified, but a portion of USSs from $USS\_i+1$ to $USS\_N-1$ may not be monitored even though the related USSs actually satisfy the BD/CCE limit.

Operation 2)

Based on condition 1 being satisfied but condition 2 being not satisfied for $USS\_i$, the UE may drop the PDCCH candidate of USS_i and may not monitor the related PDCCH candidate. Also, among USS_i+1, USS_i+2, . . . , USS_N−1 having an index larger than that of USS_i, the UE may drop the PDCCH candidates of USSs defined in a CORESET group in which USS_i is defined and may not monitor the related PDCCH candidate. The UE may perform verification of condition 1 and condition 2 sequentially for the remaining USSs (i.e., USS_i and USSs defined in a different CORESET group) for which PDCCH candidates have not been dropped among USS_i+1, USS_i+2, . . . , USS_N−1.

Based on condition 1 being not satisfied but condition 2 being satisfied for USS_i, the UE may drop all of the PDCCH candidates from USS_i to USS_N−1 and may not monitor the related PDCCH candidate.

USSs defined in a CORESET group in which USS_i is defined may mean USSs belonging to the CORESETs configured with a CORESET group ID that is the same as the CORESET group ID (e.g., CORESETPoolIndex) configured for a CORESET of USS_i. The aforementioned definition may also be applied to the description of the following proposed operations.

Based on condition 1 being satisfied but condition 2 being not satisfied, the operation 2 may drop all of the USSs for which PDCCH mapping has not been performed yet among USSs defined in a CORESET group in which USS_i is defined. As a result, among USS_i+1, USS_i+2, . . . , USS_N−1, since only the USSs related to the CORESET group in which USS_i is defined are dropped, PDCCH mapping may be performed more efficiently than operation 1 (which drops all of USS_i+1, USS_i+2, . . . , USS_N−1). Also, based on condition 1 being not satisfied but condition 2 being satisfied, operation 2 drops all of USS_i, USS_i+1, USS_i+2, . . . , USS_N−1 in the same way as operation 1, thereby lowering the efficiency of performing PDCCH mapping. At the same time, however, UE implementation may be simplified.

Operation 3)

Based on condition 1 being satisfied but condition 2 being not satisfied for USS_i (as in the case of operation 2 above), the UE may drop PDCCH candidates of USS_i and may not monitor the related PDCCH candidate. Also, among USS_i+1, USS_i+2, . . . , USS_N−1 having an index larger than that of USS_i, the UE may drop the PDCCH candidates of USSs defined in a CORESET group in which USS_i is defined and may not monitor the related PDCCH candidate. The UE may perform verification of condition 1 and condition 2 sequentially for the remaining USSs (i.e., USS_i and USSs defined in a different CORESET group) for which PDCCH candidates have not been dropped among USS_i+1, USS_i+2, . . . , USS_N−1.

Based on condition 1 being not satisfied but condition 2 being satisfied for USS_i, the UE may drop the PDCCH candidate of USS_i and may not monitor the related PDCCH candidate. Also, among USS_i+1, USS_i+2, . . . , USS_N−1 having an index larger than that of USS_i, the UE may drop the PDCCH candidates of USSs defined in a CORESET group in which USS_i is defined and may not monitor the related PDCCH candidate. The UE may perform verification of condition 1 and condition 2 sequentially for the remaining USSs for which PDCCH candidates have not been dropped among USS_i+1, USS_i+2, . . . , USS_N−1.

Based on condition 1 being not satisfied but condition 2 being satisfied, the operation 3 may drop all of the USSs for which PDCCH mapping has not been performed yet among USSs defined in a CORESET group in which USS_i is defined. As a result, among USS_i+1, USS_i+2, . . . , USS_N−1, since only the USSs related to the CORESET group in which USS_i is defined are dropped, PDCCH mapping may be performed more efficiently than operations 1 and 2 (which drop all of USS_i+1, USS_i+2, . . . , USS_N−1).

Operation 4)

Based on condition 1 being satisfied but condition 2 being not satisfied for USS_i, the UE may perform the operation for the related case described in the operation 2.

Based on condition 1 being not satisfied but condition 2 being satisfied for USS_i, the UE may drop the PDCCH candidate of USS_i and may not monitor the related PDCCH candidate. The UE may perform verification of condition 1 and condition 2 sequentially for the remaining USSs for which PDCCH candidates have not been dropped among USS_i+1, USS_i+2, . . . , USS_N−1.

Based on condition 1 being not satisfied but condition 2 being satisfied, the operation 4 drops only USS_i. As a result, PDCCH mapping may be performed more efficiently than operations 1 and 2 (which drop all of USS_i+1, USS_i+2, . . . , USS_N−1) or operation 3 (which drops USS_i and all of USSs related to the same CORESET group among USS_i+1, USS_i+2, . . . , USS_N−1).

Operation 5)

Based on condition 1 being satisfied but condition 2 being not satisfied for USS_i, the UE may drop the PDCCH candidate of USS_i and may not monitor the related PDCCH candidate. The UE may perform verification of condition 1 and condition 2 sequentially for the remaining USSs for which PDCCH candidates have not been dropped among USS_i+1, USS_i+2, . . . , USS_N−1.

Based on condition 1 being not satisfied but condition 2 being satisfied for USS_i, (as in the operation 2 described above) the UE may drop all of the PDCCH candidates from USS_i to USS_N−1 and may not monitor the related PDCCH candidate.

Based on condition 1 being satisfied but condition 2 being not satisfied, the operation 5 drops only USS_i. As a result, PDCCH mapping may be performed more efficiently than UE operation 1 (which drops all of USS_i+1, USS_i+2, . . . , USS_N−1) or UE operations 2, 3, and 4 (which drop USS_i and all of USSs related to the same CORESET group among USS_i+1, USS_i+2, . . . , USS_N−1).

Operation 6)

Based on condition 1 being satisfied but condition 2 being not satisfied for USS_i, as in the operation 5 described above, the UE may drop the PDCCH candidate of USS_i and may not monitor the related PDCCH candidate. The UE may perform verification of condition 1 and condition 2 sequentially for the remaining USSs for which PDCCH candidates have not been dropped among USS_i+1, USS_i+2, . . . , USS_N−1.

Based on condition 1 being not satisfied but condition 2 being satisfied for USS_i, as in the operation 3 described above, the UE may drop the PDCCH candidate of USS_i and may not monitor the related PDCCH candidate. Also, among USS_i+1, USS_i+2, . . . , USS_N−1 having an index larger than that of USS_i, the UE may drop the PDCCH candidates of USSs defined in a CORESET group in which USS_i is defined and may not monitor the related PDCCH candidate. The UE may perform verification of condition 1 and condition 2 sequentially for the remaining USSs for which PDCCH candidates have not been dropped among USS_i+1, USS_i+2, . . . , USS_N−1.

In the case of operation 6, based on condition 1 being satisfied but condition 2 being not satisfied for USS_i, the UE may provide the same advantage and disadvantage as the operation 5. Based on condition 1 being not satisfied but condition 2 being satisfied for USS_i, the UE may provide the same advantage and disadvantage as the operation 3.

Operation 7)

Based on condition 1 being satisfied but condition 2 being not satisfied for USS_i, as in the operation 5 described above, the UE may drop the PDCCH candidate of USS_i and may not monitor the related PDCCH candidate. The UE may perform verification of condition 1 and condition 2 sequentially for the remaining USSs for which PDCCH candidates have not been dropped among USS_i+1, USS_i+2, ..., USS_N−1.

Based on condition 1 being not satisfied but condition 2 being satisfied for USS_i, as described in operation 4, the UE may drop the PDCCH candidate of USS_i and may not monitor the related PDCCH candidate. The UE may perform verification of condition 1 and condition 2 sequentially for the remaining USSs for which PDCCH candidates have not been dropped among USS_i+1, USS_i+2, ..., USS_N−1.

In the case of operation 7, based on condition 1 being satisfied but condition 2 being not satisfied for USS_i, the UE may provide the same advantage and disadvantage as the operation 5. Based on condition 1 being not satisfied but condition 2 being satisfied for USS_i, the UE may provide the same advantage and disadvantage as the operation 4.

Based on both of condition 1 and condition 2 being not satisfied for USS_i, the UE may operate based on one of operations 8 to 10 below.

Operation 8)

The UE may drop PDCCH candidates of USSs from USS_i to USS_N−1 and may not monitor the related PDCCH candidates. Although operation 8 is the simplest scheme in terms of implementation, operation 8 provides a disadvantage in that PDCCH mapping is inefficient since PDCCH candidates of all the USSs from USS_i to USS_N−1.

Operation 9)

The UE may drop the PDCCH candidate of USS_i and may not monitor the related PDCCH candidate. Also, among USS_i+1, USS_i+2, ..., USS_N−1 having an index larger than that of USS_i, the UE may drop the PDCCH candidates of USSs defined in a CORESET group in which USS_i is defined and may not monitor the related PDCCH candidate. The UE may perform verification of condition 1 and condition 2 sequentially for the remaining USSs for which PDCCH candidates have not been dropped among USS_i+1, USS_i+2, ..., USS_N−1.

Since PDCCH candidates of USS_i and USSs defined in a CORESET group in which USS_i is defined among USS_i+1, USS_i+2, ..., USS_N−1 having an index larger than that of USS_i are dropped, and the related PDCCH candidates are not monitored, PDCCH mapping performed by the operation 9 may be more efficient than the UE operation 8. However, since all of the PDCCH candidates of USSs defined in the CORESET group in which USS_i is defined are dropped, the operation 9 may still be inefficient.

Operation 10)

The UE may drop the PDCCH candidate of USS_i and may not monitor the related PDCCH candidate. The UE may perform verification of condition 1 and condition 2 sequentially for the remaining USSs for which PDCCH candidates have not been dropped among USS_i+1, USS_i+2, ..., USS_N−1. Operation 10 is the most complex scheme in terms of UE implementation; however, since only the PDCCH candidates of USS_i are dropped, PDCCH mapping may be the most efficient.

In the proposed UE operations (e.g., operations 0 to 10), specific operations are described in various ways based on whether condition 1 or condition 2 is satisfied (e.g., i) a case in which only condition 1 is satisfied, ii) a case in which only condition 2 is satisfied, iii) a case in which both of the conditions are satisfied, or iv) a case in which none of the two conditions are satisfied). However, it should be noted that the specific operations may be applied in combination/conjunction with each other based on whether condition 1 or condition 2 is satisfied.

<Proposal 3-4>

The Proposal 3-3 verifies whether condition 1 and condition 2 are satisfied based on the parallel relationship between condition 1 (i.e., BD/CCE limit of a serving cell) and condition 2 (i.e., BD/CCE limit of a TRP) and describes the operations based on the verification result.

As another PDCCH mapping rule for satisfying both of the condition 1 and the condition 2, Proposal 3-4 proposes a method (e.g., methods 3-1 to 3-4) of determining PDCCH candidates that may be mapped by first applying either of the condition 1 and the condition 2 and then mapping the PDCCH candidates by applying the other condition.

For the convenience of description, Proposal 3-4 assumes a situation configured as in embodiment 2 below. However, embodiment 2 is only an example introduced for the convenience of description and does not limit the technical scope of the present disclosure. Also, for the convenience of description, embodiment 2 is based on an example of cooperative transmission involving two TRPs; however, it should be understood that the example may be extended and applied to a case of M TRP-based cooperative transmission involving two or more TRPs.

Embodiment 2

Two TRPs (e.g., TRP0, TRP1) operate within one cell. It is assumed that CORESET 0, CORESET 1, and CORESET 2 are configured for the cell; CORESET 0 and CORESET 1 are configured to belong to CORESET group 0; and CORESET 2 is configured to belong to CORESET group 1. Also, SSs related to each CORESET are as follows.

CORESET group 0={CORESET 0, CORESET 1}
CORESET group 1={CORESET 2}
CORESET 0={CSS 0}
CORESET 1={USS 0, USS 1}
CORESET 2={USS 2, USS 3, USS 4, USS 5}

Also, it is assumed that the BD limit of each TRP is 44, r=1.5, namely, the BD limit of a cell is set to 66 (=44*r). It is assumed that CSS0, USS0, USS1, USS2, USS3, USS4, and USS5 are all configured for the same single slot. Also, it is assumed that CSS0, USS0, USS1, USS2, USS3, USS4, and USS5 require 10, 20, 20, 10, 10, 20, and 20 times of BD, respectively.

Since CORESET group 0 is configured with CORESETs (i.e., CORESET 0, 1) used by TRP 0, TRP 0 transmits DCI based on CSS0, USS 0, and USS 1; since CORESET group 1 is configured with CORESETs (i.e., CORESET 2) used by TRP 1, TRP 1 transmits DCI based on USS 2, USS 3, USS 4, and USS 5.

Method 3-1) Another PDCCH mapping rule for satisfying both of the condition 1 and the condition 2 may consider a method of applying the PDCCH mapping rule of the Rel-15 NR from the viewpoint of a TRP after applying the PDCCH mapping rule of the Rel-15 NR from the viewpoint of a serving cell.

Specifically, first, PDCCH mapping/dropping that satisfies the BD/CCE limit of a serving cell is performed by applying the PDCCH mapping rule of the Rel-15 NR (e.g., Table 6). Afterward, among mapped search spaces (SSs), the SSs defined in/related to CORESET group 0 are listed in index order (based on CSS existing, CSS is located before USS), and whether the BD/CCE limit of a TRP is satisfied is checked based on the PDCCH candidates of the SS being mapped one by one from the front.

For example, in embodiment 2, suppose the PDCCH mapping rule of the Rel-15 NR is applied based on the BD limit (e.g., 66) of a serving cell; in this case, among {CSS 0, USS 0, USS 1, USS 2, USS 3, USS 4, USS 5} configured in the same slot, {CSS 0, USS 0, USS 1, USS 2} may be mapped (the remaining SSs are dropped). The PDCCH mapping rule of the Rel-15 NR may be applied in the same manner to {CSS 0, USS 0, USS 1}, which are SSs defined in/related to CORESET group 0 among the SSs, where mapping is performed not to exceed the BD/CCE limit of a TRP rather than the BD/CCE limit of a serving cell.

Since the BD limit of a TRP is set to 44, and {CSS 0, USS 0, USS 1} requires {10, 20, 20} times of BD, respectively, CSS0 and USS 0 are mapped, but USS 1 is dropped. In the presence of USSs with an index higher than that of USS 1, all of the USSs are also dropped. The same process may also be performed for the SS defined in/related to CORESET group 1 to perform PDCCH mapping satisfying (i.e., not exceeding) both the BD/CCE limit of a serving cell and the BD/CCE limit of a TRP.

Method 3-2) In the reverse order of the method 1, after the PDCCH mapping rule of the Rel-15 NR is applied from the viewpoint of a TRP, the PDCCH mapping rule of the Rel-15 NR may be applied from the viewpoint of a serving cell.

For example, in the embodiment 2, based on the BD/CCE limit (e.g., BD limit=44) of a TRP for {CSS 0, USS 0, USS 1} defined in CORESET group 0, the Rel-15 mapping rule is applied. As a result, {CSS 0, USS 0} may be mapped. And for {USS 2, USS 3, USS 4, USS 5} defined in CORESET group 1, the Rel-15 mapping rule is applied based on the BD/CCE limit of a TRP. As a result, {USS 2, USS 3, USS 4} may be mapped. The Rel-15 mapping rule based on the BD/CCE limit (e.g., BD limit=66) of a serving cell is applied for {CSS 0, USS 0, USS 2, USS 3, USS 4}, which is the union of the mapping results for individual TRPs. As a result, {CSS 0, USS 0, USS 2, USS 3} may be mapped.

Method 3-3) Based on the M-TRP transmission scheme being configured/used in the PCell (or SpCell), the UE does not expect the BS to perform overbooking of PDCCHs. In other words, based on the M-TRP transmission scheme being configured/used, the BS configures PDCCHs within a range not exceeding the BD/CCE limit of a TRP and the BD/CCE limit of a serving cell even for the case of the PCell.

Method 3-4) The UE does not expect the PDCCHs mapped as a result of applying the PDCCH mapping rule of the Rel-15 NR based on the BD/CCE limit of a serving cell to exceed the BD/CCE limit of a TRP.

In other words, the BS configures PDCCHs so that the PDCCHs mapped as a result of applying the PDCCH mapping rule of the Rel-15 NR based on the BD/CCE limit of a serving cell do not exceed the BD/CCE limit of a TRP. As a result, the method does not cause a case in which condition 1 is satisfied but condition 2 is not satisfied. In this case, a scheduling problem may occur, but the PDCCH mapping rule of the Rel-15 NR may still be used without modification.

Meanwhile, suppose that the BD/CCE limit of a TRP instead of the BD/CCE limit of a cell is applied as in the method 2-2 of Proposal 2 or the BD/CCE limit of a TRP is applied first as in the method 3-2 of Proposal 3. In this case, the BD/CCE limit of a TRP used may be determined/configured as follows.

For example, the BD/CCE limit of a TRP may be determined as the smaller of a predefined value (e.g., Table 8, Table 8) and the value of [BD/CCE limit of a serving cell/2 (e.g., predefined value*r/2)]. As a result, based on that the predefined value is set to 44 and r is set to 1.5, the BD/CCE limit of a TRP is determined as 33 (=min(44, 44*1.5/2)).

As a result, even though the method 2-2 of Proposal 2 is used, PDCCH mapping that satisfies both of the BD/CCE limit of a TRP and the BD/CCE limit of a serving cell is performed. Based on that the BD/CCE limit of a TRP is determined as a predefined value in the example above, the PDCCH mapping result of the method 2-2 of Proposal 2 may satisfies the BD/CCE limit of a TRP but fail to satisfy the BD/CCE limit of a serving cell.

Alternatively, in the example above, rather than [BD/CCE limit of a serving cell/2], [BD/CCE limit of a serving cell*2] and [BD/CCE limit of a serving cell*(1-a)] may be used. Here, a satisfies a condition that 0<a<1 and may be informed to the US by the BS through RRC signaling. As a result, TRP 1 may use [BD/CCE limit of a serving cell*2] instead of [BD/CCE limit of a serving cell/2], and TRP 2 may use [BD/CCE limit of a serving cell*(1-a)] instead of [BD/CCE limit of a serving cell/2].

For the convenience of description, cooperative transmission of two TRPs was used as an example, the proposal above may be extended to the M-TRP transmission case. At this time, [BD/CCE limit of a serving cell/2] is changed to [BD/CCE limit of a serving cell/M] (where M is the number of TRPs). Also, the BD/CCE limit of TRP i is determined as the smaller of a predefined value and [BD/CCE limit of a serving cell*ai]. The ai is a value informed to the UE by the BS through RRC signaling and satisfies that a0+a1+ ... +aM−1=1 and 0<ai<1. In other words, ai may mean a value that determines an allocation ratio of how much the BD/CCE limit of a serving cell is allocated to each TRP.

Based on applying the PDCCH mapping rule of the Rel-15 NR for each TRP in the method 3-2 of Proposal 3, the BD/CCE limit of a TRP may be determined by the proposal above. In this case, the method 3-2 of Proposal 3 may apply the PDCCH mapping rule of the Rel-15 NR from the viewpoint of a TRP and afterward, satisfy both of the BD/CCE limit of a TRP and the BD/CCE limit of a serving cell even though the PDCCH mapping rule of the Rel-15 NR is not applied from the viewpoint of a serving cell.

FIG. 10 shows signaling in which a UE receives a single DCI (i.e., one TRP transmits a DCI to the UE) when there are M-TRPs (or M-cells; hereinafter, all TRPs can be replaced with cells, or it may be assumed that there are M-TRPs also when a plurality of CORESETs (/CORESET groups) from one TRP are configured). In FIG. 10, it is assumed that TRP 1 is a representative TRP that transmits DCI. However, this assumption does not limit the technical scope of the present disclosure.

Although the following description will be given with respect to "TRP", "TRP" may be replaced with other expressions such as a panel, an antenna array, a cell (e.g., macro cell/small cell/pico cell), a TP (transmission point), and a base station (gNB). Also, as described above, the TRPs may be divided according to information (e.g., index, ID) on a CORESET group (or CORESET pool). For example, if one UE is configured to perform transmission and reception to and from multiple TRPs (or cells), this may mean that multiple CORESET groups (or CORESET pools) are configured for one UE. Such a configuration for CORESET groups (or CORESET pools) may be performed through higher layer signaling (e.g., RRC signaling).

Referring to FIG. 10, although signaling between two TRPs and a UE is considered for the convenience of description, the related signaling scheme may be extended and applied to signaling between a plurality of TRPs and a plurality of UEs. In what follows, the network side may be one base station including a plurality of TRPs and may be one cell including a plurality of TRPs. For example, an ideal/non-ideal backhaul may be configured between TRP 1 and TRP 2 constituting the network side. Also, the following description is described based on a plurality of TRPs; however, the description may be equally extended and applied to the transmission through a plurality of panels. In addition, in the present disclosure, the UE's operation of receiving a signal from TRP1/TRP2 may be interpreted/described as (or may be) a UE's operation of receiving a signal from the network side (through/using TRP1/2); the UE's operation of transmitting a signal to TRP1/TRP2 may be interpreted/described as (or may be) a UE's operation of transmitting a signal to the network side (via/using TRP1/TRP2) and vice versa.

The UE may receive configuration information related to multiple TRP-based transmission and reception through/using TRP 1 (and/or TRP 2) from a network side (S1405). That is, the network side may transmit configuration information related to multiple TRP transmission and reception to the UE through/using TRP 1 (and/or TRP 2) (S1405). The configuration information may include information related to the configuration of the network side (i.e., TRP configuration), resource information related to multiple TRP-based transmission and reception (resource allocation), and so on. The configuration information may be delivered through higher-layer signaling (e.g., RRC signaling, MAC-CE, etc.). Also, if the configuration information is predefined or preset, the corresponding step may be omitted.

For example, the configuration information may include configuration information for the operation described in the proposed methods (e.g., Proposal 1/Proposal 2/Proposal 3).

For example, the configuration information may include CORESET-related configuration information (e.g., ControlResourceSet IE). The CORESET-related configuration information may include CORESET-related ID (e.g., ControlResourceSetID), index of a CORESET pool for a CORESET (e.g., CORESETPool index), time/frequency resource configuration of a CORESET, and TCI information related to a CORESET. The index of a CORESET pool (e.g., CORESETPool index) may mean a specific index (e.g., CORESET group index or HARQ Codebook index) mapped to/configured for each CORESET.

For example, in the above step S1005, an operation in which the UE (100/200 of FIGS. 13 to 17) receives configuration information related to the multiple TRP-based transmission and reception from the network side (100/200 of FIGS. 13 to 17) may be implemented by an apparatus of FIGS. 13 to 17 to be described below. For example, referring to FIG. 14, one or more processors 102 may control one or more transceivers 106 and/or one or more memories 104 to receive the configuration information related to the multiple TRP-based transmission and reception, and one or more transceivers 106 may receive the configuration information related to the multiple TRP-based transmission and reception from the network side.

Similarly, in the above step S1005, an operation in which the network side (100/200 of FIGS. 13 to 17) transmits configuration information related to the multiple TRP-based transmission and reception to the UE (100/200 of FIGS. 13 to 17) may be implemented by an apparatus of FIGS. 13 to 17 to be described below. For example, referring to FIG. 14, one or more processors 102 may control one or more transceivers 106 and/or one or more memories 104 to transmit the configuration information related to the multiple TRP-based transmission and reception, and the configuration information related to the multiple TRP-based transmission and reception is transmitted, by one or more transceivers 106, from the network side.

The UE may receive DCI 1 and Data 1 scheduled by the related DCI 1 through/using TRP 1 from the network side S1010-1. Also, the UE may receive DCI 2 and Data 2 scheduled by the related DCI 2 through/using TRP 2 from the network side S1010-2. In other words, the network side may transmit DCI 1 and Data 1 scheduled by the related DCI 1 through/using TRP 1 to the UE S1010-1. Also, the network side may transmit DCI 2 and Data 2 scheduled by the related DCI 2 through/using TRP 2 to the UE S1010-2. For example, DCI (e.g., DCI 1, DCI 2) and Data (e.g., Data 1, Data 2) may be transmitted through a control channel (e.g., PDCCH) and data channel (e.g., PDSCH), respectively. Also, the DCI 1 and/or the DCI 2 may include scheduling information for a PDSCH for transmission/reception of the Data 1 and/or the Data 2. Also, the S1010-1 and S1010-2 steps may be performed simultaneously, or one may be performed earlier than the other.

For example, as described with respect to the method (e.g., Proposal 1/Proposal 2/Proposal 3), the DCI 1 and/or the DCI 2 may be received through PDCCH monitoring for a search space (SS) of each TRP. In other words, the DCI 1 and/or the DCI 2 may be received on monitored PDCCH candidates.

For example, based on the proposed method (e.g., Proposal 1/Proposal 2/Proposal 3), the UE may perform PDCCH monitoring for an SS (USS/CSS) for each TRP. For example, the UE may perform PDCCH monitoring for the SS(s) of TRP 1/SS(s) of TRP 2 by considering the maximum number of BDs/CCEs allocated to the SS(s) of each TRP. For example, the UE may perform PDCCH monitoring by considering whether the network side for which M-TRP transmission is applied is PCell (and/or SpCell) or SCell.

For example, based on the PDCCH mapping rule described in the proposed method (e.g., Proposal 1/Proposal 2/Proposal 3), PDCCH candidates to be monitored for SS (USS/CSS) for each TRP may be determined/mapped. For example, PDCCH mapping for the SS may be performed by considering the index order of CORESET group/SS (e.g., USS). For example, dropping/monitoring of PDCCH candidates may be performed based on whether the maximum number of BD/CCEs configured for a cell and the maximum number of BD/CCEs configured for a TRP are satisfied.

For example, the UE (100/200 of FIGS. 13 to 17) operation of receiving the DCI 1 and/or the DCI 2 and/or the Data 1 and/or the Data 2 from the network side (100/200 in FIGS. 13 to 17) in the S1010-1/S1010-2 step may be implemented by the device of FIGS. 13 to 17 to be described below. For example, referring to FIG. 14, one or more processors 102 may control one or more transceivers 106 and/or one or more memories 104 to receive the DCI 1 and/or the DCI 2 and/or the Data 1 and/or the Data 2; one or more transceivers 106 may receive the DCI 1 and/or the DCI 2 and/or the Data 1 and/or the Data 2 from the network side.

Similarly to the description above, the network side (100/200 of FIGS. 13 to 17) operation of transmitting the DCI 1 and/or the DCI 2 and/or the Data 1 and/or the Data 2 to the UE (100/200 in FIGS. 13 to 17) in the S1010-1/S1010-2 step may be implemented by the device of FIGS. 13 to 17 to be described below. For example, referring to FIG. 14, one or more processors 102 may control one or more transceivers 106 and/or one or more memories 104 to transmit the DCI 1 and/or the DCI 2 and/or the Data 1 and/or the Data 2; one or more transceivers 106 may transmit the DCI 1 and/or the DCI 2 and/or the Data 1 and/or the Data 2 from the network side.

The UE may decode Data 1 and Data 2 received from TRP 1 and TRP 2 S1015. For example, the UE may perform channel estimation and/or data decoding based on the method above (e.g., Proposal 1/Proposal 2/Proposal 3).

For example, the UE (100/200 of FIGS. 13 to 17) operation of decoding the Data 1 and the Data 2 in the S1015 step may be implemented by the device of FIGS. 13 to 17 to be described below. For example, referring to FIG. 14, one or more processors 102 may control one or more memories 104 to perform the operation of decoding the Data 1 and the Data 2.

Based on the proposed method (e.g., Proposal 1/Proposal 2/Proposal 3), the UE may transmit HARQ-ACK information (e.g., ACK information or NACK information) on the DCI and/or the Data 1 and/or the Data 2 to the network side through one or more PUCCH(s) through/based on TRP 1 and/or TRP 2 S1320-1, S1320-2. In other words, based on the proposed method (e.g., Proposal 1/Proposal 2/Proposal 3), the network side may receive the HARQ-ACK information (e.g., ACK information or NACK information) on the DCI and/or the Data 1 and/or Data 2 through/based on TRP 1 and/or TRP 2 S1020-1, S1020-2.

For example, the HARQ-ACK information on Data 1 and/or Data 2 may be combined into 1 or separated from each other. Also, the UE may be configured to transmit only the HARQ-ACK information to a representative TRP (e.g., TRP 1), and transmission of the HARQ-ACK information to other TRPs (e.g., TRP 2) may be omitted.

For example, the UE (100/200 of FIGS. 13 to 17) operation of transmitting the HARQ-ACK information on the Data 1 and/or Data 2 to the network side (100/200 in FIGS. 13 to 17) through one or more PUCCHs in the S1020-1/S1020-2 step may be implemented by the device of FIGS. 13 to 17 to be described below. For example, referring to FIG. 14, one or more processors 102 may control one or more transceivers 106 and/or one or more memories 104 to transmit the HARQ-ACK information on the Data 1 and/or the Data 2 through one or more PUCCHs; one or more transceivers 106 may transmit the HARQ-ACK information on the Data 1 and/or the Data 2 to the network side.

Similarly to the description above, the network side (100/200 of FIGS. 13 to 17) operation of receiving the HARQ-ACK information on the Data 1 and/or the Data 2 from the UE (100/200 of FIGS. 13 to 17) through one or more PUCCHs may be implemented by the device of FIGS. 13 to 17 to be described below. For example, referring to FIG. 14, one or more processors 102 may control one or more transceivers 106 and/or one or more memories 104 to receive the HARQ-ACK information on the Data 1 and/or the Data 2; one or more transceivers 106 may receive the HARQ-ACK information on the Data 1 and/or the Data 2 from the UE.

FIG. 10 illustrates mainly the multi-DCI based M-TRP operation, but can be applied to a single DCI based M-TRP operation, if necessary or desired.

FIG. 11 illustrates one example of an operation flow diagram of a UE receiving downlink control information applicable to the proposed methods (e.g., Proposal 1/Proposal 2/Proposal 3) based on the present disclosure. The UE may be supported by a plurality of TRPs, and ideal/non-ideal backhaul may be configured between the plurality of TRPs. FIG. 11 is merely for convenience of explanation and does not limit the scope of the present disclosure. Some step(s) illustrated in FIG. 11 may be omitted according to situation and/or configuration.

The following description is given based on "TRP", but as described above, the "TRP" may be applied by being replaced by an expression, such as a panel, an antenna array, a cell (e.g., macro cell/small cell/pico cell, etc.), a transmission point (TP), and a base station (e.g., gNB, etc.). Further, as described above, the TRPs may be distinguished according to information (e.g., index, ID) on CORESET group (or CORESET pool). For example, if one UE is configured to perform transmission and reception with multiple TRPs (or cells), this may mean that multiple CORESET groups (or CORESET pools) are configured to one UE. Such a configuration for the CORESET group (or CORESET pool) may be performed via higher layer signaling (e.g., RRC signaling).

The UE may receive configuration information S1110. The configuration information may be received through higher layer signaling (e.g., RRC or MAC CE). For example, the configuration information may include configurations for the operation described in the proposed methods (e.g., Proposal 1/Proposal 2/Proposal 3).

For example, the configuration information may include CORESET-related configuration information (e.g., ControlResourceSet IE). The CORESET-related configuration information may include CORESET-related ID (e.g., ControlResourceSetID), index of a CORESET pool for a CORESET (e.g., CORESETPool index), time/frequency resource configuration of a CORESET, and TCI information related to a CORESET.

For example, the configuration information may include configuration information on the search space (e.g., SearchSpace) as described in the proposed methods (e.g., Proposal 1/Proposal 2/Proposal 3). As one example, the configuration information may include a search space set index, association between the search space set and a CORESET, a PDCCH monitoring period/offset, the number of PDCCH candidates per CCE aggregation level, and the type of the search space set (i.e., USS or CSS).

For example, the configuration information may be related to the search space. Based on the configuration information, a plurality of search spaces may be configured for a plurality of control resource sets (CORESETs). For example, the plurality of search spaces may include a search space configured for a CORESET related to a first CORESET group and search spaces configured for a CORESET related to a second CORESET group.

The plurality of search spaces may include UE-specific search spaces (USSs) and common search space (CSS). Each search space may include one or more physical downlink control channel (PDCCH) candidates. Each PDCCH candidate may include one or more control channel elements (CCEs).

For example, in the above step S1110, an operation in which the UE (100/200 of FIGS. 13 to 17) receives configuration information may be implemented by an apparatus of FIGS. 13 to 17 to be described below. For example, referring to FIG. 14, one or more processors 102 may control one or more transceivers 106 and/or one or more memories 104 to receive the configuration information, and one or more transceivers 106 may receive the configuration information.

PDCCH candidates to be monitored may be determined within the plurality of search spaces S1120. For example, the PDCCH candidates to be monitored may be determined based on the proposed methods (e.g., Proposal 1/Proposal 2/Proposal 3). This scheme may mean that the number of PDCCH candidates included in each of a plurality of search spaces are accumulated and counted, where it is checked whether a predefined limit value (e.g., the first limit/the second limit) is exceeded, and the PDCCH candidates are determined within a range that does not exceed the limit value.

For example, the first limit and the second limit related to the number of PDCCH candidates to be monitored may be predefined. The first limit may be a value configured for a serving cell, and the second limit may be a value configured for a CORESET for which each search space is configured and a related CORESET group. For example, the first limit and the second limit may be based on the BD/CCE limit of the present disclosure. For example, the first limit and the second limit may be i) the maximum number of the PDCCH candidates to be monitored or ii) the maximum number of control channel elements (CCEs). For example, the maximum number of PDCCH candidates to be monitored may be configured for each of a serving cell and a CORESET group. Or, the maximum number of CCEs may be configured for each of the serving cell and the CORESET group.

For example, the first limit may be determined based on the value of the second limit. As a specific example, the first limit may be determined as the second limit value multiplied by a specific value. The UE may transmit capability information that includes the specific value.

For example, PDCCH candidates to be monitored may be determined within a range less than or equal to the first limit and the second limit. In other words, the number of PDCCH candidates to be monitored may be less than or equal to the first limit and the second limit.

The PDCCH candidates included in the CSSs may be determined as the PDCCH candidates to be monitored regardless of the first limit and the second limit. The USSs may be arranged in the ascending order of the USS indices. The PDCCH candidates to be monitored may be determined sequentially in the ascending order of the USS indices within a range in which the cumulative number of PDCCH candidates included in the individual USSs starting from a USS with the lowest index does not exceed the first limit and the second limit.

For example, the step of determining PDCCH candidates to be monitored within the plurality of search spaces may include the steps (i) to (iv) below. The PDCCH candidates included in the CSSs are assumed to have been determined as PDCCH candidates to be monitored regardless of the first limit and the second limit.

(i) Step of arranging the USS in the ascending order of the USS indices, where USS_i represents the i-th USS, and index i is a positive integer including 0.

(ii) Step of comparing a first value, which is the {sum of (the number of PDCCH candidates of USSs related to the indices from 0 to i) and (the number of PDCCH candidates of the CSSs)}, with the first limit.

For example, the BD/CCE limit configured for a cell may be compared with the first value.

(iii) Step of comparing a second value, which is the {sum of (the number of PDCCH candidates of USSs included in a CORESET group related to USS_i among USSs related to the indices from 0 to i) and (the number of PDCCH candidates of the CSSs)}, with the second limit configured for a CORESET group related to USS_i.

For example, the BD/CCE limit configured for each CORESET group may be compared with the second value.

(iv) The PDCCH candidates to be monitored may be determined within a range less than or equal to the first limit and the second limit.

For example, suppose the first value is less than or equal to the first limit, and the second value exceeds the second limit configured for a CORESET group related to the USS_i; in this case, the USSs with an index larger than or equal to i, which are included in the CORESET group related to USS_i, may not be monitored. In other words, PDCCHs to be monitored are not determined for the USSs. Also, the PDCCH candidates to be monitored may be determined within the second limit based on the remaining USSs with an index larger than or equal to i, which are included in CORESET groups other than the CORESET group related to the USS_i.

For example, based on the first value exceeding the first limit, the USSs having an index larger than or equal to i may not be monitored. In other words, based on the first value exceeding the first limit, PDCCH candidates may not be mapped for the USSs having an index larger than or equal to i.

Alternatively, based on the second value exceeding the second limit, the USSs having an index larger than or equal to i may not be monitored. In other words, based on the second value exceeding the second limit, PDCCH candidates may not be mapped for the USSs having an index larger than or equal to i.

As another example, the step of determining PDCCH candidates to be monitored within the plurality of search spaces may include (i) a step of selecting first search spaces based on the second limit among the plurality of search spaces and (ii) a step of determining the PDCCH candidates to be monitored based on the first limit among the first search spaces. In this case, the second limit may be determined as the smaller of a value predefined as the second limit and {the first limit/the number of CORESET groups related to the plurality of CORESETs}.

For example, search spaces may be configured for each of a CORESET related to a first CORESET group and a CORESET related to a second CORESET group. Based on the fact that the index of the first CORESET group is lower than that of the second CORESET group, the search spaces configured for the CORESET related to the first CORESET group may be determined first sequentially as the PDCCH candidates to be monitored within a range not exceeding the first limit and the second limit. In other words, search spaces configured for a CORESET with a low CORESET group index (e.g., CORESETPoolIndex) may be determined first as the PDCCH candidates to be monitored.

For example, the UE (100/200 of FIGS. 13 to 17) operation of determining PDCCH candidates to be monitored in the S1120 step may be implemented by the device of FIGS. 13 to 17 to be described below. For example, referring to FIG. 14, one or more processors 102 may control one or more transceivers 106 and/or one or more memories 104 to determine the PDCCH candidates to be monitored.

The UE may monitor the determined PDCCH candidates to be monitored S1130. Also, the UE may receive DCI based on the monitoring S1140. In other words, the UE may monitor PDCCH candidates within one or more search space sets. The DCI may be transmitted through a downlink control channel (e.g., PDCCH). For example, the operation of monitoring the PDCCH candidates and receiving DCI based on the monitoring may be performed based on the proposed methods (e.g., Proposal 1/Proposal 2/Proposal 3).

For example, a plurality of DCI may be received, first DCI based on a first CORESET group and second DCI based on a second CORESET group may be received. As described in the proposed methods (e.g., Proposal 1/Proposal 2/Proposal 3), a CORESET group may include one or more CORESETs related to the same CORESETPool index and may be the concept related to a CORESET pool. Therefore, receiving each DCI based on a different CORESET group may mean receiving each DCI through a CORESET related to a different CORESETPool index. In other words, the CORESETPool index related to a CORESET on which each DCI is received may be configured differently.

For example, the UE (100/200 of FIGS. 13 to 17) operation of monitoring PDCCH candidates and receiving DCI based on the monitoring in the S1130 and S1140 steps may be implemented by the device of FIGS. 13 to 17 to be described below. For example, referring to FIG. 14, one or more processors 102 may control one or more transceivers 106 and/or one or more memories 104 to receive DCI based on monitoring; one or more transceivers 106 may receive the DCI.

FIG. 12 illustrates one example of an operation flow diagram of a BS transmitting downlink control information applicable to the proposed methods (e.g., Proposal 1/Proposal 2/Proposal 3) based on the present disclosure. The example of FIG. 12 is only for the convenience of description and is not intended to limit the technical scope of the present disclosure. Also, a portion of the step(s) shown in FIG. 12 may be omitted depending on a situation and/or a configuration.

The base station and the UE may collectively refer to an object performing data transmission and reception. For example, the base station may be a concept including one or more transmission points (TPs) and one or more transmission and reception points (TRPs). Also, the TPs and/or TRPs may include the base station's panels, transmission and reception units, etc. Also, as described above, the TRPs may be divided according to information (e.g., index, ID) on a CORESET group (or CORESET pool). For example, if one UE is configured to perform transmission and reception to and from multiple TRPs (or cells), this may mean that multiple CORESET groups (or CORESET pools) are configured for one UE. Such a configuration for CORESET groups (or CORESET pools) may be performed via higher layer signaling (e.g., RRC signaling).

A base station may transmit configuration information to a UE, in S1210. The configuration information may be transmitted through higher layer signaling (e.g., RRC or MAC CE). For example, the configuration information may include configurations for the operation described in the proposed methods (e.g., Proposal 1/Proposal 2/Proposal 3).

For example, the configuration information may include CORESET-related configuration information (e.g., ControlResourceSet IE). The CORESET-related configuration information may include CORESET-related ID (e.g., ControlResourceSetID), index of a CORESET pool for a CORESET (e.g., CORESETPool index), time/frequency resource configuration of a CORESET, and TCI information related to a CORESET.

For example, the configuration information may include configuration information on the search space (e.g., SearchSpace) as described in the proposed methods (e.g., Proposal 1/Proposal 2/Proposal 3). As one example, the configuration information may include a search space set index, association between the search space set and a CORESET, a PDCCH monitoring period/offset, the number of PDCCH candidates per CCE aggregation level, and the type of the search space set (i.e., USS or CSS).

For example, the configuration information may be related to the search space. Based on the configuration information, a plurality of search spaces may be configured for a plurality of control resource sets (CORESETs). For example, the plurality of search spaces may include a search space configured for a CORESET related to a first CORESET group and search spaces configured for a CORESET related to a second CORESET group.

The plurality of search spaces may include UE-specific search spaces (USSs) and common search space (CSS). Each search space may include one or more physical downlink control channel (PDCCH) candidates. Each PDCCH candidate may include one or more control channel elements (CCEs).

For example, an operation for the base station (100/200 of FIGS. 13 to 17) of the above-described step S1210 to transmit the configuration information may be implemented by the device of FIGS. 13 to 17 to be described below. For example, referring to FIG. 14, one or more processors 102 may control one or more transceivers 106 and/or one or more memories 104 so as to transmit the configuration information, and the one or more transceivers 106 may transmit the configuration information.

The BS may transmit DCI to the UE S1220. The DCI may be transmitted through physical downlink control channel (PDCCH) candidates.

For example, a plurality of DCI may be transmitted. The BS may transmit first DCI based on a first CORESET group and second DCI based on a second CORESET group. As described in the proposed methods (e.g., Proposal 1/Proposal 2/Proposal 3), a CORESET group may include one or more CORESETs related to the same CORESETPool index and may be the concept related to a CORESET pool. Therefore, transmitting each DCI based on a different CORESET group may mean transmitting each DCI through a CORESET related to a different CORESETPool index. In other words, the CORESETPool index related to a CORESET on which each DCI is transmitted may be configured differently.

For example, a first limit and a second limit related to the number of PDCCH candidates may be predefined. The first limit may be a value configured for a serving cell, and the second limit may be a value configured for a CORESET group related to a CORESET for which each search space is configured. The number of the PDCCH candidates may be determined as a value less than or equal to the first limit and the second limit. As an example, based on at least one of the first limit or the second limit being exceeded, PDCCH candidates may be dropped.

For example, in the above step S1220, an operation in which the base station (100/200 of FIGS. 13 to 17) transmits DCI may be implemented by an apparatus of FIGS. 13 to 17 to be described below. For example, referring to FIG. 14, one or more processors 102 may control one or more transceivers 106 and/or one or more memories 104 to transmit the DCI, and one or more transceivers 106 may transmit the DCI.

As described above, the network side/UE signaling and operation (e.g., Proposal 1/Proposal 2/Proposal 3/FIG. 10/FIG. 11/FIG. 12) may be implemented by the device (e.g., FIGS. 13 to 17) to be described later. For example, the network side (e.g., TRP 1/TRP 2) may be related to a first wireless device. Depending on the situation, the UE may be related to a second wireless device or vice versa. For example, the first device (e.g., TRP 1)/the second device (e.g., TRP 2) may be related to the first wireless device, and the UE may be related to the second wireless device, or vice versa depending on the situation.

For example, the network side/UE signaling and operation (e.g., Proposal 1/Proposal 2/Proposal 3/FIG. 10/FIG. 11/FIG. 12) may be processed by one or more processors (e.g., 102, 202) of FIGS. 13 to 17. The network side/UE signaling and operation (e.g., Proposal 1/Proposal 2/Proposal 3/FIG. 10/FIG. 11/FIG. 12) may be stored in one or more memories (e.g., 104, 204) in the form of commands/programs (e.g., instruction, executable code) for driving at least one processor (e.g., 102, 202) of FIGS. 13 to 17.

For example, in a device including at least one or more memories and one or more processors functionally connected to the one or more memories, the one or more processors may be configured to control the device to receive configuration information related to a search space; determine PDCCH candidates to be monitored within a plurality of search spaces, wherein the plurality of search spaces are configured for a plurality of control resource sets (CORESETs) based on the configuration information, and each search space includes one or more physical downlink control channel (PDCCH) candidates; monitor the PDCCH candidates to be monitored; and receive the DCI based on the monitoring, wherein a first limit and a second limit related to the number of the PDCCH candidates to be monitored are predefined, the first limit is a value configured for a serving cell, the second limit is a value configured for a CORESET group related to a CORESET in which each space is configured, and the number of PDCCH candidates to be monitored is smaller than or equal to the first limit and the second limit.

For example, in one or more non-transitory computer-readable media storing one or more instructions, the one or more instructions executable by one or more processors may comprise instructions instructing a User Equipment (UE) to receive configuration information related to a search space; determine PDCCH candidates to be monitored within a plurality of search spaces, wherein the plurality of search spaces are configured for a plurality of control resource sets (CORESETs) based on the configuration information, and each search space includes one or more physical downlink control channel (PDCCH) candidates; monitor the PDCCH candidates to be monitored; and receive the DCI based on the monitoring, wherein a first limit and a second limit related to the number of the PDCCH candidates to be monitored are predefined, the first limit is a value configured for a serving cell, the second limit is a value configured for a CORESET group related to a CORESET in which each space is configured, and the number of PDCCH candidates to be monitored is smaller than or equal to the first limit and the second limit.

Communication System Applied to the Disclosure

The various descriptions, functions, procedures, proposals, methods, and/or operational flowcharts of the disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

FIG. 13 illustrates a communication system applied to the disclosure.

Referring to FIG. 13, a communication system applied to the disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 1010a, vehicles 1010b-1 and 1010b-2, an eXtended Reality (XR) device 1010c, a hand-held device 1010d, a home appliance 1010e, an Internet of Things (IoT) device 1010f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 1010a to 1010f may be connected to the network 300 via the BSs 1020. An AI technology may be applied to the wireless devices 1010a to 1010f and the wireless devices 1010a to 1010f may be connected to the AI server 400 via the network 300. The network 300 may be configured using a 3G network, a 4G (e.g., LTE) network, or a 5G (e.g., NR) network. Although the wireless devices 1010a to 1010f may communicate with each other through the BSs 1020/network 300, the wireless devices 1010a to 1010f may perform direct communication (e.g., sidelink communication) with each other without passing through the BSs/network. For example, the vehicles 1010b-1 and 1010b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 1010a to 1010f.

Wireless communication/connections 150a, 150b, or 150c may be established between the wireless devices 1010a to 1010f/BS 1020, or BS 1020/BS 1020. Herein, the wireless communication/connections may be established through various RATs (e.g., 5G NR) such as uplink/downlink communication 150a, sidelink communication 150b (or, D2D communication), or inter BS communication (e.g. Relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the disclosure.

Wireless Devices Applicable to the Disclosure

FIG. 14 illustrates wireless devices applicable to the disclosure.

Referring to FIG. 14, a first wireless device 100 and a second wireless device 200 may transmit radio signals through a variety of RATs (e.g., LTE and NR). Herein, {the first wireless device 100 and the second wireless device 200} may correspond to {the wireless device 1010x and the BS 1020} and/or {the wireless device 1010x and the wireless device 1010x} of FIG. 13.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the disclosure, the wireless device may represent a communication modem/circuit/chip.

The second wireless device 200 may include at least one processor 202 and at least one memory 204 and additionally further include at least one transceiver 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 206 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage medium, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. From RF band signals into baseband signals in order to process received user data, control information, radio signals/channels, etc. Using the one or more processors 102 and 202. The one or more transceivers 106 and 206 may convert the user data, control information, radio signals/channels, etc. Processed using the one or more processors 102 and 202 from the base band signals into the RF band signals. To this end, the one or more transceivers 106 and 206 may include (analog) oscillators and/or filters.

Signal Processing Circuit Example to which Disclosure is Applied

FIG. 15 illustrates a signal processing circuit for a transmit signal.

Referring to FIG. 15, a signal processing circuit 1000 may include a scrambler 1010, a modulator 1020, a layer mapper 1030, a precoder 1040, a resource mapper 1050, and a signal generator 1060. Although not limited thereto, an operation/function of FIG. 15 may be performed by the processors 102 and 202 and/or the transceivers 106 and 206 of FIG. 14. Hardware elements of FIG. 15 may be implemented in the processors 102 and 202 and/or the transceivers 106 and 206 of FIG. 14. For example, blocks 1010 to 1060 may be implemented in the processors 102 and 202 of FIG. 14. Further, blocks 1010 to 1050 may be implemented in the processors 102 and 202 of FIG. 14 and the block 1060 may be implemented in the transceivers 106 and 206 of FIG. 14.

A codeword may be transformed into a radio signal via the signal processing circuit 1000 of FIG. 15. Here, the codeword is an encoded bit sequence of an information block. The information block may include transport blocks (e.g., a UL-SCH transport block and a DL-SCH transport block). The radio signal may be transmitted through various physical channels (e.g., PUSCH and PDSCH).

Specifically, the codeword may be transformed into a bit sequence scrambled by the scrambler 1010. A scramble sequence used for scrambling may be generated based on an initialization value and the initialization value may include ID information of a wireless device. The scrambled bit sequence may be modulated into a modulated symbol sequence by the modulator 1020. A modulation scheme may include pi/2-BPSK(pi/2-Binary Phase Shift Keying), m-PSK(m-Phase Shift Keying), m-QAM(m-Quadrature Amplitude Modulation), etc. A complex modulated symbol sequence may be mapped to one or more transport layers by the layer mapper 1030. Modulated symbols of each transport layer may be mapped to a corresponding antenna port(s) by the precoder 1040 (precoding). Output z of the precoder 1040 may be obtained by multiplying output y of the layer mapper 1030 by precoding matrix W of N*M. Here, N represents the number of antenna ports and M represents the number of transport layers. Here, the precoder 1040 may perform precoding after performing transform precoding (e.g., DFT transform) for complex modulated symbols. Further, the precoder 1040 may perform the precoding without performing the transform precoding.

The resource mapper 1050 may map the modulated symbols of each antenna port to a time-frequency resource. The time-frequency resource may include a plurality of symbols (e.g., CP-OFDMA symbol and DFT-s-OFDMA symbol) in a time domain and include a plurality of subcarriers in a frequency domain. The signal generator 1060 may generate the radio signal from the mapped modulated symbols and the generated radio signal may be transmitted to another device through each antenna. To this end, the signal generator 1060 may include an Inverse Fast Fourier Transform (IFFT) module, a Cyclic Prefix (CP) inserter, a Digital-to-Analog Converter (DAC), a frequency uplink converter, and the like.

A signal processing process for a receive signal in the wireless device may be configured in the reverse of the signal processing process (1010 to 1060) of FIG. 15. For example, the wireless device (e.g., 100 or 200 of FIG. 14) may receive the radio signal from the outside through the antenna port/transceiver. The received radio signal may be transformed into a baseband signal through a signal reconstructer. To this end, the signal reconstructer may include a frequency downlink converter, an analog-to-digital converter (ADC), a CP remover, and a Fast Fourier Transform (FFT) module. Thereafter, the baseband signal may be reconstructed into the codeword through a resource demapper process, a postcoding process, a demodulation process, and a de-scrambling process. The codeword may be reconstructed into an original information block via decoding. Accordingly, a signal processing circuit (not illustrated) for the receive signal may include a signal reconstructer, a resource demapper, a postcoder, a demodulator, a descrambler, and a decoder.

Example of a Wireless Device Applied to the Disclosure

FIG. 16 illustrates another example of a wireless device applied to the disclosure. The wireless device may be implemented in various forms according to a use-case/service (refer to FIG. 13).

Referring to FIG. 16, wireless devices 100 and 200 may correspond to the wireless devices 100 and 200 of FIG. 19 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 14. For example, the transceiver(s) 114 may include the one or more transceivers 106 and 206 and/or the one or more antennas 108 and 208 of FIG. 14. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110).

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 13), the vehicles (100b-1 and 100b-2 of FIG. 13), the XR device (100c of FIG. 13), the hand-held device (100d of FIG. 13), the home appliance (100e of FIG. 13), the IoT device (100f of FIG. 13), a digital broadcast terminal, a hologram device, a public safety device, an MTC device, a medicine device, a fintech device (or a finance device), a security device, a climate/environment device, the AI server/device (400 of FIG. 13), the BSs (200 of FIG. 13), a network node, etc. The wireless device may be used in a mobile or fixed place according to a use-example/service.

In FIG. 16, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Portable Device Example to which Disclosure is Applied

FIG. 17 illustrates a portable device applied to the disclosure. The portable device may include a smart phone, a smart pad, a wearable device (e.g., a smart watch, a smart glass), and a portable computer (e.g., a notebook, etc.). The portable device may be referred to as a Mobile Station (MS), a user terminal (UT), a Mobile Subscriber Station (MSS), a Subscriber Station (SS), an Advanced Mobile Station (AMS), or a Wireless terminal (WT).

Referring to FIG. 17, a portable device 100 may include an antenna unit 108, a communication unit 110, a control unit 120, a memory unit 130, a power supply unit 140a, an interface unit 140b, and an input/output unit 140c. The antenna unit 108 may be configured as a part of the communication unit 110. The blocks 110 to 130/140a to 140c correspond to the blocks 110 to 130/140 of FIG. 16, respectively.

The communication unit 110 may transmit/receive a signal (e.g., data, a control signal, etc.) to/from another wireless device and eNBs. The control unit 120 may perform various operations by controlling components of the portable device 100. The control unit 120 may include an Application Processor (AP). The memory unit 130 may store data/parameters/programs/codes/instructions required for driving the portable device 100. Further, the memory unit 130 may store input/output data/information, etc. The power supply unit 140a may supply power to the portable device 100 and include a wired/wireless charging circuit, a battery, and the like. The interface unit 140b may support a connection between the portable device 100 and another external device. The interface unit 140b may include various ports (e.g., an audio input/output port, a video input/output port) for the connection with the external device. The input/output unit 140c may receive or output a video information/signal, an audio information/signal, data, and/or information input from a user. The input/output unit 140c may include a camera, a microphone, a user input unit, a display unit 140d, a speaker, and/or a haptic module.

As one example, in the case of data communication, the input/output unit 140c may acquire information/signal (e.g., touch, text, voice, image, and video) input from the user and the acquired information/signal may be stored in the memory unit 130. The communication unit 110 may transform the information/signal stored in the memory into the radio signal and directly transmit the radio signal to another wireless device or transmit the radio signal to the eNB. Further, the communication unit 110 may receive the radio signal from another wireless device or eNB and then reconstruct the received radio signal into original information/signal. The reconstructed information/signal may be stored in the memory unit 130 and then output in various forms (e.g., text, voice, image, video, haptic) through the input/output unit 140c.

Here, the wireless communication technology implemented in the wireless devices 100 and 200 of the present disclosure may include not only LTE, NR, and 6G but also narrowband Internet of Things for low-power communication. At this time, for example, NB-IoT technology may be an example of Low Power Wide Area Network (LPWAN) technology and may be implemented based on the specifications of the LTE Cat NB1 and/or LTE Cat NB2, which is not limited to the names described above. Additionally or alternatively, the wireless communication technology implemented in the wireless devices 100 and 200 of the present disclosure may perform communication based on the LTE-M technology. In this case, as an example, the LTE-M technology may be an example of the LPWAN technology and may be called by various names such as enhanced Machine Type Communication (eMTC). For example, the LTE-M technology may be implemented based on at least one of various specifications such as 1) LTE CAT 0, 2) LTE Cat M1, 3) LTE Cat M2, 4) LTE non-Bandwidth Limited (non-BL), 5) LTE-MTC, 6) LTE Machine Type Communication, and/or 7) LTE M, which is not limited to the names described above. Additionally or alternatively, the wireless communication technology implemented in the wireless devices 100 and 200 of the present disclosure may include at least one of ZigBee, Bluetooth, and Low Power Wide Area Network (LPWAN) that consider low-power communication, which is not limited to the names described above. For example, the ZigBee technology may create personal area networks (PANs) related to small/low-power digital communication based on various specifications such as the IEEE 802.15.4, which may be called by various names.

The embodiments described above are implemented by combinations of components and features of the disclosure in predetermined forms. Each component or feature should be considered selectively unless specified separately. Each component or feature may be carried out without being combined with another component or feature. Moreover, some components and/or features are combined with each other and may implement embodiments of the disclosure. The order of operations described in embodiments of the disclosure may be changed. Some components or features of one embodiment may be included in another embodiment, or may be replaced by corresponding components or features of another embodiment. It is apparent that some claims referring to specific claims may be combined with another claims referring to the claims other than the specific claims to constitute the embodiment or add new claims by means of amendment after the application is filed.

Embodiments of the disclosure may be implemented by various means, for example, hardware, firmware, software, or combinations thereof. When embodiments are implemented by hardware, one embodiment of the disclosure may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, and the like.

When embodiments are implemented by firmware or software, one embodiment of the disclosure may be implemented by modules, procedures, functions, etc. Performing functions or operations described above. Software code may be stored in a memory and may be driven by a processor. The memory is provided inside or outside the processor and may exchange data with the processor by various well-known means.

It is apparent to those skilled in the art that the disclosure may be embodied in other specific forms without departing from essential features of the disclosure. Accordingly, the aforementioned detailed description should not be construed as limiting in all aspects and should be considered as illustrative. The scope of the disclosure should be determined by rational construing of the appended claims, and all modifications within an equivalent scope of the disclosure are included in the scope of the disclosure.

INDUSTRIAL APPLICABILITY

An example in which the method of transmitting a V2X message in a wireless communication system of the present disclosure has been illustrated as being applied to the 3GPP LTE/LTE-A system, but the method may be applied to various wireless communication systems in addition to the 3GPP LTE/LTE-A system.

What is claimed is:

1. A method of receiving downlink control information (DCI) by a User Equipment (UE) in a wireless communication system, the method comprising:
   receiving configuration information related to a search space;
   determining PDCCH candidates to be monitored within a plurality of search spaces,
   wherein the plurality of search spaces include UE-specific search spaces (USSs) and are configured for a plurality of control resource sets (CORESETs) based on the configuration information, and each search space includes one or more physical downlink control channel (PDCCH) candidates;
   monitoring the PDCCH candidates to be monitored; and
   receiving the DCI based on the monitoring,
   wherein a first limit and a second limit related to the number of the PDCCH candidates to be monitored are predefined, the first limit is a value configured for a serving cell, the second limit is a value configured for a CORESET group related to a CORESET in which each space is configured, and the number of PDCCH candidates to be monitored is smaller than or equal to the first limit and the second limit, and
   wherein the USSs are determined sequentially as the PDCCH candidates to be monitored in ascending order of index within a range that a cumulative number of PDCCH candidates included in each USS from the USS with the lowest index does not exceed the first limit and the second limit.

2. The method of claim 1, wherein the plurality of search spaces further include common search spaces (CSSs), and PDCCH candidates included in the CSSs are determined as PDCCH candidates to be monitored regardless of the first limit and the second limit.

3. The method of claim 2, wherein the determining PDCCH candidates to be monitored within a plurality of search spaces includes:
   arranging the USSs in ascending order of index of the USSs, wherein USS_i represents the i-th USS, and index i is a positive integer including 0;
   comparing a first value, which is a sum of the number of PDCCH candidates of USSs related to the index from 0 to i and the number of PDCCH candidates of the CSSs, with the first limit;
   comparing a second value, which is a sum of the number of PDCCH candidates of USSs included in a CORESET group related to USS_i among USSs related to the index from 0 to i and the number of PDCCH candidates of the CSSs, with the second limit configured for the CORESET group related to USS_i; and
   determining the PDCCH candidates to be monitored within a range less than or equal to the first limit and the second limit.

4. The method of claim 3, wherein, based on the first value being less than or equal to the first limit and the second value exceeding the second limit configured for the CORESET group related to USS_i, USSs with an index larger than or equal to i included in the CORESET group related to USS_i are not monitored.

5. The method of claim 4, wherein the PDCCH candidates to be monitored are determined based on USSs with an index larger than or equal to i included in CORESET groups other than the CORESET group related to USS_i.

6. The method of claim 3, wherein, based on the first value exceeding the first limit, USSs with an index larger than or equal to i are not monitored.

7. The method of claim 3, wherein, based on the second value exceeding the second limit, USSs with an index larger than or equal to i are not monitored.

8. The method of claim 1, wherein the determining PDCCH candidates to be monitored within the plurality of search spaces includes:
selecting first search spaces based on the second limit among the plurality of search spaces; and
determining the PDCCH candidates to be monitored based on the first limit among the first search spaces.

9. The method of claim 8, wherein the second limit is determined as the smaller of a value predefined as the second limit and {the first limit/(the number of CORESET groups related to the plurality of CORESETs)}.

10. The method of claim 1, wherein the first limit is determined based on the value of the second limit.

11. The method of claim 10, wherein the first limit is determined as a value of the second limit multiplied by a specific value, the method further including transmitting capability information including the specific value.

12. The method of claim 1, wherein the first limit and the second limit are i) the maximum number of the PDCCH candidates to be monitored or ii) the maximum number of control channel elements (CCEs).

13. The method of claim 1, wherein the plurality of search spaces include search spaces configured for a CORESET related to a first CORESET group and search spaces configured for a CORESET related to a second CORESET group, and
based on the fact that the index of the first CORESET group is lower than that of the second CORESET group, the search spaces configured for the CORESET related to the first CORESET group are determined first sequentially as the PDCCH candidates to be monitored within a range not exceeding the first limit and the second limit.

14. A User Equipment (UE) receiving downlink control information (DCI) in a wireless communication system, the UE comprising:
one or more transceivers;
one or more processors; and
one or more memories storing instructions for operations executed by the one or more processors and being connected to the one or more processors,
wherein the operations comprise
receiving configuration information related to a search space;
determining PDCCH candidates to be monitored within a plurality of search spaces,
wherein the plurality of search spaces include UE-specific search spaces (USSs) and are configured for a plurality of control resource sets (CORESETs) based on the configuration information, and each search space includes one or more physical downlink control channel (PDCCH) candidates;
monitoring the PDCCH candidates to be monitored; and
receiving the DCI based on the monitoring,
wherein a first limit and a second limit related to the number of the PDCCH candidates to be monitored are predefined, the first limit is a value configured for a serving cell, the second limit is a value configured for a CORESET group related to a CORESET in which each space is configured, and the number of PDCCH candidates to be monitored is smaller than or equal to the first limit and the second limit, and
wherein the USSs are determined sequentially as the PDCCH candidates to be monitored in ascending order of index within a range that a cumulative number of PDCCH candidates included in each USS from the USS with the lowest index does not exceed the first limit and the second limit.

15. A device including at least one or more memories and one or more processors functionally connected to the one or more memories, the one or more processors being configured to control the device to
receive configuration information related to a search space;
determine PDCCH candidates to be monitored within a plurality of search spaces,
wherein the plurality of search spaces include UE-specific search spaces (USSs) and are configured for a plurality of control resource sets (CORESETs) based on the configuration information, and each search space includes one or more physical downlink control channel (PDCCH) candidates;
monitor the PDCCH candidates to be monitored; and
receive the DCI based on the monitoring,
wherein a first limit and a second limit related to the number of the PDCCH candidates to be monitored are predefined, the first limit is a value configured for a serving cell, the second limit is a value configured for a CORESET group related to a CORESET in which each space is configured, and the number of PDCCH candidates to be monitored is smaller than or equal to the first limit and the second limit, and
wherein the USSs are determined sequentially as the PDCCH candidates to be monitored in ascending order of index within a range that a cumulative number of PDCCH candidates included in each USS from the USS with the lowest index does not exceed the first limit and the second limit.

* * * * *